(12) United States Patent
Suzuki et al.

(10) Patent No.: US 8,477,414 B2
(45) Date of Patent: Jul. 2, 2013

(54) OPTICAL ELEMENT, WINDOW MATERIAL, FITTING, AND INSOLATION SHIELDING DEVICE

(75) Inventors: Masaki Suzuki, Miyagi (JP); Masashi Enomoto, Tokyo (JP); Hironori Yoshida, Miyagi (JP); Tsutomu Nagahama, Miyagi (JP); Toru Yatabe, Miyagi (JP); Masamitsu Kageyama, Miyagi (JP)

(73) Assignee: Dexerials Corporation, Tokyo (JP)

( * ) Notice: Subject to any disclaimer, the term of this patent is extended or adjusted under 35 U.S.C. 154(b) by 352 days.

(21) Appl. No.: 13/035,501

(22) Filed: Feb. 25, 2011

(65) Prior Publication Data

US 2011/0216414 A1    Sep. 8, 2011

(30) Foreign Application Priority Data

Mar. 2, 2010    (JP) .................. P2010-045909

(51) Int. Cl.
| | | |
|---|---|---|
| F21V 9/04 | (2006.01) | |
| F21V 9/06 | (2006.01) | |
| G02B 5/08 | (2006.01) | |
| G02B 5/20 | (2006.01) | |
| G02B 1/10 | (2006.01) | |
| B32B 7/02 | (2006.01) | |

(52) U.S. Cl.
USPC ................ 359/360; 359/585; 428/215

(58) Field of Classification Search
USPC .................. 359/360, 585; 428/215
See application file for complete search history.

(56) References Cited

U.S. PATENT DOCUMENTS

| | | | |
|---|---|---|---|
| 4,799,475 | A | 1/1989 | Meyer et al. |
| 6,311,437 | B1 | 11/2001 | Lorenz |
| 2004/0016202 | A1 | 1/2004 | Hoffman |
| 2008/0174872 | A1 | 7/2008 | Morimoto et al. |
| 2011/0261443 | A1* | 10/2011 | Isojima et al. ............. 359/360 |

FOREIGN PATENT DOCUMENTS

| | | |
|---|---|---|
| EP | 0031278 | 7/1981 |
| EP | 0031278 A1 | 7/1981 |
| EP | 0560534 | 9/1993 |
| EP | 0560534 A1 | 9/1993 |

(Continued)

OTHER PUBLICATIONS

European Search Report issued Sep. 7, 2011, for corresponding European Appln. No. 11001470.1.

(Continued)

*Primary Examiner* — Alessandro Amari
(74) *Attorney, Agent, or Firm* — Oliff & Berridge, PLC

(57) ABSTRACT

An optical element has a first optical layer; a reflective layer; and a second optical layer. The reflective layer includes at least five layers of high refractive-index layers and metal layers alternately laminated. When a thickness L of the entire reflective layer is 80 nm, a ratio α of an optical thickness of the entire metal layers to that of the entire high refractive-index layers and a ratio β of an optical thickness of a third high refractive-index layer to that of a first high refractive-index layer are included in a first region, when the thickness L is 90 nm, the ratios α and β are included in a second region, and when the thickness L is 80 to 90 nm, the ratios α and β are included in a space enclosed by the first region, the second region, and straight lines derived from these regions.

22 Claims, 44 Drawing Sheets

FOREIGN PATENT DOCUMENTS

| | | |
|---|---|---|
| JP | 2007-152773 | 6/2007 |
| WO | 2004/042436 | 5/2004 |
| WO | 2004/042436 A1 | 5/2004 |

OTHER PUBLICATIONS

Search Report and Written Opinion dated Mar. 6, 2011, for corresponding Singapore Appln. No. 201100903-2.

European Search Report for Application No. 11001470.1-2217 dated May 11, 2011.

Japanese Patent Office, Office Action, issued in connection with Japanese Patent Application Serial No. 2011-240183, dated Nov. 1, 2011 (102 pages).

* cited by examiner

OPTICAL ELEMENT, WINDOW MATERIAL, FITTING, AND INSOLATION SHIELDING DEVICE

CROSS REFERENCES TO RELATED APPLICATIONS

The present application claims priority to Japanese Priority Patent Application JP 2010-045909 filed in the Japan Patent Office on Mar. 2, 2010, the entire contents of which are hereby incorporated by reference.

BACKGROUND

The present application relates to an optical element, a window material, a fitting, and an insolation shielding device, each of which can suppress the change in color tone.

In recent years, building glass for high-rise buildings and houses and window glass for vehicles have been increasingly provided with layers for absorbing or reflecting some of sunlight. The glass described above is one of energy-conservation measures in order to prevent global warming and aims to reduce the load on air-conditioning systems that is applied thereto by an increase in indoor temperature when optical energy emitted from the sun enters an indoor space through a window. The optical energy emitted from sunlight primarily includes light in the visible region having a wavelength range of 380 to 780 nm and light in the near-infrared region having a wavelength range of 780 to 2,100 nm. In particular, since being irrelevant to human visibility, the transmittance of a window in the latter wavelength range, that is, in the near-infrared region, is an important factor that determines whether the window has highly transparency and highly heat-shielding properties.

As a method for shielding near-infrared light while maintaining the transparency in the visible region, for example, there may mentioned a method for providing window glass with an optical element having a high reflectance in the near-infrared region. As for this method, a technique has been disclosed in which an optical multilayer film is used as a reflective layer (for example, see Japanese Unexamined Patent Application Publication No. 2007-152773). However, since this type of reflective layer is provided on a flat film or window glass, specular reflection of incident sunlight can only be performed. Hence, light coming from the sky and specularly reflected reaches another outdoor building or the ground and is changed into heat by absorption, and as a result, an ambient temperature is increased. Accordingly, around the periphery of a building in which the reflective layers as described above are adhered to all windows, various problems occur, that is, for example, since a local increase in temperature occurs, a heat island phenomenon is promoted in an urban area, and lawns are not grown only in an area irradiated with reflected light.

SUMMARY

However, heretofore, a heat ray shielding film has been designed by forming a multilayer film on a flat plate. When a multilayer film is designed by this related method, since the refractive index at least one interface of the multilayer film and the incident angle of light incident on the interface are changed, a designed spectrum deviates from the optimal value, and the color tone is disadvantageously changed to have blueness or redness.

Accordingly, it is desirable to provide an optical element, a window material, a fitting, and an insolation shielding device, each of which can suppress the change in color tone caused by the change in incident angle.

According to an embodiment, there is provided an optical element including: a first optical layer having a light emission surface; a wavelength-selective reflective layer provided on the first optical layer; and a second optical layer provided on the wavelength-selective reflective layer and having a light incidence surface. In this optical element, the wavelength-selective reflective layer has a structure including at least five layers in which high refractive-index layers and metal layers are alternately laminated to each other, when a geometric film thickness L of the entire wavelength-selective reflective layer is 80 nm, a ratio $\alpha$ of an optical film thickness of the entire metal layers to an optical film thickness of the entire high refractive-index layers and a ratio $\beta$ of an optical film thickness of a third high refractive-index layer from one of a first optical layer side and a second optical layer side to an optical film thickness of a first high refractive-index layer therefrom are included in a first region surrounded by the following formulas (1) to (4), when the geometric film thickness L of the entire wavelength-selective reflective layer is 90 nm, the ratio $\alpha$ and the ratio $\beta$ are included in a second region surrounded by the following formulas (5) to (8), and when the geometric film thickness L of the entire wavelength-selective reflective layer is in a range of 80 to 90 nm, the ratio $\alpha$ and the ratio $\beta$ are included in a space enclosed by the first region, the second region, and the following formulas (9) to (12).

$$\alpha = -0.0004\beta^2 + 0.0053\beta + 0.0065 \quad (1)$$

$$\alpha = -1\times10^{-5}\beta^2 + 0.0007\beta + 0.0066 \quad (2)$$

$$\alpha = -1\times10^{-5}\beta^2 + 0.0005\beta + 0.0119 \quad (3)$$

$$\alpha = 0.012114 \quad (4)$$

$$\alpha = -0.0002\beta^2 + 0.0039\beta + 0.0087 \quad (5)$$

$$\alpha = -3\times10^{-5}\beta^2 + 0.0014\beta + 0.0038 \quad (6)$$

$$\alpha = -2\times10^{-5}\beta^2 + 0.0006\beta + 0.0112 \quad (7)$$

$$\alpha = 0.010589 \quad (8)$$

$$(\beta - 0.5)/0.67 = (\alpha - 0.01059)/0.00152478 = (90 - L)/10 \quad (9)$$

$$(\beta - 5.5)/3.75 = (\alpha - 0.01059)/0.00152478 = (90 - L)/10 \quad (10)$$

$$(\beta - 10.4)/10.6 = (\alpha - 0.01516)/0.00067768 = (90 - L)/10 \quad (11)$$

$$(\beta - 0.8)/0.45 = (\alpha - 0.01161)/0.0008471 = (90 - L)/10 \quad (12)$$

According to another embodiment, there is provided an optical element including: a first optical layer having a light emission surface; a wavelength-selective reflective layer provided on the first optical layer; and a second optical layer provided on the wavelength-selective reflective layer and having a light incidence surface. In this optical element, the wavelength-selective reflective layer has a structure including at least five layers in which high refractive-index layers and metal layers are alternately laminated to each other, when a geometric film thickness L of the entire wavelength-selective reflective layer is 90 nm, a ratio $\alpha$ of an optical film thickness of the entire metal layers to an optical film thickness of the entire high refractive-index layers and a ratio $\beta$ of an optical film thickness of a third high refractive-index layer from one of a first optical layer side and a second optical layer side to an optical film thickness of a first high refractive-index layer therefrom are included in a first region surrounded by the following formulas (5) to (8), when the geometric film thickness L of the entire wavelength-selective reflective layer is 100 nm, the ratio α and the ratio β are included in a second region surrounded by the following formulas (13) to (16), and when the geometric film thickness L of the entire wavelength-selective reflective layer is in a range of 90 to 100 nm, the ratio α and the ratio β are included in a space enclosed by the first region, the second region, and the following formulas (17) to (20).

$$\alpha = -0.0002\beta^2 + 0.0039\beta + 0.0087 \quad (5)$$

$$\alpha = -3 \times 10^{-5}\beta^2 + 0.0014\beta + 0.0038 \quad (6)$$

$$\alpha = -2 \times 10^{-5}\beta^2 + 0.0006\beta + 0.0112 \quad (7)$$

$$\alpha = 0.010589 \quad (8)$$

$$\alpha = -0.0002\beta^2 + 0.0055\beta + 0.0057 \quad (13)$$

$$\alpha = -0.0002\beta^2 + 0.0045\beta - 0.0067 \quad (14)$$

$$\alpha = -4 \times 10^{-5}\beta^2 + 0.001\beta + 0.0099 \quad (15)$$

$$\alpha = 0.009403 \quad (16)$$

$$(0.7-\beta)/0.2 = (\alpha - 0.0094)/0.00118594 = (100-L)/10 \quad (17)$$

$$(\beta - 4.4)/1.1 = (\alpha - 0.0094)/0.00118594 = (100-L)/10 \quad (18)$$

$$(\beta - 6.5)/3.9 = (\alpha - 0.01432)/0.0008471 = (100-L)/10 \quad (19)$$

$$(1-\beta)/0.2 = (\alpha - 0.01093)/0.00067768 = (100-L)/10 \quad (20)$$

According to another embodiment, there is provided an optical element including: a first optical layer having a light emission surface; a wavelength-selective reflective layer provided on the first optical layer; and a second optical layer provided on the wavelength-selective reflective layer and having a light incidence surface. In this optical element, the wavelength-selective reflective layer has a structure including at least five layers in which high refractive-index layers and metal layers are alternately laminated to each other, when a geometric film thickness L of the entire wavelength-selective reflective layer is 100 nm, a ratio α of an optical film thickness of the entire metal layers to an optical film thickness of the entire high refractive-index layers and a ratio β of an optical film thickness of a third high refractive-index layer from one of a first optical layer side and a second optical layer side to an optical film thickness of a first high refractive-index layer therefrom are included in a first region surrounded by the following formulas (13) to (16), when the geometric film thickness L of the entire wavelength-selective reflective layer is 120 nm, the ratio α and the ratio β are included in a second region surrounded by the following formulas (21) to (24), and when the geometric film thickness L of the entire wavelength-selective reflective layer is in a range of 100 to 120 nm, the ratio α and the ratio β are included in a space enclosed by the first region, the second region, and the following formulas (25) to (28).

$$\alpha = -0.0002\beta^2 + 0.0055\beta + 0.0057 \quad (13)$$

$$\alpha = -0.0002\beta^2 + 0.0045\beta - 0.0067 \quad (14)$$

$$\alpha = -4 \times 10^{-5}\beta^2 + 0.001\beta + 0.0099 \quad (15)$$

$$\alpha = 0.009403 \quad (16)$$

$$\alpha = -0.0003\beta^2 + 0.0074\beta + 0.0033 \quad (21)$$

$$\alpha = -0.0014\beta^2 + 0.0191\beta - 0.0422 \quad (22)$$

$$\alpha = -9 \times 10^{-5}\beta^2 + 0.0015\beta + 0.0084 \quad (23)$$

$$\alpha = 0.007709 \quad (24)$$

$$(\beta - 0.6)/0.1 = (\alpha - 0.00771)/0.0016942 = (120-L)/20 \quad (25)$$

$$(\beta - 3.6)/0.8 = (\alpha - 0.00771)/0.0016942 = (120-L)/20 \quad (26)$$

$$(\beta - 4.25)/2.25 = (\alpha - 0.0133)/0.00101652 = (120-L)/20 \quad (27)$$

$$(\beta - 0.9)/0.1 = (\alpha - 0.00974)/0.00118594 = (120-L)20 \quad (28)$$

According to another embodiment, there is provided an optical element including: a first optical layer having a light emission surface; a wavelength-selective reflective layer provided on the first optical layer; and a second optical layer provided on the wavelength-selective reflective layer and having a light incidence surface. In this optical element, the wavelength-selective reflective layer has a structure including at least five layers in which high refractive-index layers and metal layers are alternately laminated to each other, when a geometric film thickness L of the entire wavelength-selective reflective layer is 120 nm, a ratio α of an optical film thickness of the entire metal layers to an optical film thickness of the entire high refractive-index layers and a ratio β of an optical film thickness of a third high refractive-index layer from one of a first optical layer side and a second optical layer side to an optical film thickness of a first high refractive-index layer therefrom are included in a first region surrounded by the following formulas (21) to (24), when the geometric film thickness L of the entire wavelength-selective reflective layer is 140 nm, the ratio α and the ratio β are included in a second region surrounded by the following formulas (29) to (32), and when the geometric film thickness L of the entire wavelength-selective reflective layer is in a range of 120 to 140 nm, the ratio α and the ratio β are included in a space enclosed by the first region, the second region, and the following formulas (33) to (36).

$$\alpha = -0.0003\beta^2 + 0.0074\beta + 0.0033 \quad (21)$$

$$\alpha = -0.0014\beta^2 + 0.0191\beta - 0.0422 \quad (22)$$

$$\alpha = -9 \times 10^{-5}\beta^2 + 0.0015\beta + 0.0084 \quad (23)$$

$$\alpha = 0.007709 \quad (24)$$

$$\alpha = -0.0014\beta^2 + 0.0136\beta - 0.0027 \quad (29)$$

$$\beta = \mathbf{10{,}132}\alpha^2 - 241.39\alpha + 4.747 \quad (30)$$

$$\alpha = -0.0001\beta^2 + 0.002\beta + 0.0074 \quad (31)$$

$$\alpha = 0.006523 \quad (32)$$

$$(0.75-\beta)/0.15 = (\alpha - 0.00652)/0.00118594 = (140-L)/20 \quad (33)$$

$$(3.65-\beta)/0.05 = (\alpha - 0.00652)/0.00118594 = (140-L)/20 \quad (34)$$

$$(\beta - 3.3)/0.95 = (\alpha - 0.01245)/0.0008471 = (140-L)/20 \quad (35)$$

$$(3.47-\beta)/2.57 = (\alpha - 0.00754)/0.00220246 = (140-L)/20 \quad (36)$$

According to another embodiment, there is provided an optical element including: a first optical layer having a light emission surface; a wavelength-selective reflective layer provided on the first optical layer; and a second optical layer provided on the wavelength-selective reflective layer and having a light incidence surface. In this optical element, the wavelength-selective reflective layer has a structure including at least five layers in which high refractive-index layers and metal layers are alternately laminated to each other, when a geometric film thickness L of the entire wavelength-selective reflective layer is 140 nm, a ratio α of an optical film thickness of the entire metal layers to an optical film thickness of the entire high refractive-index layers and a ratio β of an optical film thickness of a third high refractive-index layer from one of a first optical layer side and a second optical layer side to an optical film thickness of a first high refractive-index layer therefrom are included in a first region surrounded by the following formulas (29) to (32), when the geometric film thickness L of the entire wavelength-selective reflective layer is 160 nm, the ratio α and the ratio β are included in a second region surrounded by the following formulas (37) to (41), and when the geometric film thickness L of the entire wavelength-selective reflective layer is in a range of 140 to 160 nm, the ratio α and the ratio β are included in a space enclosed by the first region, the second region, and the following formulas (42) to (45).

$$\alpha=-0.0014\beta^2+0.0136\beta-0.0027 \tag{29}$$

$$\beta=10{,}132\alpha^2-241.39\alpha+4.747 \tag{30}$$

$$\alpha=-0.0001\beta^2+0.002\beta+0.0074 \tag{31}$$

$$\alpha=0.006523 \tag{32}$$

$$\alpha=-0.005\beta^2+0.0273\beta-0.0145 \tag{37}$$

$$\alpha=0.0043\beta^2-0.0332\beta+0.07 \tag{38}$$

$$\beta=2.875 \tag{39}$$

$$\alpha=-0.0001\beta2+0.0025\beta+0.0062 \tag{40}$$

$$\alpha=0.005676 \tag{41}$$

$$(0.9-\beta)/0.15=(\alpha-0.00568)/0.0008471=(160-L)/20 \tag{42}$$

$$(3.843)/0.15=(\alpha-0.00568)/0.0008471=(160-L)/20 \tag{43}$$

$$(\beta-2.85)/0.45=(\alpha-0.01203)/0.00042355=(160-L)/20 \tag{44}$$

$$(\beta-1.05)/2.42=(0.00864-\alpha)/0.00110123=(160-L)/20 \tag{45}$$

According to another embodiment, there is provided an optical element including: a first optical layer having a light emission surface; a wavelength-selective reflective layer provided on the first optical layer; and a second optical layer provided on the wavelength-selective reflective layer and having a light incidence surface. In this optical element, the wavelength-selective reflective layer has a structure including at least five layers in which high refractive-index layers and metal layers are alternately laminated to each other, when a geometric film thickness L of the entire wavelength-selective reflective layer is 160 nm, a ratio α of an optical film thickness of the entire metal layers to an optical film thickness of the entire high refractive-index layers and a ratio β of an optical film thickness of a third high refractive-index layer from one of a first optical layer side and a second optical layer side to an optical film thickness of a first high refractive-index layer therefrom are included in a first region surrounded by the following formulas (37) to (41), when the geometric film thickness L of the entire wavelength-selective reflective layer is 180 nm, the ratio α and the ratio β are included in a second region surrounded by the following formulas (46) to (49), and when the geometric film thickness L of the entire wavelength-selective reflective layer is in a range of 160 to 180 nm, the ratio α and the ratio β are included in a space enclosed by the first region, the second region, and the following formulas (50) to (53).

$$\alpha=-0.005\beta^2+0.0273\beta-0.0145 \tag{37}$$

$$\alpha=0.0043\beta^2-0.0332\beta+0.07 \tag{38}$$

$$\beta=2.875 \tag{39}$$

$$\alpha=-0.0001\beta^2+0.0025\beta+0.0062 \tag{40}$$

$$\alpha=0.005676 \tag{41}$$

$$\alpha=-0.0103\beta^2+0.047\beta-0.0322 \tag{46}$$

$$\alpha=0.0093\beta^2-0.0677\beta+0.1212 \tag{47}$$

$$\alpha=-0.0003\beta^2+0.0036\beta+0.0046 \tag{48}$$

$$\alpha=0.00498 \tag{49}$$

$$(1.05-\beta)/0.15=(\alpha-0.005)/0.00067768=(180-L)/20 \tag{50}$$

$$(\beta-2.75)/1.05=(\alpha-0.005)/0.00067768=(180-L)/20 \tag{51}$$

$$(\beta-2.4)/0.45=(\alpha-0.01177)/0.00025413=(180-L)/20 \tag{52}$$

$$(1.2-\beta)/0.15=(\alpha-0.00856)/0.00008471=(180-L)/20 \tag{53}$$

In all the optical elements according to the embodiments of the present application, since the film thicknesses of the individual layers of the wavelength-selective reflective layer are set so that the ratio α and the ratio β are included in a predetermined region, the change in color tone can be suppressed.

As describe above, according to the embodiments of the present application, the change in color tone caused by the change in incident angle can be suppressed.

Additional features and advantages are described herein, and will be apparent from the following Detailed Description and the figures.

DETAILED DESCRIPTION

Embodiments of the present application will be described below in detail with reference to the drawings.

1. First Embodiment (Example in which structures are one-dimensionally arranged.)

2. Second Embodiment (Example in which structures are two-dimensionally arranged.)

3. Third Embodiment (Example of a louver type reflective layer is provided.)

4. Fourth Embodiment (Example in which an optical film containing a light scattering material is provided.)

5. Fifth Embodiment (Example in which a reflective layer is exposed.)

6. Sixth Embodiment (Example in which a self-cleaning effect layer is provided.)

7. Seventh Embodiment (Example in which an optical film is applied to a blind device.)

8. Eighth Embodiment (Example in which an optical film is applied to a rolling screen device.)

9. Ninth Embodiment (Example in which an optical film is applied to a fitting.)

1. First Embodiment

Structure of Optical Film

Figure 1A:
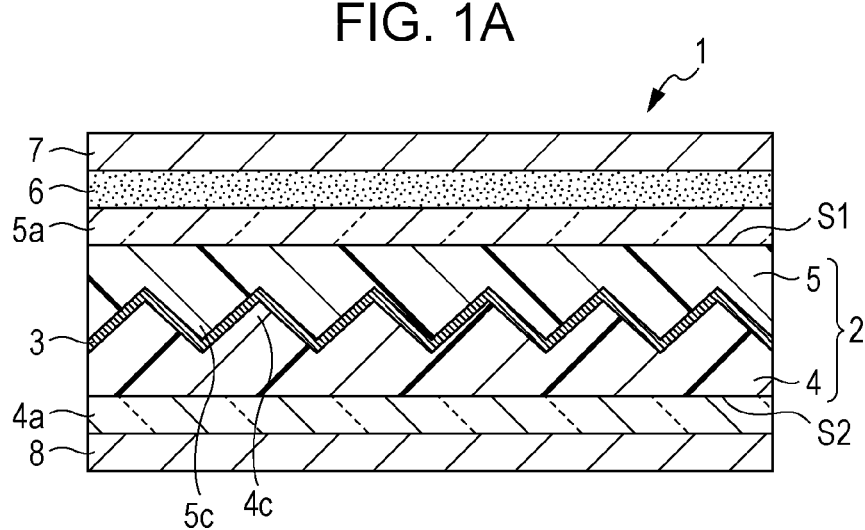
FIG. 1A is a cross-sectional view showing one structural example of an optical film according to a first embodiment.
Figure 1B:
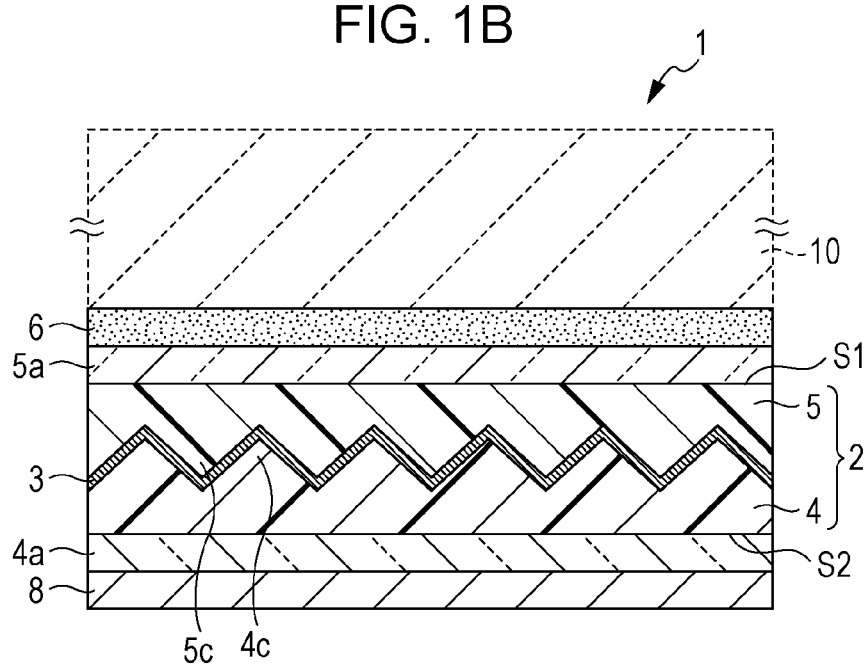
FIG. 1B is a cross-sectional view showing one example in which the optical film according to the first embodiment is adhered to an adherend.

FIG. 1A is a cross-sectional view showing one structural example of an optical film according to a first embodiment. FIG. 1B is a cross-sectional view showing one example in which the optical film according to the first embodiment is adhered to an adherend. An optical film 1 functioning as an optical element is an optical film having so-called directional reflection properties. As shown in FIG. 1A, this optical film 1 includes an optical layer 2 having a concavo-convex interface therein and a reflective layer 3 provided along the interface of this optical layer 2. The optical layer 2 includes a first optical layer 4 having a concavo-convex shaped first surface and a second optical layer 5 having a concavo-convex shaped second surface. The interface inside the optical layer 2 is formed from the first surface and the second surface, each having a concavo-convex shape, disposed so as to face each other. In particular, the optical film 1 includes the first optical layer 4 having a concavo-convex surface, the reflective layer 3 formed on the concavo-convex surface of the first optical layer 4, and the second optical layer 5 formed on the reflective layer 3 so as to fill the concavo-convex surface on which the reflective layer 3 is formed. The optical film 1 has an incident surface 51 on which sunlight or the like is incident and an emission surface S2 from which, of the light incident on this incident surface 51, light which transmits the optical film 1 is emitted. The optical film 1 is preferably applied to an inner wall member, an outer wall member, a window material, a wall material, and the like. In addition, the optical film 1 may also be preferably used as a slat (insolation shielding member) of a blind device and a screen (insolation shielding member) of a rolling screen device. Furthermore, the optical film 1 may also be preferably used as an optical element provided at a lighting portion of a fitting (interior member and/or exterior member), such as a shoji (Japanese paper shielding door).

If necessary, the optical film 1 may further includes a first base member 4a on the emission surface S2 of the optical layer 2. In addition, if necessary, the optical film 1 may further includes a second base member 5a on the incident surface S1 of the optical layer 2. When the first base member 4a and/or the second base member 5a is included in the optical film 1 as described above, in the state in which the first base member 4a and/or the second base member 5a is formed as a part of the optical film 1, the following optical properties, such as transparency and a transmission color, are preferably satisfied.

If necessary, the optical film 1 may further include a bonding layer 6. This bonding layer 6 is formed on one of the incident surface S1 and the emission surface S2 of the optical film 1 which is to be adhered to a window material 10. The optical film 1 is adhered to the window material 10, which is an adherend, at an indoor or an outdoor side with this bonding layer 6 interposed therebetween. As the bonding layer 6, for example, there may be used an adhesion layer (such as a UV curable resin or a two-component liquid resin) containing an adhesive as a primary component or a tacky layer (such as a pressure sensitive adhesive (PSA)) containing a tacky agent as a primary component. When the bonding layer 6 is a tacky layer, a peeling layer 7 is preferably further provided on the bonding layer 6. The reason for this is that by the structure as described above, when the peeling layer 7 is simply peeled off, the optical film 1 can be easily adhered to an adherend, such as the window material 10, with the bonding layer 6 interposed therebetween.

The optical film 1 may further include a primer layer (not shown) between the second base member 5a and the bonding layer 6 and/or the second optical layer 5 in order to improve bonding properties between the second base member 5a and the bonding layer 6 and/or the second optical layer 5. In addition, in order to improve the bonding properties at the same portion as described above, a common physical pretreatment is preferably performed with or without using the primer layer described above. As the common physical pretreatment, for example, a plasma treatment or a corona treatment may be mentioned.

The optical film 1 may further include a barrier layer (not shown) on the incident surface S1 or the emission surface S2 to be adhered to an adherend, such as the window material 10, or between the above surface and the reflective layer 3. When the barrier layer is provided as described above, diffusion of moisture from the incident surface S1 or the emission surface S2 to the reflective layer 3 can be suppressed, and degradation of a metal and the like contained in the reflective layer 3 can be suppressed. As a result, the durability of the optical film 1 can be improved.

The optical film 1 may further include a hard coat layer 8 in order to impart scratch resistance and the like to the surface of the optical film 1. This hard coat layer 8 is preferably formed on one of the incident surface S1 and the emission surface S2 of the optical film 1 opposite to that adhered to an adherend, such as the window material 10. In order to impart an antifouling property and the like to the incident surface S1 of the optical film 1, a layer having water-repellent or hydrophilic properties may be further provided. A layer having the function as described above may be, for example, provided directly on the optical layer 2 or provided on various function layers, such as the hard coat layer 8.

The optical film 1 preferably has flexibility since it can be easily adhered to an adherend, such as the window material 10. In this case, a sheet is included in the category of the film. That is, an optical sheet may also be included in the optical film 1.

The optical film 1 has transparency. The transparency preferably satisfies the range of transmission image clarity which will be described later. The difference in refractive index between the first optical layer 4 and the second optical layer 5 is preferably 0.010 or less, more preferably 0.008 or less, and even more preferably 0.005 or less. When the difference in refractive index is more than 0.010, the transmission image tends to blur. When the difference in refractive index is in a range of more than 0.008 to 0.010, although depending on the outside brightness, no problems may occur in daily life. When the difference in refractive index is in a range of more than 0.005 to 0.008, although a diffraction pattern of a very bright object, such as a light source, is disturbing, an outdoor scene can be clearly seen. When the difference in refractive index is 0.005 or less, the diffraction pattern is hardly disturbing. Of the first optical layer 4 and the second optical layer 5, the optical layer to be adhered to the window material 10 or the like may contain a tacky agent as a primary component. By the structure as described above, the optical film 1 can be adhered to the window material 10 or the like by one of the first optical layer 4 and the second optical layer 5, which contains a tacky agent as a primary component. In addition, when the structure as described above is formed, the difference in refractive index of the tacky agent is preferably in the range described above.

The first optical layer 4 preferably has the same optical properties, such as the refractive index, as those of the second optical layer 5. In more particular, the first optical layer 4 and the second optical layer 5 are preferably formed of the same material, such as the same resin material, which has transparency in the visible region. When the first optical layer 4 and the second optical layer 5 are formed of the same material, the refractive indexes thereof are equal to each other, and hence, the transparency of visible light can be improved. However, even if the same material is used as a starting raw material, the refractive indexes of the layers finally obtained may be different from each other due to curing conditions and the like in a film forming process, and hence, a careful attention is necessary. On the other hand, when the first optical layer 4 and the second optical layer 5 are formed from different materials, since the refractive indexes thereof are different from each other, light is refracted at the reflective layer 3 functioning as the border, and a transmission image tends to blur. In particular, when an object similar to a point light source, such as a distant electrical lamp, is observed, a diffraction pattern is liable to be clearly observed. In addition, in order to adjust the refractive index value, an additive may be added to the first optical layer 4 and/or the second optical layer 5.

The first optical layer 4 and the second optical layer 5 both preferably have transparency in the visible region. Incidentally, there are two types of definitions of the transparency, that is, one definition means no light absorption and the other definition means no light scattering. In general, the transparency indicates only the former; however, the optical film 1 according to the first embodiment preferably has the above two optical properties. Since a currently used retroreflector aims that reflected light reflected at a display, such as a road sign or closing of a night-time worker, can be easily viewed, even if having scattering properties, when the retroreflector is in close contact with an underlayer reflector, the reflected light reflected thereby can be viewed. This is the same principle as that in which, for example, in order to impart antiglare properties, even if an antiglare treatment having scattering properties is performed on a front surface of an image display apparatus, an image can be viewed. However, the optical film 1 according to the first embodiment has a feature of transmitting light other than light having a specific wavelength, which is to be directionally reflected, and is adhered to a transmission object which primarily transmits light having this transmission wavelength, and the transmitted light is observed; hence, the optical film 1 preferably has no light scattering properties. However, in accordance with the application, the scattering properties may be intentionally imparted to the second optical layer 5.

The optical film 1 is preferably used by adhesion thereof to a rigid body, such as the window material 10, having transmission properties primarily to transmitted light having a wavelength other than the specific wavelength with a tacky agent interposed therebetween. As the window material 10, for example, a building window material for a high-rise building or a housing or a window material for a vehicle may be mentioned. When being applied to a building window material, the optical film 1 is particularly preferably applied to the window material 10 arranged to face any direction between the east to the west through the south (such as in any direction between the southeast to the southwest). The reason for this is that when the window material 10 is arranged at the position as described above, heat rays can be more effectively reflected. The optical film 1 can be used not only for a single layer window glass but also for a special glass, such as a multilayer glass. In addition, the window material 10 is not limited to a material formed of glass, and a polymer material having transparency may also be used. The optical layer 2 preferably has transparency in the visible region. The reason for this is that since the optical layer 2 has transparency as described above, when the optical film 1 is adhered to the window material 10, such as a window glass, visible light can be transmitted, and lighting by sunlight can be ensured. In addition, as the surface to be adhered, besides an inside surface of the glass, an outside surface thereof may also be used.

In addition, the optical film 1 may be used together with another heat ray shielding film, and for example, an optical absorption coating film may also be provided at the interface between air and the optical film 1 (that is, on the outermost surface of the optical film 1). In addition, the optical film 1 may also be used together with a hard coat layer, an ultraviolet protection layer, a surface antireflective layer, and the like. When being used together with the optical film 1, these functional layers are preferably provided at the interface between the optical film 1 and air. However, since an ultraviolet protection layer is necessarily arranged closer to a sun side than the optical film 1, in particular, when the optical film 1 is used on a window glass surface at an indoor side, the ultraviolet protection layer is preferably provided between this window glass surface and the optical film 1. In this case, an ultraviolet absorber may also be kneaded in a bonding layer provided between the window glass surface and the optical film 1.

In addition, in accordance with the application of the optical film 1, the optical film 1 may be colored in order to impart design characteristics thereto. When the design characteristics are imparted as described above, at least one of the first the optical layer 4 and the second optical layer 5 is preferably formed to primarily absorb light in a specific wavelength band in the visible region without degrading the transparency.

Figure 2:
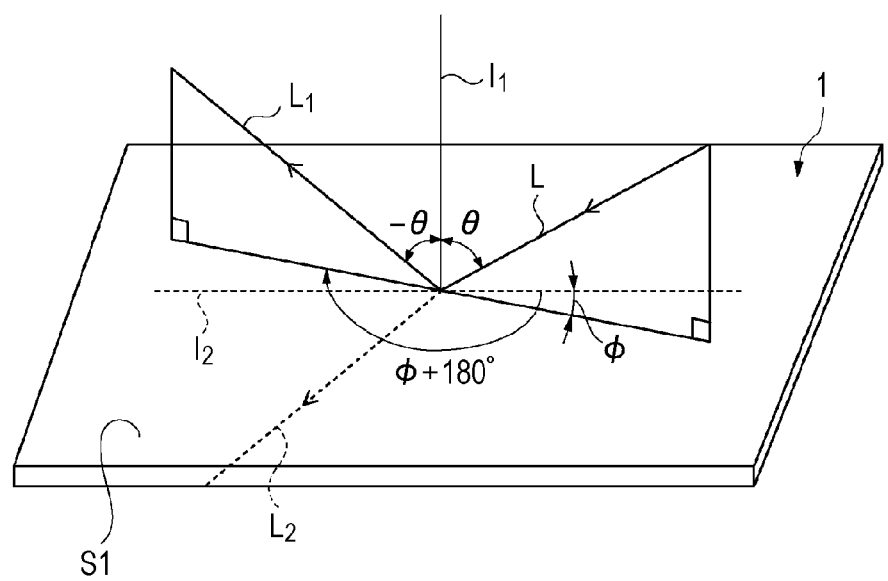
FIG. 2 is a perspective view showing the relationship between incident light incident on an optical film and reflected light reflected by the optical film.

FIG. 2 is a perspective view showing the relationship between incident light incident on the optical film 1 and reflected light reflected by the optical film 1. The optical film 1 has an incident surface S1 on which light L is incident. It is preferable that of the light L incident on the incident surface S1 at an incident angle $(\theta, \phi)$, the optical film 1 selectively directionally reflects light $L_1$ in a specific wavelength band in a direction other than a specular reflection direction $(-\theta, \phi+180°$ while transmitting light $L_2$ other than that in the specific wavelength band. In addition, the optical film 1 has transparency to the light other than that in the specific wavelength band. As the transparency, the transmission image clarity is preferably in the range which will be described later. In this embodiment, $\theta$ indicates an angle formed between a normal $l_1$ to the incident surface S1 and the incident light L or the reflected light $L_1$. In addition, $\phi$ indicates an angle formed between a specific straight line $l_2$ within the incident surface S1 and a component of the incident light L or the reflected light $L_1$ projected on the incident surface S1. In addition, the specific straight line $l_2$ within the incident surface is an axis at which the reflection intensity in a $\phi$ direction is maximized when the incident angle $(\theta, \phi)$ is fixed, and the optical film 1 is rotated around the normal $l_1$ to the incident surface S1 thereof (see FIGS. 3A to 4B). However, when there are at least two axes (directions) at which the reflection intensity is maximized, one of them is selected as the straight line $l_2$. In addition, an angle $\theta$ rotated clockwise around the normal $l_1$ is represented by "+$\theta$", and an angle $\theta$ rotated anticlockwise is represented by "−$\phi$." An angle $\phi$ rotated clockwise around the straight line $l_2$ is represented by "+$\phi$", and an angle $\phi$ rotated anticlockwise is represented by "−$\phi$".

The light in the specific wavelength band which is selectively directionally reflected and the specific light to be transmitted are changed depending on the application of the optical film 1. For example, when the optical film 1 is applied to the window material 10, the light in the specific wavelength band which is selectively dimensionally reflected is preferably near-infrared light, and the specific wavelength to be transmitted is preferably visible light. In particular, the light in the specific wavelength band which is selectively dimensionally reflected is preferably near-infrared light having a primary wavelength band of 780 to 2,100 nm. By reflecting near-infrared light, when an optical element is adhered to a window material, such as a glass window, an increase in temperature in a building can be suppressed. Hence, air-conditioning cooling load can be reduced, and energy saving can be performed.

In this embodiment, the directional reflection indicates reflection in a specific direction other than the specular reflection, and the intensity of the directional reflection is sufficiently higher than the intensity of the diffuse reflection which has no directivity. In this embodiment, the reflection indicates that the reflectance in a specific wavelength band, for example, in the near-infrared region, is preferably 30% or more, more preferably 50% or more, and even more preferably 80% or more. The transmission indicates that the transmittance in a specific wavelength band region, for example, in the visible region, is preferably 30% or more, more preferably 50% or more, and even more preferably 70% or more.

In the optical film 1, a directional reflection direction $\phi$o is preferably in a range of −90° to 90°. The reason for this is that when the optical film 1 is adhered to the window material 10, of light coming from the sky, light in a specific wavelength band can be returned in a skyward direction. When there are no high-rise buildings in the vicinity, the optical film 1 in this range is effective. In addition, the directional reflection direction is preferably in the vicinity of $(\theta, -\phi)$. The vicinity indicates preferably within 5° from $(\theta, -\phi)$, more preferably within 3°, and even more preferably within 2°. The reason for this is that when the range of the directional refection direction is set as described above, and the optical film 1 is adhered to the window material 10, of light coming from the sky over buildings having approximately equivalent heights, light in a specific wavelength band can be efficiently returned skyward over the other buildings. In order to realize the directional reflection as described above, a three-dimensional structure, such as a part of a sphere, a part of a hyperbola, a triangular pyramid, a quadrangular pyramid, or a cone, is preferably used. Light incident in a $(\theta, \phi)$ direction (−90°<$\phi$<90°) can be reflected in accordance with the shape in a $(\theta o, \phi o)$ direction (0°<$\theta$o<90°, −90°<$\theta$o<90°). Alternatively, a columnar body extended in one direction is preferable. Light incident in a $(\theta,$ ϕ) direction)(−90°<ϕ<90° can be reflected in accordance with the inclined angle of the columnar shape in a (θo, −ϕ) direction (0°<θo<90°).

In the optical film 1, the directional reflection of light in a specific wavelength band is preferably in the vicinity of retroreflection, that is, the reflection direction of light in a specific wavelength band with respect to the light incident on the incident surface S1 at an incident angle (θ, ϕ) is preferably in the vicinity of (θ, ϕ). The reason for this is that when the optical film 1 is adhered to the window material 10, of light coming from the sky, light in a specific wavelength band can be returned skyward. In this embodiment, the vicinity is preferably within 5°, more preferably within 3°, and even more preferably within 2°. The reason for this is that when the reflection direction is within the range described above, and the optical film 1 is adhered to the window material 10, of light coming from the sky, light in a specific wavelength band can be efficiently returned skyward. In addition, when an infrared radiation portion and a light receiving portion are adjacent to each other, such as an infrared sensor or an infrared imaging device, the retroreflection direction is necessarily equal to the incident direction; however, when sensing is not necessarily performed in a specific direction as in the case of the present application, the retroreflection direction may not be strictly made equal to the incident direction.

In the optical film 1, the value of the transmission image clarity measured using an optical comb with a width of 0.5 mm in a wavelength band having transmission properties is preferably 50 or more, more preferably 60 or more, and even more preferably 75 or more. When the value of the transmission image clarity is less than 50, the transmission image tends to blur. When the value is in a range of 50 to less than 60, although depending on the outside brightness, no problems may occur in daily life. When the value is in a range of 60 to less than 75, although a diffraction pattern of a very bright object, such as a light source, is disturbing, an outdoor scene can be clearly seen. When the value is 75 or more, the diffraction pattern is hardly disturbing. Furthermore, the total value of the transmission image clarity measured using an optical comb with a width of 0.125 mm, 0.5 mm, 1.0 mm, and 2.0 mm is preferably 230 or more, more preferably 270 or more, and even more preferably 350 or more. When the total value of the transmission image clarity is less than 230, the transmission image tends to blur. When the total value is in a range of 230 to less than 270, although depending on the outside brightness, no problems may occur in daily life. When the total value is in a range of 270 to less than 350, although a diffraction pattern of a very bright object, such as a light source, is disturbing, an outdoor scene can be clearly seen. When the total value is 350 or more, the diffraction pattern is hardly disturbing. In this embodiment, the value of the transmission image clarity is measured in accordance with JIS K7105 using ICM-1T manufactured by Suga Test Instruments Co., Ltd. However, when a wavelength to be desirably transmitted is different from a D65 light-source wavelength, measurement is preferably performed after correction is performed using a filter for the wavelength to be desirably transmitted.

In the optical film 1, a haze in a wavelength band having transmission properties is preferably 6% or less, more preferably 4% or less, and even more preferably 2% or less. The reason for this is that when the haze is more than 6%, transmitted light is scattered and blurred. In this embodiment, the haze is measured in accordance with a measuring method specified by JIS K7136 using HM-150 manufactured by Murakami Color Research Laboratory Co., Ltd. However, when a wavelength to be desirably transmitted is different from the D65 light-source wavelength, measurement is preferably performed after correction is performed using a filter for the wavelength to be desirably transmitted. The incident surface S1 of the optical film 1 has a smoothness so as not to degrade the transmission image clarity, and preferably, the incident surface S1 and the emission surface S2 both have the smoothness as described above. In particular, an arithmetic average roughness Ra of each of the incident surface S1 and the emission surface S2 is preferably 0.08 μm or less, more preferably 0.06 μm or less, and even more preferably 0.04 μm or less. In addition, the arithmetic average roughness Ra described above is calculated as a roughness parameter by measuring the surface roughness of the incident surface and obtaining a roughness curve from a two-dimensional profile curve. In addition, the measurement conditions are set in accordance with JIS B0601: 2001. A measurement apparatus and measurement conditions are shown below.

Measurement apparatus: full automatic microprofile-measuring instrument Surfcorder ET4000A (manufactured by Kosaka Laboratory Ltd.)

In addition, λc is set to 0.8 mm; an evaluation length is set to 4 mm; a cutoff is set to 5 times; and a data sampling interval is set to 0.5 μm.

The transmission color of the optical film 1 is preferably as neutral as possible and, even if being colored, the transmission color preferably has a light color tone that appears cool, such as blue, blue-green, or green. In order to obtain the color tone as described above, the chromaticity coordinates x and y of the transmitted light incident on the incident surface S1, passing through the optical layer 2 and the reflective layer 3, and radiating from the emission surface S2, and the chromaticity coordinates x and y of the reflected light preferably satisfy, for example, $0.20<x<0.35$ and $0.20<y<0.40$, more preferably $0.25<x<0.32$ and $0.25<y<0.37$, and even more preferably $0.30<x<0.32$ and $0.30<y<0.35$ in the case of illumination of the D65 light source. Furthermore, in order not to make the color tone look reddish, $y>x-0.02$ is preferably satisfied, and $y>x$ is more preferably satisfied. In addition, if the reflection color tone varies with the incident angle, for example, when the optical film 1 is applied to a building window, it is not preferable since the color tone looks differently from place to place or appears to change when viewed during walking. In order to suppress the change in color tone as described above, the absolute value of the difference in the chromaticity coordinate x of light incident on the incident surface S1 or the emission surface S2 at an incident angle θ in a range of 5° to 60° and specularly reflected by the optical film 1 and the absolute value of the difference in the chromaticity coordinate y of the light are each preferably 0.05 or less, more preferably 0.03 or less, and even more preferably 0.01 or less at each primary surface of the optical film 1. The above numerical limitations of the chromaticity coordinates x and y of the reflected light are preferably satisfied for both the incident surface S1 and the emission surface S2.

Hereinafter, the first optical layer 4, the second optical layer 5, and the reflective layer 3, which form the optical film 1, will be sequentially described.

(First Optical Layer, Second Optical Layer)

The first optical layer 4 is a layer, for example, to support and protect the reflective layer 3. Since imparting flexibility to the optical film 1, the first optical layer 4 is formed of, for example, a layer containing a resin as a primary component. For example, one of the two primary surfaces of the first optical layer 4 is a smooth surface, and the other surface is a concavo-convex surface (a first surface). The reflective layer 3 is formed on this concavo-convex surface.

The second optical layer 5 is a layer to protect the reflective layer 3 by embedding the first surface (concavo-convex surface) of the first optical layer 4 on which the reflective layer 3 is formed. In order to impart the flexibility to the optical film 1, the second optical layer 5 is formed, for example, of a layer containing a resin as a primary component. For example, one of the two primary surfaces of the second optical layer 5 is a smooth surface, and the other surface is a concavo-convex surface (a second surface). The concavo-convex surface of the first optical layer 4 and the concavo-convex surface of the second optical layer 5 have the relationship in which the concavo-convex shapes are reversed to each other.

The concavo-convex surface of the first optical layer 4 is formed, for example, of at least two structures 4c which are one-dimensionally arranged. The concavo-convex surface of the second optical layer 5 is formed, for example, of at least two structures 5c which are one-dimensionally arranged (see FIGS. 3A to 4B). Since the structure 4c of the first optical layer 4 and the structure 5c of the second optical layer 5 are only different from each other such that the concavo-convex shapes thereof are reversed, hereinafter, the structure 4c of the first optical layer 4 will be described.

In the optical film 1, the pitch P of the structures 4c is preferably in a range of 5 µm to 5 mm, more preferably in a range of 5 µm to less than 250 µm, and even more preferably in a range of 20 to 200 µm. When the pitch of the structures 4c is less than 5 µm, it is difficult to form a desired shape thereof, and in addition, it is also generally difficult to obtain steep wavelength selection properties of the reflective layer 3; hence, the transmission wavelength may be partially reflected in some cases. When the reflection as described above occurs, since diffraction is generated, and high-order reflection is also viewed, the transparency tends to look not so good. In addition, if the pitch of the structures 4c is more than 5 mm, when the shape of the structure 4c necessary for the directional reflection is taken into consideration, a necessary film thickness becomes large, the flexibility is lost, and as a result, it becomes difficult to adhere the optical film 1 to a rigid body, such as the window material 10. In addition, when the pitch of the structures 4c is set to less than 250 µm, since the flexibility is further increased, a roll-to-roll manufacturing process can be easily performed, and a batch manufacturing process may not be necessary. In order to apply the optical film 1 according to an embodiment to building materials, such as a window, the optical film 1 is necessary to have a length of approximately several meters, and hence, a roll-to-roll manufacturing process is suitably performed rather than a batch manufacturing process. Furthermore, when the pitch is set in a range of 20 to 200 µm, the productivity is further improved.

In addition, the shape of the structure 4c formed in the surface of the first optical layer 4 is not limited to one type, and the structures 4c may be formed in the surface of the first optical layer 4 to have at least two types of shapes. When the structures 4c having at least two types of shapes are formed in the surface, a predetermined pattern formed of the structures 4c having at least two types of shapes may be periodically repeated. In addition, depending on desired properties, the structures 4c having at least two types of shapes may be randomly formed (aperiodically).

Figure 3A:
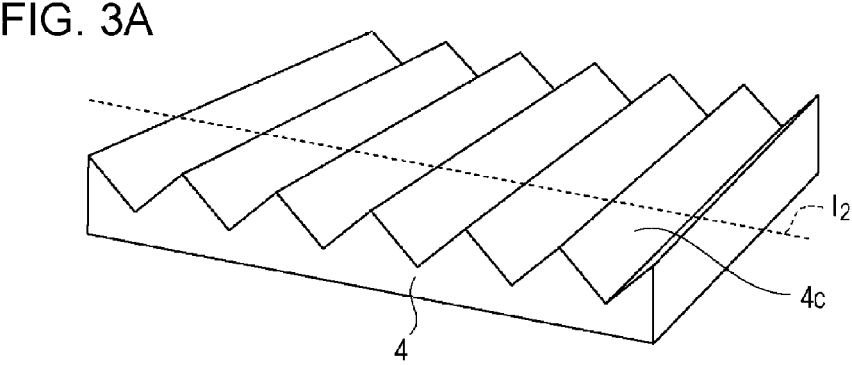
FIGS. 3A to 3C are each a perspective view showing one shape example of the structure formed in a first optical layer.
Figure 3B:
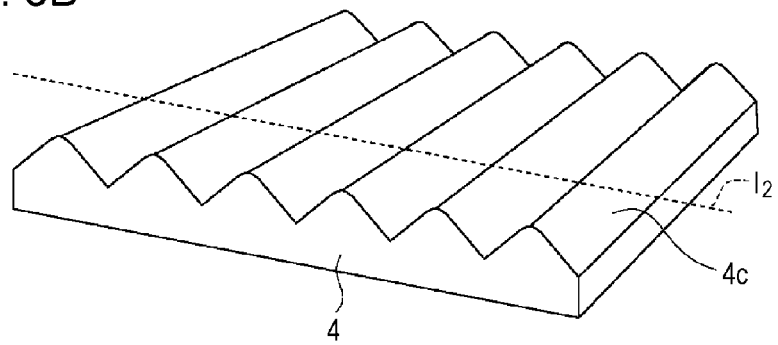
Figure 3C:
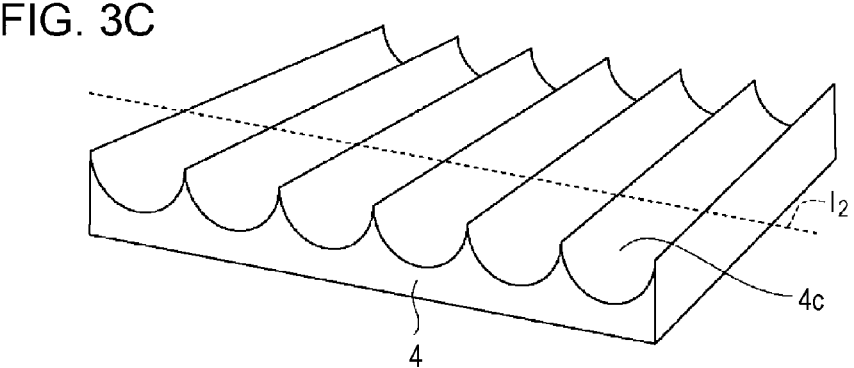

FIGS. 3A to 3C are perspective views each showing a shape example of the structure formed in the first optical layer. The structures 4c are each a columnar concave portion extended in one direction and are one-dimensionally arranged in one direction. Since being formed on the structures 4c, the reflective layer 3 has the same shape as the surface shape of the structures 4c.

As the shape of the structure 4c, for example, there may be mentioned a prism shape shown in FIG. 3A, a shape having a round ridgeline portion of a prism shown in FIG. 3B, a reversed shape of a lenticular shape in FIG. 3C, or a reversed shape thereof. In this case, the lenticular shape indicates a shape in which the cross-section perpendicular to a ridgeline of the convex portion is a part of an arc shape or an almost arc shape, an elliptical arc shape or an almost elliptical arc shape, or a parabolic shape or an almost parabolic shape. Therefore, a cylindrical shape is also categorized in the lenticular shape. In addition, as shown in FIG. 3B, a round shape (R) may be formed at the ridgeline portion, and the ratio R/P, that is, the ratio of a curvature radius R to the pitch P of the structure 4c is preferably 7% or less, more preferably 5% or less, and even more preferably 3% or less. The shape of the structure 4c is not limited to the shapes shown in FIGS. 3A to 3C and the reversed shapes thereof, and a toroidal shape, a hyperbolic columnar shape, an elliptical columnar shape, a polygonal columnar shape, and a free-form shape may also be used. In addition, the vertex of the prism shape or the lenticular shape may be formed to have a polygonal shape (such as a pentagonal shape). When the structure 4c is formed to have a prism shape, an inclined angle θ of the prism-shaped structure 4c is 45° or the like. When applied to the window material 10, the structure 4c preferably has a flat surface or a curved surface having an inclined angle of 45° or more in order to return light coming from the sky in a skyward direction as much as possible by reflection. The reason the shape as described above is formed is that since the incident light is almost returned skyward by one reflection, even if the reflectance of the reflective layer 3 is not so high, the incident light can be efficiently reflected in a skyward direction, and light absorption in the reflective layer 3 can also be reduced.

Figure 4A:
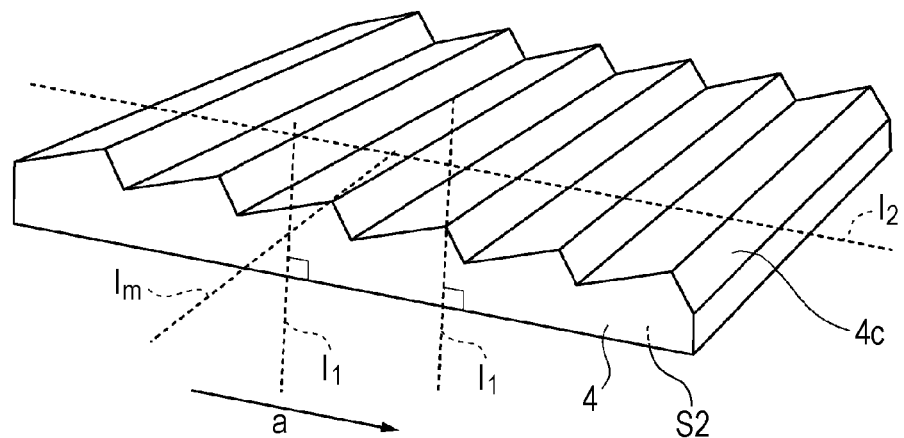
FIG. 4A is a perspective view showing one shape example of the structure formed in the first optical layer.
Figure 4B:
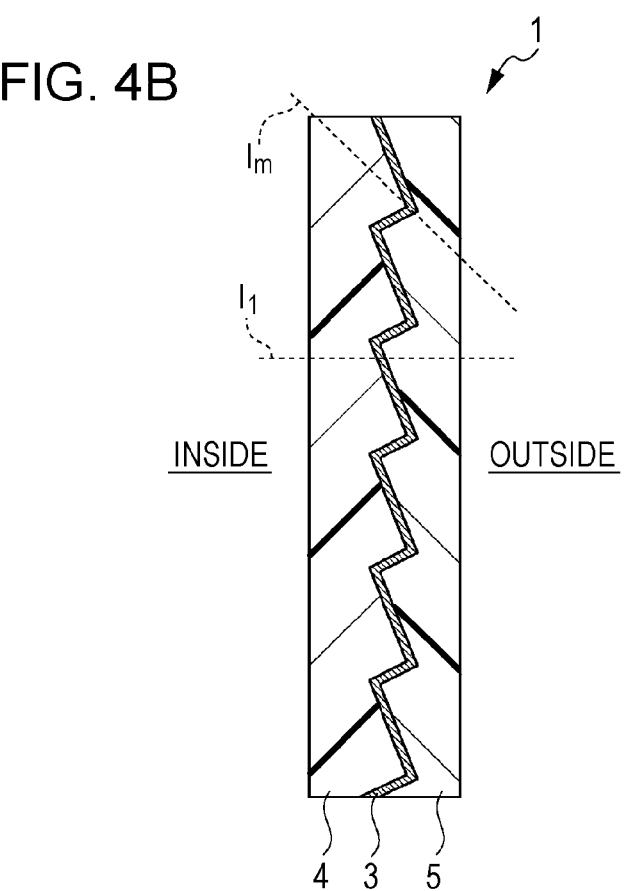
FIG. 4B is a cross-sectional view showing one structural example of an optical film including the first optical layer in which the structures shown in FIG. 4A are formed.

In addition, as shown in FIG. 4A, the structure 4c may have an asymmetric shape with respect to the normal 1l to the incident surface S1 or the emission surface S2 of the optical film 1. In this case, a primary axis 1m of the structure 4c is inclined in an arrangement direction a of the structure 4c with respect to the normal 1l. Here, the primary axis 1m of the structure 4c indicates a straight line passing through a central point of the base of a cross-section of the structure 4c and the vertex thereof. When the optical film 1 is adhered to the window material 10 arranged approximately perpendicular to the ground, as shown in FIG. 4B, the primary axis 1m of the structure 4c is preferably inclined to a lower side (ground side) of the window material 10 with respect to the normal 1l. The reason for this is that in general, since a larger amount of heat enters through a window about in early afternoon, and the height of the sun is larger than an angle of 45° in many cases, by using the shape described above, light incident at these high angles as described above can be efficiently reflected upward. An asymmetrical prism shape of the structure 4c with respect to the normal 1l is shown by way of example in FIGS. 4A and 4B. In addition, the structure 4c having a shape other than a prism shape may also have an asymmetrical shape with respect to the normal 1l. For example, a corner cube body may have an asymmetric shape with respect to the normal I1.

The first optical layer 4 preferably includes a resin as a primary component in which a decrease in storage modulus at 100° C. is small and in which the storage modulus at 25° C. is not considerably different from that at 100° C. In particular, a resin having a storage modulus of $3 \times 10^9$ Pa or less at 25° C. and a storage modulus of $3 \times 10^7$ Pa or more at 100° C. is preferably contained. In addition, although being preferably formed of one type resin, the first optical layer 4 may include at least two types of resins. In addition, if necessary, at least one additive may be contained.

When a resin is used as a primary component in which a decrease in storage modulus at 100° C. is small and the storage modulus at 25° C. and that at 100° C. are not so much different from each other, even when a process including heating with or without pressure application is performed after the formation of the concavo-convex surface (the first surface) of the first optical layer 4, a designed interface shape can be mostly maintained. On the other hand, when a resin is used as a primary component in which a decrease in storage modulus at 100° C. is large and the storage modulus at 25° C. and that at 100° C. are significantly different from each other, a designed interface shape is considerably deformed, and for example, the optical film 1 may be curled in some cases.

As the process including heating, besides a process, such as an annealing treatment, in which heat is directly applied to the optical film 1 or constituent members thereof, for example, there may be mentioned a process in which when a thin film is formed or a resin composition is cured, the temperature of a film forming surface is locally increased and is indirectly applied to the thin film or the resin composition and a process in which the temperature of a mold is increased by energy ray radiation and is indirectly applied to an optical film. In addition, the effect obtained by limiting the numerical value range of the storage modulus described above is not particularly limited to a specific type of resin and can be obtained from any type of a thermoplastic resin, a thermosetting resin, and an energy ray curable resin.

The storage modulus of the first optical layer 4 can be confirmed, for example, as described below. When the surface of the first optical layer 4 is exposed, the storage modulus of its exposed surface can be confirmed by measurement using a microhardness tester. In addition, when the first base member 4a or the like is formed on the surface of the first optical layer 4, after the first base member 4a or the like is peeled off to expose the surface of the first optical layer 4, the storage modulus of the exposed surface can be confirmed by measurement using a microhardness tester.

As a method for suppressing a decrease in modulus at a high temperature, in the case of a thermoplastic resin, for example, a method for adjusting the length of a side chain or the type thereof may be mentioned, and in the case of a thermosetting resin and an energy ray curable resin, for example, a method for adjusting the number of cross-linking points and the molecular structure of a cross-linking agent may be mentioned. However, it is preferable that necessary performance of a resin material itself is not degraded by the structural change as describe. For example, depending on the type of cross-linking agent, a resin may become fragile since the modulus thereof at approximately room temperature is increased, and a film may be warped or curled since the shrinkage thereof is increased; hence, the type of cross-linking agent is appropriately selected in accordance with desired properties.

When the first optical layer 4 includes a crystalline polymer material as a primary component, a resin is preferably used as a primary component in which the glass transition point is higher than the highest temperature in a manufacturing process and a decrease in storage modulus at the highest temperature in the manufacturing process is small. On the other hand, if a resin is used in which the glass transition point is in a range of a room temperature of 25° C. to the highest temperature in a manufacturing process and a decrease in storage modulus at the highest temperature in the manufacturing process is large, it becomes difficult to maintain a designed ideal interface shape in the manufacturing process.

When the first optical layer 4 includes an amorphous polymer material as a primary component, a resin is preferably used as a primary component in which the melting point is higher than the highest temperature in a manufacturing process and a decrease in storage modulus at the highest temperature in the manufacturing process is small. On the other hand, if a resin is used in which the melting point is in a range of a room temperature of 25° C. to the highest temperature in a manufacturing process and a decrease in storage modulus at the highest temperature in the manufacturing process is large, a designed ideal interface shape may be difficult to be maintained in the manufacturing process.

In this embodiment, the highest temperature in a manufacturing process indicates the highest temperature of the concavo-convex surface (the first surface) of the first optical layer 4 in the manufacturing process. It is preferable when the second optical layer 5 also satisfies the numerical value range of the storage modulus and the temperature range of the glass transition point described above.

That is, at least one of the first optical layer 4 and the second optical layer 5 preferably contains a resin having a storage modulus of $3\times10^9$ Pa or less at 25° C. The reason for this is that since the flexibility can be imparted to the optical film 1 at a room temperature of 25° C., the optical film 1 can be manufactured by a roll-to-roll manufacturing method.

The first base member 4a and the second base member 5a have, for example, transparency. Although the base member preferably has a film shape in order to impart flexibility to the optical film 1, the base member is not particularly limited to this shape. As a material for the first base member 4a and the second base member 5a, for example, a common polymer material may be used. As the common polymer material, for example, there may be mentioned a triacetyl cellulose (TAC), a polyester (TPEE), a poly(ethylene terephthalate) (PET), a polyimide (PI), a polyamide (PA), an aramid, a polyethylene (PE), a polyacrylate, a polyethersulfone, a polysulfone, a polypropylene (PP), a diacetyl cellulose, a poly(vinyl chloride), an acryl resin (PMMA), a polycarbonate (PC), an epoxy resin, a urea resin, a urethane resin, or a melamine resin; however, the polymer material is not particularly limited to the above materials. In view of the productivity, the thickness of the first base member 4a and that of the second base member 5a are each preferably in a range of 38 to 100 µm; however, the thickness is not limited thereto. The first base member 4a and the second base member 5a each preferably have energy ray transparency. The reason for this is that as describe below, an energy ray curable resin provided between the reflective layer 3 and the first base member 4a or the second base member 5a can be cured by irradiation of energy rays from the first base member 4a or the second base member 5a side.

The first optical layer 4 and the second optical layer 5 have, for example, transparency. The first optical layer 4 and the second optical layer 5 can be obtained, for example, by curing a resin composition. As the resin composition, in view of the ease of manufacture, an energy ray curable resin to be cured by light, electron rays, or the like or a thermosetting resin to be cured by heat is preferably used. As the energy ray curable resin, a photosensitive resin composition to be cured by light is preferable, and an ultraviolet curable resin composition to be cured by ultraviolet light is most preferable. In order to improve the adhesion between the reflective layer 3 and the first optical layer 4 or the second optical layer 5, the resin composition preferably further contains a compound containing phosphoric acid, a compound containing succinic acid, and/or a compound containing butyrolactone. As the compound containing phosphoric acid, for example, a (meth)

acrylate containing phosphoric acid may be used, and a (meth)acrylic monomer containing phosphoric acid as a functional group or an oligomer thereof may be preferably used. As the compound containing succinic acid, for example, a (meth)acrylate containing succinic acid may be used, and a (meth)acrylic monomer containing succinic acid as a functional group or an oligomer thereof may be preferably used. As the compound containing butyrolactone, for example, a (meth)acrylate containing butyrolactone may be used, and a (meth)acrylic monomer containing butyrolactone as a functional group or an oligomer thereof may be preferably used.

The ultraviolet curable resin composition contains, for example, a (meth)acrylate and a photopolymerization initiator. In addition, if necessary, the ultraviolet curable resin composition may further contain a light stabilizer, a flame retarder, a leveling agent, an antioxidant, and the like.

As the acrylate, a monomer having at least two (meth) acryloyl groups and/or an oligomer thereof is preferably used. As this monomer and/or the oligomer thereof, for example, a urethane (meth)acrylate, an epoxy (meth)acrylate, a polyester (meth)acrylate, a polyol (meth)acrylate, a polyether (meth) acrylate, or a melamine (meth)acrylate may be used. Here, the (meth)acryloyl group indicates one of an acryloyl group and a methacryloyl group. In this embodiment, the oligomer indicates a molecule having a molecular weight in a range of 500 to 60,000.

As the photopolymerization initiator, a compound appropriately selected from common materials may be used. As the common material, for example, a benzophenone derivative, an acetophenone derivative, and an anthraquinone derivative may be used alone or in combination. The amount of the polymerization initiator is preferably in a range of 0.1 to 10 percent by mass in a solid content. When the amount is less than 0.1 percent by mass, photocurability is degraded, and practical industrial production may not be suitably performed. On the other hand, when the amount of the polymerization initiator is more than 10 percent by mass, and the amount of irradiation light is small, an odor tends to remain in a coating film. In this case, the solid content indicates all the components forming a cured hard coat layer. In particular, for example, an acrylate, a photopolymerization initiator, and the like are collectively called the solid content.

A resin to which the structure can be transferred by energy ray irradiation, heat, and the like is preferably used, and as long as the above-described request for the refractive index is satisfied, any type of resin, for example, a heat curable resin or an ionizing radiation curable resin, such as an epoxy resin, or a thermoplastic resin, such as polycarbonate or polyacrylate, may be used.

An oligomer may be added in order to decrease the curing shrinkage. A polyisocyanate or the like may also be included as a curing agent. In addition, in consideration of adhesion to the first optical layer 4 and the second optical layer 5, at least one of a monomer having a hydroxyl group, a carboxyl group, or a phosphoric group; a polyalcohol compound; a carboxylic acid; a silane, an aluminum or a titanium coupling agent; and various chelating agents may also be added.

The resin composition preferably further contains a cross-linking agent. As this cross-linking agent, in particular, a cyclic cross-linking agent is preferably used. The reason for this is that by using a cross-linking agent, heat resistance can be imparted to the resin without considerably changing the storage modulus at room temperature. If the storage modulus at room temperature considerably changes, the optical film 1 will become fragile, and production of the optical film 1 by a roll-to-roll process or the like becomes difficult. As the cyclic cross-linking agent, for example, there may be mentioned dioxane glycol diacrylate, tricyclodecane dimethanol diacrylate, tricyclodecane dimethanol dimethacrylate, ethylene oxide-modified isocyanuric acid diacrylate, ethylene oxide-modified isocyanuric acid triacrylate, or caprolactone-modified tris(acryloxyethyl) isocyanurate.

The first base member 4a or the second base member 5a preferably has a lower water vapor transmission rate than that of the first optical layer 4 or the second optical layer 5. For example, when the first optical layer 4 is formed from an energy ray curable resin, such as a urethane acrylate, the first base member 4a is preferably formed, for example, of a poly(ethylene terephthalate) (PET) having energy ray transmission properties and a lower water vapor transmission rate than that of the first optical layer 4. Accordingly, diffusion of moisture from the incident surface S1 or the emission surface S2 to the reflective layer 3 can be suppressed, so that degradation of a metal or the like contained in the reflective layer 3 can be suppressed. Therefore, the durability of the optical film 1 can be improved. In addition, the water vapor transmission rate of a PET having a thickness of 75 vin is approximately 10 g/m2/day (40° C., 90% RH).

It is preferable that at least one of the first optical layer 4 and the second optical layer 5 includes a functional group having high polarity, and that the content thereof in the first optical layer 4 is different from that in the second optical layer 5. It is preferable that the first optical layer 4 and the second optical layer 5 both contain a phosphoric acid compound, (such as a phosphoric ester), and that the content thereof in the first optical layer 4 is different from that in the second optical layer 5. The content of a phosphoric acid compound in the first optical layer 4 is preferably different from that in the second optical layer 5 by two times or more, more preferably 5 times or more, and even more preferably by 10 times or more.

When at least one of the first optical layer 4 and the second optical layer 5 contains a phosphoric acid compound, the reflective layer 3 preferably contains an oxide, a nitride, or an oxynitride in a surface thereof which is in contact with at least one of the first optical layer 4 and the second optical layer 5 which contains a phosphoric acid compound. In particular, the reflective layer 3 preferably has a layer containing zinc oxide (ZnO) or a niobium oxide which is in contact with at least one of the first optical layer 4 and the second optical layer 5 which contains a phosphoric acid compound. The reason for this is to improve the adhesion between at least one of these optical layers and the reflective layer 3. In addition, the reason for this is that when the reflective layer 3 contains a metal, such as Ag, a high corrosion resistance effect can be obtained. In addition, the reflective layer 3 may also contain a dopant, such as Al or Ga. The reason for this is that when a metal oxide layer is formed by a sputtering method or the like, the film quality and the smoothness are improved.

Since imparting design characteristics to the optical film 1, the window material 10, and the like, at least one of the first optical layer 4 and the second optical layer 5 preferably has properties of absorbing light in a specific wavelength band in the visible region. Although a pigment to be dispersed in the resin may be any one of an organic-based pigment and an inorganic-based pigment, in particular, an inorganic pigment having inherent high weather resistance is preferably used. In particular, for example, there may be mentioned inorganic pigments, such as zircon gray (Co, Ni-doped $ZrSiO_4$), praseodymium yellow (Pr-doped $ZrSiO_4$), chromium titanium yellow (Cr, Sb-doped $TiO_2$ or Cr, W-doped $TiO_2$), chrome green (such as $Cr_2O_3$), peacock blue ((CoZn)O $(AlCr)_2O_3$), Victoria green (Al, $Cr)_2O_3$), dark blue (CoO—$Al_2O_3$ $SiO_2$), banadium zirconium blue (V-doped $ZrSiO_4$), chrome tin pink (Cr-doped CaO—SnO$_2$—SiO$_2$), manganese pink (Mn-doped Al$_2$O$_3$), and salmon pink (Fe-doped ZrSiO$_4$); and organic pigments, such as an azo pigment and a phthalocyanine pigment.

(Reflective Layer)

The reflective layer is a wavelength-selective reflective layer formed of a laminated film in which, of light incident on an incident surface at an incident angle (θ, φ), light in a specific wavelength band is directionally reflected while light other than that in the specific wavelength band is allowed to pass therethrough. The average thickness of the reflective layer 3 is preferably 20 μm or less, more preferably 5 μm or less, and even more preferably 1 μm or less. When the average thickness of the reflective layer 3 is more than 20 μm, the length of a light path in which transmitted light is refracted is increased, and a transmission image is liable to look distorted. As a formation method of the reflective layer, for example, a sputtering method, a deposition method, a dip coating method, and a die coating method may be mentioned.

The laminated film is a laminated film having at least five layers, for example, in which metal layers having a high reflectance in the infrared region and high refractive-index layers having a high refractive index to the metal film in the visible region and functioning as an antireflective layer are alternately laminated to each other. As the high refractive-index layer, an optically transparent layer or a transparent conductive layer may be used.

The metal layer having a high reflectance in the infrared region contains, for example, as a primary component an element, such as Au, Ag, Cu, Al, Ni, Cr, Ti, Pd, Co, Si, Ta, W, Mo, or Ge, or an alloy containing at least two elements mentioned above. In addition, when the practicality is taken into consideration, among these mentioned above, a Ag-based, a Cu-bases, an Al-based, a Si-based, or a Ge-based material is preferably used. When an alloy is used as a material for the metal layer, the metal layer preferably contains AlCu, AlTi, AlCr, AlCo, AlNdCu, AlMgSi, AgBi, AgNdCu, AgPdCu, AgPdTi, AgCuTi, AgPdCa, AgPdMg, AgPdFe, Ag, or SiB as a primary component. In addition, in order to suppress the corrosion of the metal layer, a material, such as Ti or Nd, is preferably added thereto. In particular, when Ag is used as a material for the metal layer, the material mentioned above is preferably added.

The optically transparent layer is an optically transparent layer which has a high refractive index in the visible region and functions as an antireflective layer. The optically transparent layer contains, for example, a high dielectric material, such as niobium oxide, tantalum oxide, or titanium oxide, as a primary component. The transparent conductive layer contains, for example, as a primary component a ZnO-based oxide or an indium-doped tin oxide. In addition, as the ZnO-based oxide, for example, at least one selected from the group consisting of zinc oxide (ZnO), gallium (Ga) and aluminum (Al)-doped zinc oxide (GAZO), Al-doped zinc oxide (AZO), and gallium (Ga)-doped zinc oxide (GZO) may be used.

In addition, the refractive index of the high refractive-index layer included in the laminated film is preferably in a range of 1.7 to 2.6. The refractive index is more preferably in a range of 1.8 to 2.6 and even more preferably in a range of 1.9 to 2.6. The reason for this is that the antireflection in the visible light region can be realizable by a thin film in which cracks are not likely to be generated. In this case, the refractive index is at a wavelength of 550 nm. The high refractive-index layer is a layer containing, for example, a metal oxide as a primary component. As the metal oxide, in order to reduce a stress of the layer and to suppress the generation of cracks, a metal oxide other than zinc oxide may be preferably used in some cases. In particular, at least one selected from the group consisting of niobium oxide (such as niobium pentoxide), tantalum oxide (such as tantalum pentoxide), and titanium oxide is preferably used. The film thickness of the high refractive-index layer is preferably in a range of 10 to 120 nm, more preferably in a range of 10 to 100 nm, and even more preferably in a range of 10 to 80 nm. When the film thickness is less than 10 nm, visible light tends to be easily reflected. On the other hand, when the thickness is more than 120 nm, a decrease in transmittance and the generation of cracks are liable to occur.

Figure 5:
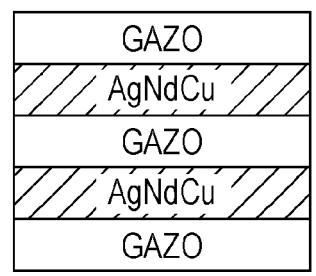
FIG. 5 is a schematic view showing one example of a lamination structure of a wavelength-selective reflective layer.

FIG. 5 shows one example of the lamination structure of the reflective layer 3. Layers of the reflective layer 3 are called a first, a second, a third, a fourth, and a fifth layer from the emission surface side and will be described below. The first layer, the third layer, and the fifth layer are each a high refractive-index layer containing, for example, GAZO as a primary component, and the film thickness of the first layer is formed approximately equal to that of the fifth layer. The difference in film thickness between the first layer and the fifth layer is preferably 10% or less with respect to the film thickness of one of the two layers, more preferably 5% or less, and even more preferably 3% or less. In addition, the second layer and the fourth layer are each a metal layer formed, for example, of AgNdCu as a primary component, and the film thicknesses thereof are formed approximately equal to each other. The difference in film thickness between the second layer and the fourth layer is preferably 10% or less with respect to the film thickness of one of the two layers, more preferably 5% or less, and even more preferably 3% or less.

The lamination structure of the reflective layer 3 is not limited thereto, and for example, a plurality of separated layers may form one high refractive-index layer. FIGS. 6A to 6F each show one example of the lamination structure of the reflective layer 3 in which a plurality of separated layers forms one high refractive index layer. In the example shown in FIG. 6A, the third and the fifth high refractive-index layers are each formed of two layers respectively containing ZnO and Nb$_2$O$_5$ as a primary component. In the example shown in FIG. 6B, the third high refractive-index layer is formed of three layers respectively containing GAZO, Nb$_2$O$_5$, and GAZO as a primary component, and the fifth high refractive-index layer is formed of two layers respectively containing GAZO and Nb$_2$O$_5$ as a primary component. In the example shown in FIG. 6C, the third high refractive-index layer is formed of two layers respectively containing ZnO and Nb$_2$O$_5$ as a primary component, and the fifth high refractive-index layer is formed of three layers respectively containing ZnO, Nb$_2$O$_5$, ZnO as a primary component.

Figure 6A:
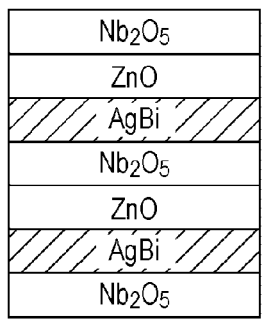
FIG. 6A is a schematic view showing one example of a wavelength-selective reflective layer in which a third and a fifth high refractive-index layer are each separated into two layers.
Figure 6B:
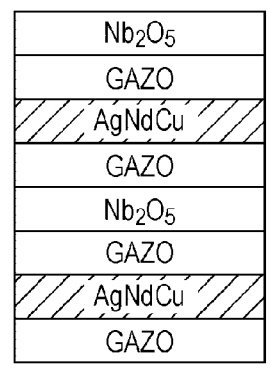
FIG. 6B is a schematic view showing one example of a wavelength-selective reflective layer in which a third high refractive-index layer is separated into three layers and a fifth high refractive-index layer is separated into two layers.
Figure 6C:
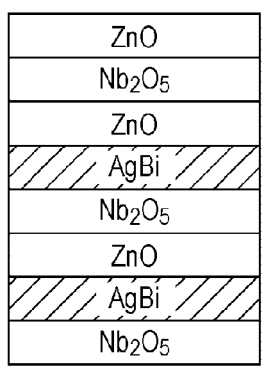
FIG. 6C is a schematic view showing one example of a wavelength-selective reflective layer in which a third high refractive-index layer is separated into two layers and a fifth high refractive-index layer is separated into three layers.
Figure 6D:
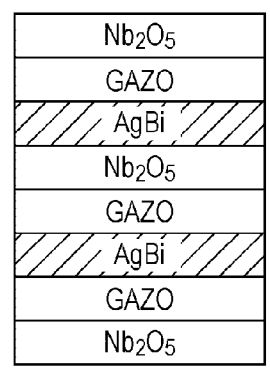
FIG. 6D is a schematic view showing one example of a wavelength-selective reflective layer in which a first, a third, and a fifth high refractive-index layer are each separated into two layers.
Figure 6E:
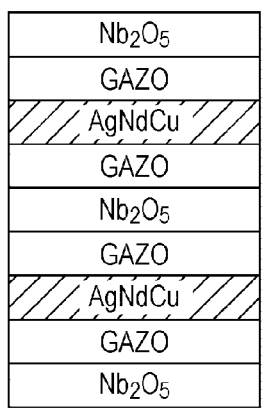
FIG. 6E is a schematic view showing one example of a wavelength-selective reflective layer in which a first and a fifth high refractive-index layer are each separated into two layers and a third high refractive-index layer is separated into three layers.
Figure 6F:
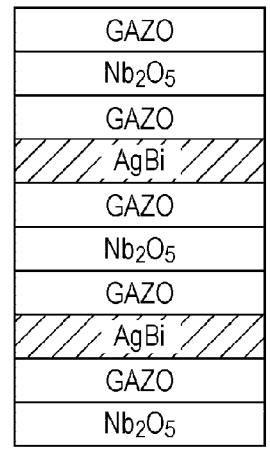
FIG. 6F is a schematic view showing one example of a wavelength-selective reflective layer in which a first high refractive-index layer is separated into two layers and a third and a fifth high refractive-index layer are each separated into three layers.

In the example shown in FIG. 6D, the first, the third, and the fifth high refractive-index layers are each formed of two layers respectively containing GAZO and Nb$_2$O$_5$ as a primary component. In the example shown in FIG. 6E, the first and the fifth high refractive-index layers are each formed of two layers respectively containing GAZO and Nb$_2$O$_5$ as a primary component, and the third high refractive-index layer is formed of three layers respectively containing GAZO, Nb$_2$O$_5$, and GAZO as a primary component. In the example shown in FIG. 6F, the first high refractive-index layer is formed of two layers respectively containing GAZO and Nb$_2$O$_5$ as a primary component, and the third and the fifth high refractive-index layers are each formed of three layers respectively containing GAZO, Nb$_2$O$_5$, and GAZO as a primary component.

In addition, the laminated film is not limited to a thin film formed of an inorganic material and may be formed by laminating thin films formed of a polymer material or layers containing a polymer material and fine particles dispersed therein. In addition, in order to prevent degradation of an underlayer metal by oxidation in the formation of these optically transparent layers, a buffer layer of Ti or the like having a small thickness, such as approximately several nanometers, may be provided at an interface of the optically transparent layers. In this embodiment, the buffer layer is a layer which oxidizes itself in the formation of the upper layer so as to suppress the oxidation of the metal layer or the like functioning as an underlayer.

(Suppression of Change in Color Tone)

In this embodiment, an index value which indicates the color tone, such as blueness or redness, is set, and the change in color tone is suppressed by forming a laminated film so as to satisfy this index value. In this example, a blueness index and a redness index are each set as the index value for the color tone.

The blueness index is an index value to judge whether transmitted light has blueness or not. A blueness index value is calculated in such a way that after a product of a light source spectrum in a wavelength range of 620 to 750 nm, reflectance, and luminosity factor is integrated, and the value obtained thereby is divided by a value obtained by integrating a product of the light source spectrum and the luminosity factor.

The blueness index value is preferably less than 0.152 and more preferably less than 0.111. The reason for this is that when the blueness index value is in a range of 0 to less than 0.111, the blueness is hardly disturbing, and when it is in a range of 0.111 to less than 0.152, although depending on the outside brightness, the blueness is almost not disturbing. On the other hand, when the blueness index value is in a range of 0.152 to less than 0.2, transmitted light is liable to have a slight blueness in a specific angle direction, and when it is 0.2 or more, transmitted light is liable to have a deep blueness in a specific angle direction.

The redness index is an index value to judge whether transmitted light has redness or not. As in the case of the blueness index value, the redness index value is calculated in such a way that after a product of a light source spectrum in a wavelength range of 620 to 750 nm, reflectance, and luminosity factor is integrated, and the value obtained thereby is divided by a value obtained by integrating a product of the light source spectrum and the luminosity factor.

The redness index value is preferably less than 0.258 and more preferably less than 0.175. The reason for this is that when the redness index value is in a range of 0 to less than 0.175, the redness is hardly disturbing, and when it is in a range of 0.175 to less than 0.258, although depending on the outside brightness, the redness is almost not disturbing. On the other hand, when the redness index value is in a range of 0.258 to less than 0.3, transmitted light is liable to have a slight redness in a specific angle direction, and when it is 0.3 or more, transmitted light is liable to have a deep redness in a specific angle direction.

(Function of Optical Film)

Figure 7A:
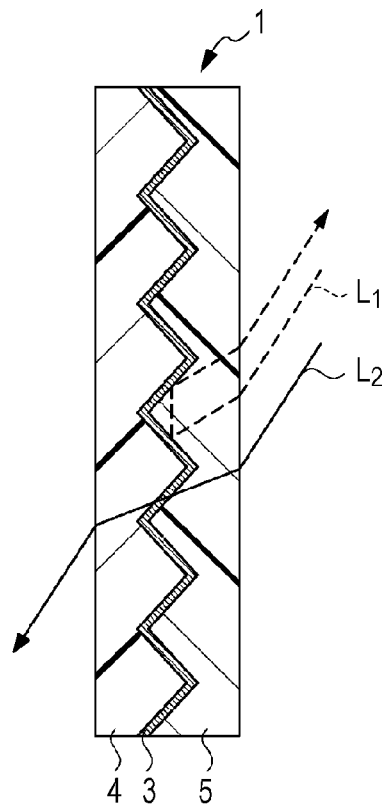
FIGS. 7A and 7B are each a cross-sectional view illustrating one example of the function of the optical film.
Figure 7B:
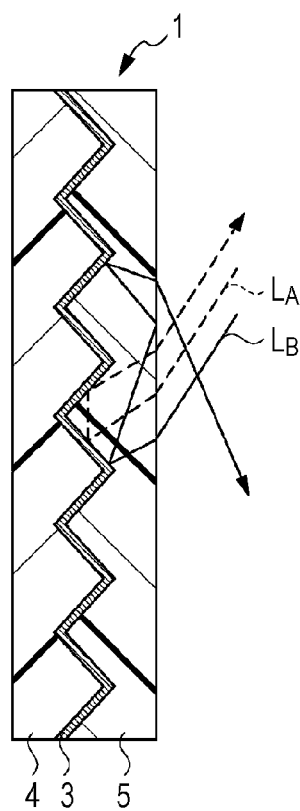

FIGS. 7A and 7B are cross-sectional views each illustrating one example of the function of an optical film. Here, the case in which the structure has a prism shape of an inclined angle of 45° will be described by way of example. As shown in FIG. 7A, although some of near-infrared light $L_1$ of sunlight incident on this optical film 1 is directionally reflected skyward in a direction approximately equivalent to the incident direction, visible light $L_2$ transmits the optical film 1.

In addition, as shown in FIG. 7B, the light incident on the optical film 1 and reflected on the reflective layer surface of the reflective layer 3 is separated into a component $L_A$ reflected skyward and a component $L_B$ not reflected skyward at a ratio in accordance with the incident angle. In addition, after being specularly reflected at the interface between the second optical layer 5 and air, the component $L_B$ not reflected skyward is finally reflected in a direction different from the incident direction.

When the incident angle of light is represented by δ, the refractive index of the first optical layer 4 is represented by n, and the reflectance of the reflective layer 3 is represented by R, the ratio of the component $L_A$ reflected skyward to all the incident components is shown by the following formula (1).

$$x=(\sin(45-\delta')+\cos(45-\delta')/\tan(45+\delta'))/(\sin(45-\delta')+\cos(45-\delta'))\times R^2 \quad (1)$$

In the above formula, $\delta'=\sin^{-1}(\sin \delta/n)$ holds.

Figure 8A:
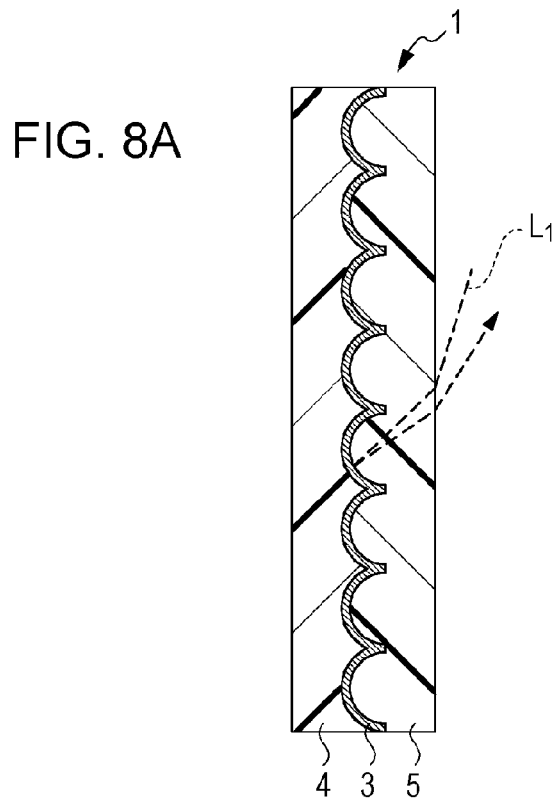
FIGS. 8A and 8B are each a cross-sectional view illustrating one example of the function of the optical film.
Figure 8B:
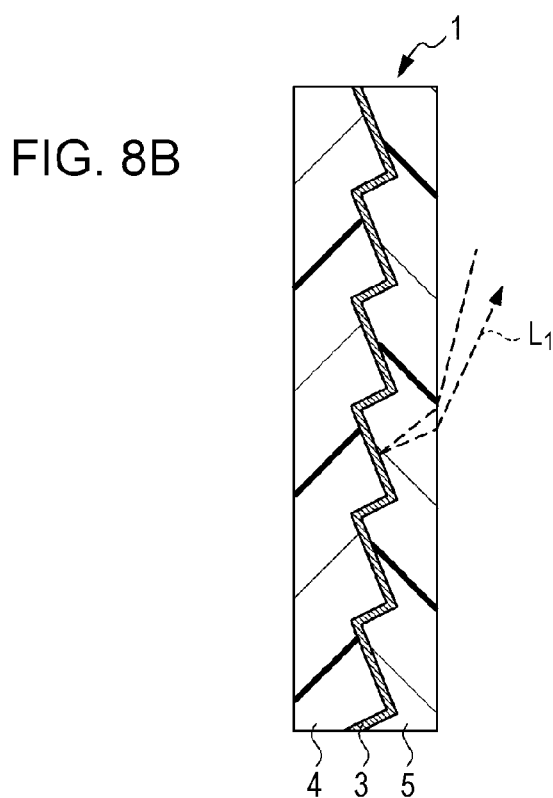

If the ratio of the component $L_B$ not reflected skyward increases, the ratio of the incident light reflected skyward will decrease. In order to increase the ratio of the skyward reflection, appropriate designing of the shape of the reflective layer 3, that is, appropriate designing of the shape of the structure 4c of the first optical layer 4, is effective. For example, in order to increase the ratio of the skyward reflection, the shape of the structure 4c preferably has the lenticular shape shown in FIG. 3C or the asymmetrical shape shown in FIGS. 4A and 4B. By the structures described above, although light may not be reflected in the completely same direction as that of the incident light, the ratio of light reflected upward to the light incident above a building window material and the like can be increased. Since one reflection of the incident light by the reflective layer 3 is enough as shown in FIGS. 8A and 8B, the two shapes shown in FIGS. 3C and 4A can increase a final reflection component as compared to that by the shape as shown in each of FIGS. 7A and 7B in which reflection is performed twice (or 3 times or more). For example, when two-time reflection is used, if the reflectance of the reflective layer 3 is assumed 80% at a certain wavelength, the skyward reflectance is theoretically 64%, and when the reflection is performed once, the skyward reflectance is 80%.

Figure 9A:
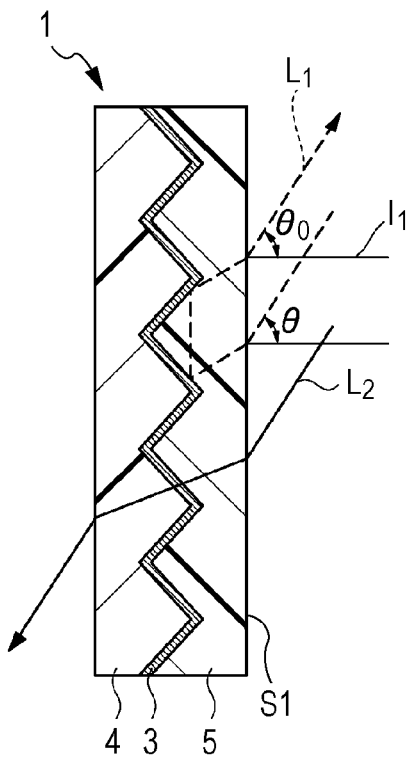
FIG. 9A is a cross-sectional view illustrating one example of the function of the optical film.
Figure 9B:
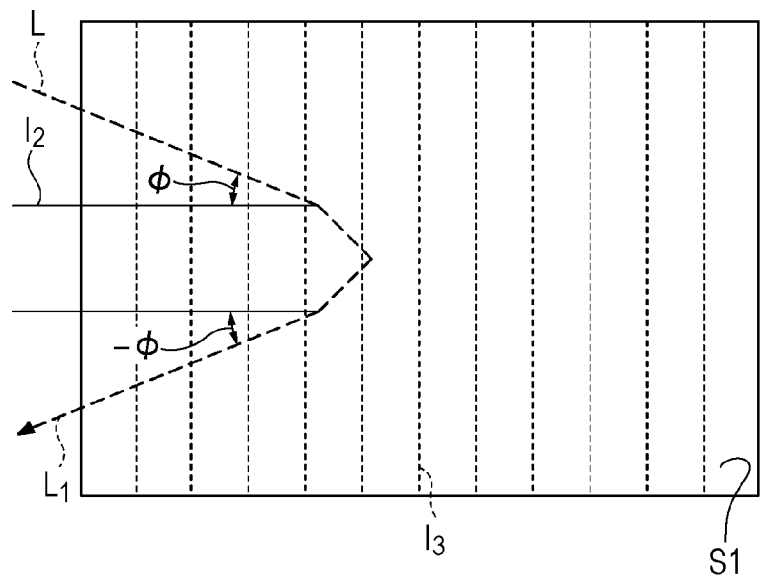
FIG. 9B is a plan view illustrating one example of the function of the optical film.

FIGS. 9A and 9B show the relationship of a ridgeline $l_3$ of the columnar structure 4c with the incident light L and the reflected light $L_1$. It is preferable that of the incident light L incident on the incident surface S1 at an incident angle (θ, φ), the optical film 1 selectively directionally reflects the light $L_1$ in a specific wavelength band in a direction (θo, -φ) (0°<θo<90°) while transmitting the light $L_2$ other than that in the specific wavelength band. The reason for this is that when the relationship as described above is satisfied, the light in the specific wavelength band can be reflected skyward. In this case, θ indicates an angle formed between the normal $l_1$ to the incident surface S1 and the incident light L or the reflected light $L_1$. In addition, φ indicates an angle formed between the straight line $l_2$ which perpendicularly intersects the ridgeline $l_3$ of the columnar structure 4c in the incident surface S1 and a component of the incident light L or the reflected light $L_1$ which is projected on the incident surface S1. In addition, an angle θ rotated clockwise around the normal $l_1$ is represented by "+θ", and an angle θ rotated anticlockwise is represented by "-θ". An angle rotated clockwise around the straight line $l_2$ is represented by "+φ", and an angle φ rotated anticlockwise is represented by "-φ".

[Manufacturing Apparatus of Optical Film]

Figure 10:
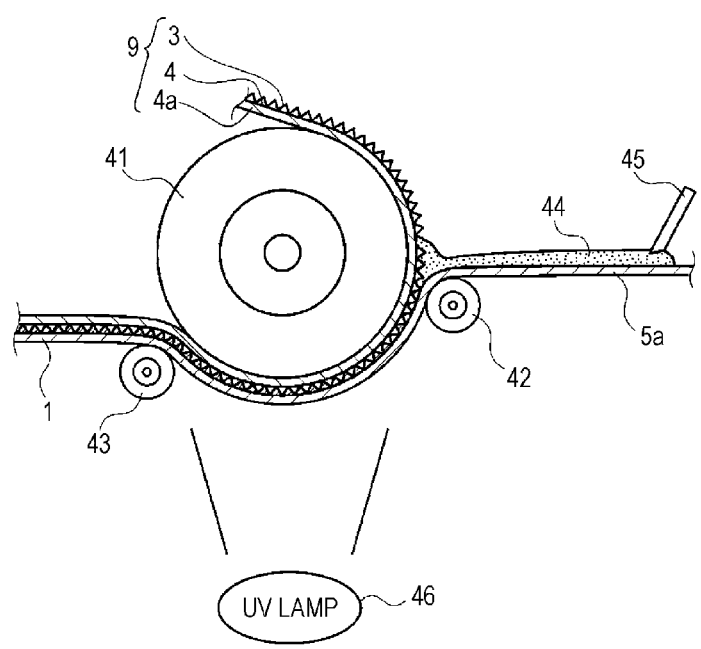
FIG. 10 is a schematic view showing one structural example of a manufacturing apparatus for manufacturing an optical film according to the first embodiment.

FIG. 10 is a schematic view showing one structural example of a manufacturing apparatus for manufacturing an optical film according to the first embodiment. As shown in FIG. 10, this manufacturing apparatus includes laminate rolls 41 and 42, a guide roll 43, a coating device 45, and an irradiation device 46.

The laminate rolls 41 and 42 are formed to be able to nip an optical layer 9 provided with a reflective layer and the second base member 5a. The optical layer 9 provided with a reflective layer is formed by forming the reflective layer 3 on one primary surface of the first optical layer 4. In addition, as the optical layer 9 provided with a reflective layer, the first base member 4a may be formed on a primary surface of the first optical layer 4 other than the surface on which the reflective layer 3 is formed. In this example, the case is shown in which the reflective layer 3 is formed on one primary surface of the first optical layer 4, and the first base member 4a is formed on the other primary surface thereof. The guide roll 43 is arranged at a transport path of this manufacturing apparatus so as to transport the belt-shaped optical film 1. Materials for the laminate rolls 41 and 42 and the guide roll 43 are not particularly limited, and in accordance with desired roll properties, for example, a metal, such as stainless steel, a rubber, or a silicone may be appropriately used.

For example, a device having a coating unit, such as a coater, may be used as the coating device 45. As the coater, in consideration of the physical properties and the like of a resin composition to be applied, for example, a gravure coater, a wire bar coater, or a die coater may be appropriately used. The irradiation device 46 is an irradiation device which radiates ionizing rays, such as electron rays, ultraviolet rays, visible rays, or gamma rays. In this example, the case in which a UV lamp which radiates ultraviolet rays is used as the irradiation device 46 is shown.

[Method for Manufacturing Optical Film]

Hereinafter, with reference to FIGS. 10 to 13C, one example of a method for manufacturing an optical film according to the first embodiment will be described. In addition, in consideration of the productivity, a manufacturing process shown below is preferably performed partially or entirely by a roll-to-roll method as shown in FIG. 10. However, the step of forming a mold is performed independently.

Figure 11A:
FIGS. 11A to 11C are cross-sectional views each illustrating one example of a method for manufacturing an optical film according to the first embodiment.
Figure 11B:
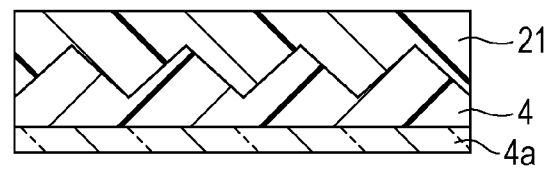

First, as shown in FIG. 11A, a mold 21 having the same concavo-convex shape as that of the structure 4c or a mold (replica) having a reversed shape thereof is formed, for example, by cutting tool processing or laser processing. Next, as shown in FIG. 11B, the concavo-convex shape of the above mold 21 is transferred to a film-shaped resin material, for example, using a melt extrusion method or a transfer method. As the transfer method, for example, there may be mentioned a method in which an energy ray curable resin is poured in a mold and is then cured by irradiation of energy rays, a method in which a shape is transferred to a resin by applying heat and/or pressure thereto, and a method in which a resin film is supplied from a roll, and a mold shape is transferred thereto by applying heat (lamination transfer method). Accordingly, as shown in FIG. 11C, the first optical layer 4 is formed so that one primary surface thereof has the structures 4c.

Figure 11C:
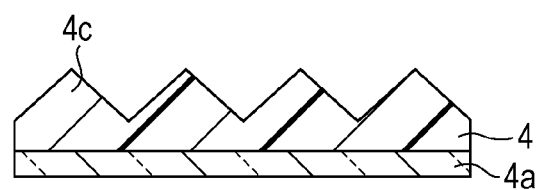

In addition, as shown in FIG. 11C, the first optical layer 4 may be formed on the first base member 4a. In this case, for example, a method is used in which after the film-shaped first base member 4a is supplied from a roll, and an energy ray curable resin is applied on this base member, the resin is pressed on the mold so that the shape thereof is transferred and is cured by irradiation of energy rays. In addition, the resin preferably further contains a cross-linking agent. The reason for this is that heat resistance can be imparted to the resin without considerably changing the storage modulus at room temperature.

Figure 12A:
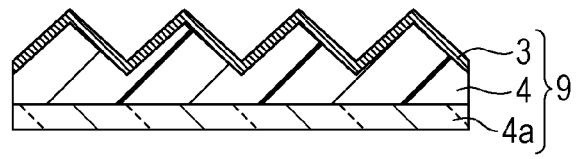
FIGS. 12A to 12C are cross-sectional views each illustrating one example of the method for manufacturing an optical film according to the first embodiment.
Figure 12B:
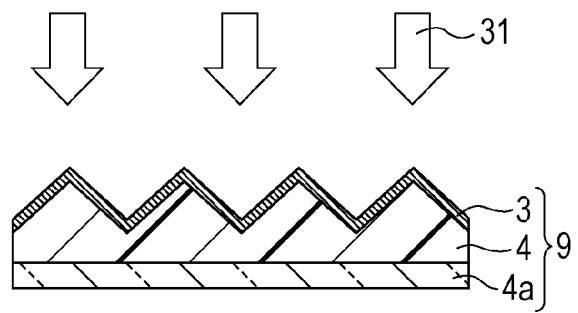

Next, as shown in FIG. 12A, the reflective layer 3 is formed on one primary surface of the first optical layer 4. As a method for forming the reflective layer 3, for example, a sputtering method, a deposition method, a chemical vapor deposition (CVD) method, a dip coating method, a die coating method, a wet coating method, and a spray coating method may be mentioned, and among those film-forming methods, a preferable method is appropriately selected in accordance with the shape of the structure 4c or the like. Next, as shown in FIG. 12B, if necessary, an annealing treatment 31 is performed on the reflective layer 3. The temperature of the annealing treatment is in a range, for example, of 100° C. to 250° C.

Figure 12C:
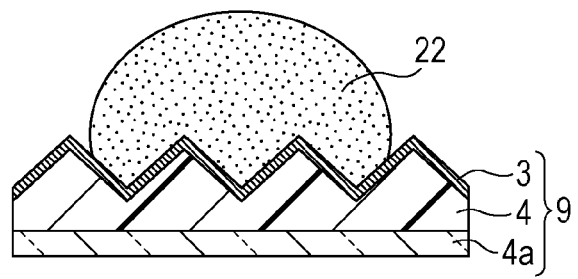
Figure 13A:
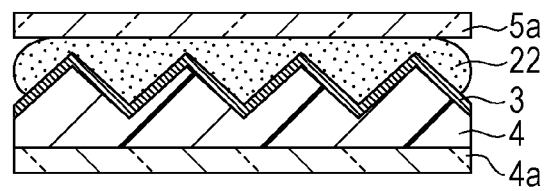
FIGS. 13A to 13C are cross-sectional views each illustrating one example of the method for manufacturing an optical film according to the first embodiment.
Figure 13B:
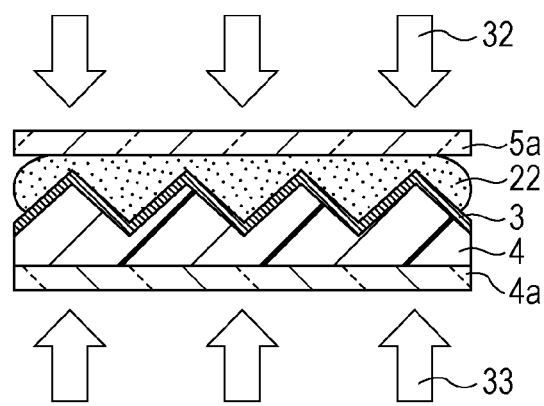
Figure 13C:
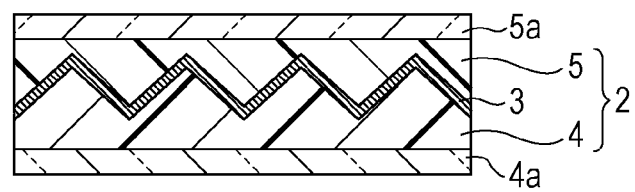

Next, as shown in FIG. 12C, an uncured resin 22 is applied on the reflective layer 3. As the resin 22, for example, an energy ray curable resin or a thermosetting resin may be used. As the energy ray curable resin, an ultraviolet curable resin is preferable. Next, as shown in FIG. 13A, a laminate is formed by placing the second base member 5a on the resin 22. Next, as shown in FIG. 13B, while the resin 22 is cured, for example, with irradiation of energy rays 32 or heat application 32, a pressure 33 is applied to the laminate. As the energy rays, for example, electron rays, ultraviolet rays, visible rays, gamma rays, or electron rays may be used, and in view of production facilities, ultraviolet rays are preferable. An accumulated irradiation amount is preferably selected in consideration of curing properties of the resin, suppression of yellowing of the resin and the base members, and the like. The pressure applied to the laminate is preferably in a range of 0.01 to 1 MPa. When the pressure is less than 0.01 MPa, travelling performance of a film may cause a problem. On the other hand, when the pressure is more than 1 MPa, a metal roll is necessarily used as a nip roll, and pressure irregularity may be liable to be generated. Accordingly, as shown in FIG. 13C, the second optical layer 5 is formed on the reflective layer 3, so that the optical film 1 is obtained.

By using the manufacturing apparatus shown in FIG. 10, a method for forming the optical film 1 will be particularly described. First, the second base member 5a is fed from a base member supply roll (not shown), and this second base member 5a thus fed is allowed to pass under the coating device 45. Next, an ionizing ray curable resin 44 is applied by the coating device 45 on the second base member 5a passing thereunder. Next, the second base member 5a on which the ionizing ray curable resin 44 is applied is transported to the laminate rolls. On the other hand, the optical layer 9 provided with a reflective layer is fed from an optical layer supply roll (not shown) towards the laminate rolls 41 and 42.

Next, the second base member 5a and the optical layer 9 provided with a reflective layer, which are transported, are held between the laminate rolls 41 and 42 so that air bubbles are not trapped between the second base member 5a and the optical layer 9 provided with a reflective layer, and the optical layer 9 provided with a reflective layer is laminated on the second base member 5a. Next, while the second base member 5a on which the optical layer 9 provided with a reflective layer is laminated is transported along a peripheral surface of the laminate roll 41, the ionizing ray curable resin 44 is cured by irradiation of ionizing rays from a second base member 5a side using the irradiation device 46. Accordingly, the second base member 5a and the optical layer 9 provided with a reflective layer are adhered to each other with the ionizing ray curable resin 44 interposed therebetween, so that the targeted long optical film 1 is formed. Next, the belt-shaped optical film 1 thus formed is wound by a winding roll (not shown). As a result, an original fabric formed by winding the belt-shaped optical film 1 is obtained.

When the process temperature for forming the above second optical layer is set to t° C., the cured first optical layer 4 preferably has a storage modulus of 3×107 Pa or more at (t−20)° C. In this case, the process temperature t indicates, for example, a heating temperature of the laminate roll 41. Since the first optical layer 4 is provided, for example, on the first base member 4a and is transported along the laminate roll 41 with the first base member 4a interposed therebetween, it is experientially understood that the temperature actually applied to the first optical layer 4 is approximately (t−20)° C. Therefore, when the storage modulus at (t−20)° C. of the first optical layer 4 is set to 3×107 Pa or more, the concavo-convex shape of the interface inside the optical layer can be suppressed from deformation caused by heating with or without pressure application.

In addition, the first optical layer 4 preferably has a storage modulus of 3×109 Pa or less at 25° C. Accordingly, flexibility can be imparted to the optical film at room temperature. Therefore, the optical film 1 can be formed by a manufacturing process, such as a roll-to-roll process.

In consideration of the heat resistances of resins used for the optical layer and the base members, the process temperature t is preferably 200° C. or less. However, when a resin having high heat resistance is used, the process temperature t may be set to 200° C. or more.

[Setting of Thickness of Reflective Layer]

As described above, the blueness index value and the redness index value indicating the color tones of blueness and redness, respectively, change in accordance with the film thicknesses of the individual layers of the laminated film of the reflective layer 3. Hence, in this embodiment, by using the blueness index value and the redness index value as parameters, the film thickness of the laminated film is set so as to satisfy the conditions of the parameters.

In addition, in this example, besides the blueness index and the redness index, the film thickness of the laminated film is set by using the visible light transmittance and the shielding factor as the parameters. The visible light transmittance is a parameter indicating the transmittance of light and is preferably 70% or more. The shielding factor is a parameter indicating the efficiency of shielding heat and is preferably 0.6 or less. As in the case of the blueness index and the redness index, the visible light transmittance and the shielding factor also change in accordance with the film thickness of the laminated film.

The film thicknesses of the individual layers of the laminated film which satisfy the condition of each parameter can be calculated, for example, by simulation. The film thicknesses which satisfy the condition of each parameter can be set, for example, when the distribution of each parameter with respect to the film thickness is obtained by the simulation.

When the simulation is carried out, a ratio α and a ratio β which are determined in accordance with the film thicknesses of the individual layers of the laminated film of the reflective layer 3 are used. The ratio α indicates the ratio of the optical film thickness of the entire metal layers to that of the entire high refractive-index layers. The ratio β indicates the ratio of the optical film thickness of the third high refractive-index layer to that of the first high refractive-index layer. Incidentally, the optical film thickness indicates a film thickness obtained by multiplying the refractive index and the geometric film thickness.

When the optical film thicknesses of the first and the fifth high refractive-index layers are each represented by X1, the optical film thickness of the third high refractive-index layer is represented by X2, and the optical film thicknesses of the second and the fourth metal layers are each represented by Y, a total film thickness L in terms of the optical film thickness, the ratio α, and the ratio β are calculated by the following formulas (2) to (4).

$$L = X1 + Y + X2 + Y + X1 \tag{2}$$

$$\alpha = 2Y/(2X1 + X2) \tag{3}$$

$$\beta = X2/X1 \tag{4}$$

When the total film thickness L, the ratio α, and the ratio β are obtained based on formulas (2) to (4), the film thicknesses of the individual layers of the laminated film of the reflective layer 3 which satisfy the condition of each parameter can be set.

Figure 14:
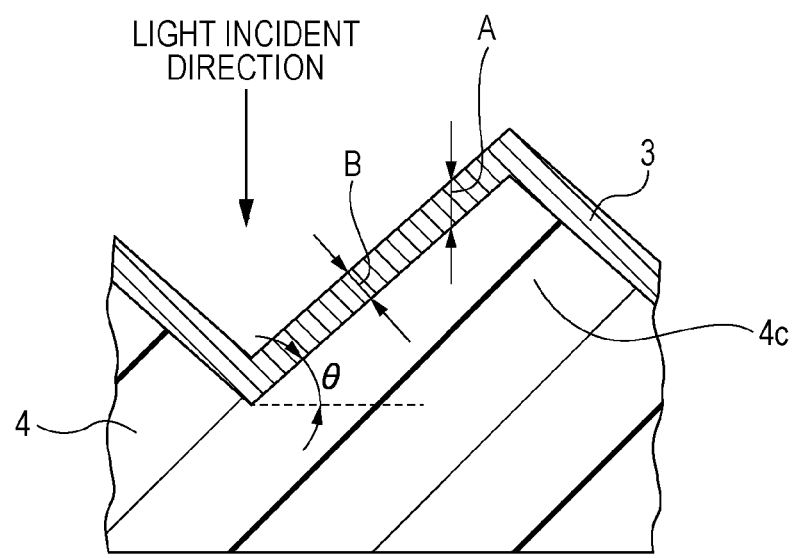
FIG. 14 is a cross-sectional view illustrating the film thickness of a reflective layer.

In this embodiment, as shown in FIG. 14, the direction perpendicular to an inclined surface of the structure 4c formed in the first optical layer 4 is defined as a thickness direction of the laminated film of the reflective layer 3. When the angle of the inclined surface of the structure 4c to the primary surface of the first optical layer 4 is represented by θ, between a film thickness A in a direction perpendicular to the primary surface of the first optical layer 4 and a film thickness B in a direction perpendicular to the inclined surface of the structure 4c, the relationship of "A=B/cos θ" holds. For example, when the angle θ of the inclined surface of the structure 4c is 54°, "A≈1.7B" holds.

Figure 15:
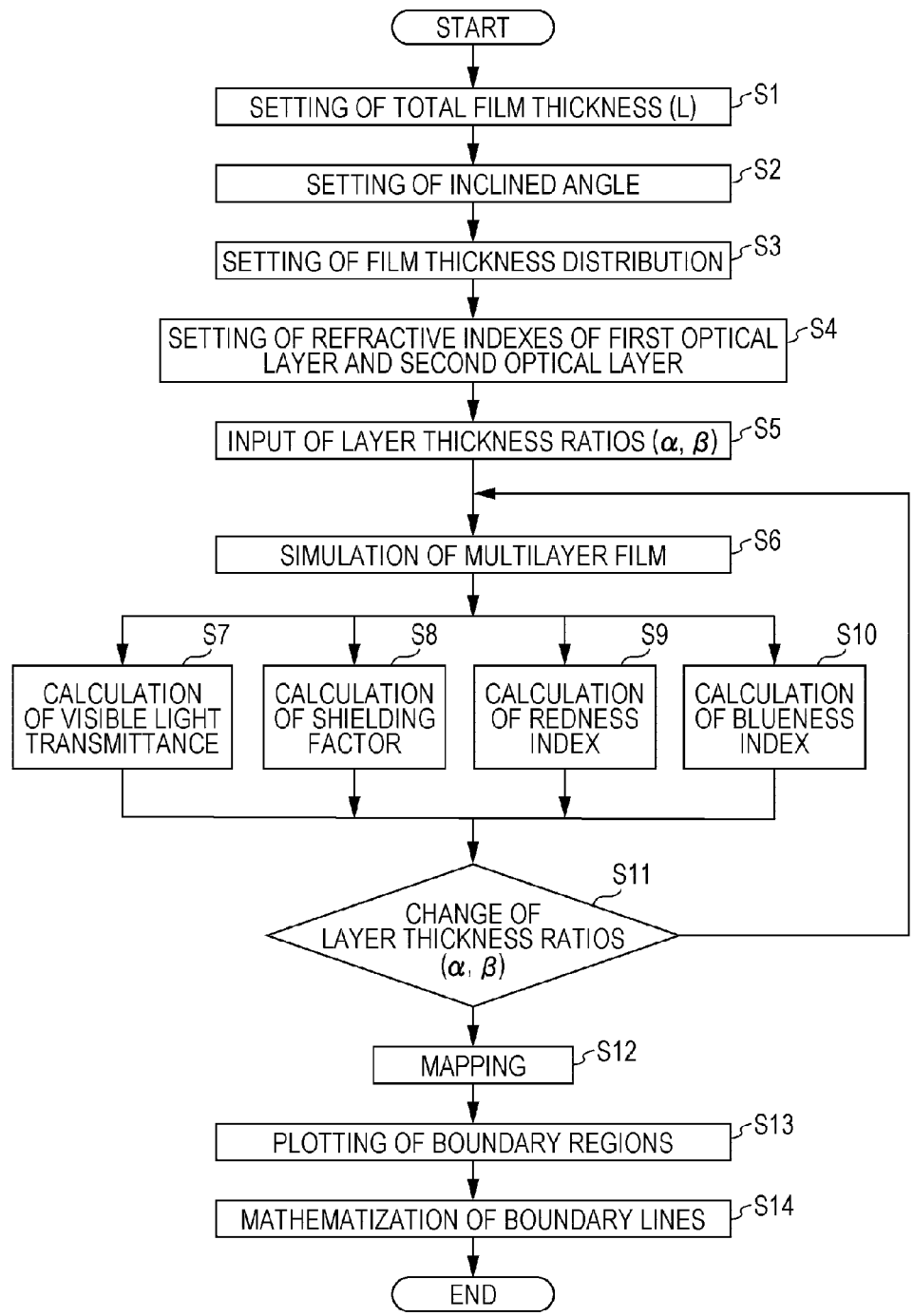
FIG. 15 is a flowchart showing one example of a process to determine film thicknesses which satisfy the conditions of individual parameters.

One example of a process flow to determine the film thicknesses which satisfy the condition of each parameter will be described with reference to a flowchart shown in FIG. 15. First, in order to perform the simulation in the case in which the film thicknesses of the individual layers of the laminated film of the reflective layer 3 are changed, the conditions shown in Steps S1 to S5 are set. In Step S1, the total film thickness L of the laminated film is set. In Step S2, the inclined angle of the shape of the laminated film is set. In Step S3, the thickness distribution of the individual layers of the laminated film is set. In step S4, the refractive indexes of the first optical layer (shaped layer) and the second optical layer (embedding layer) are set. In Step S5, the ratio α and the ratio β are inputted.

In Step S6, the simulation is performed based on the conditions set in Steps S1 to S5, and the value of each parameter at the set ratio α and ratio β is calculated. In Step S7, the visible light transmittance at the set ratio α and ratio β is calculated. In Step S8, the shielding factor at the set ratio α and ratio β is calculated. In step S9, the blueness index at the set ratio α and ratio β is calculated. In Step S10, the redness index at the set ratio α and ratio β is calculated.

In Step S11, by changing the ratio α and the ratio β, the film thicknesses of the individual layers are changed, and the simulation of Steps S6 to S10 are repeatedly performed, so that the value of each parameter is calculated.

Figure 16A:
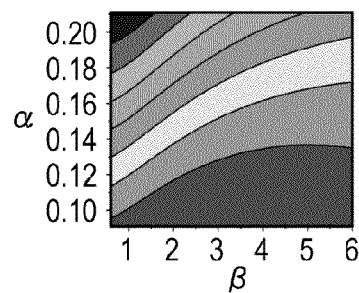
FIG. 16A is an $\alpha$-$\beta$ correlation diagram showing the distribution of a visible light transmittance with respect to a ratio $\alpha$ and a ratio $\beta$.
Figure 16B:
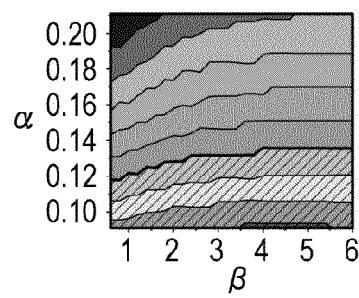
FIG. 16B is an $\alpha$-$\beta$ correlation diagram showing the distribution of a shielding factor with respect to the ratio $\alpha$ and the ratio $\beta$.
Figure 16C:
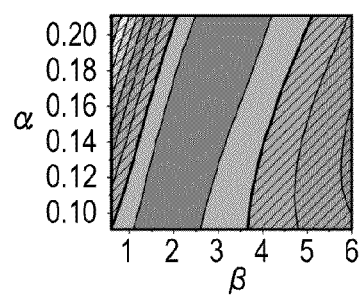
FIG. 16C is an $\alpha$-$\beta$ correlation diagram showing the distribution of a blueness index with respect to the ratio $\alpha$ and the ratio $\beta$.
Figure 16D:
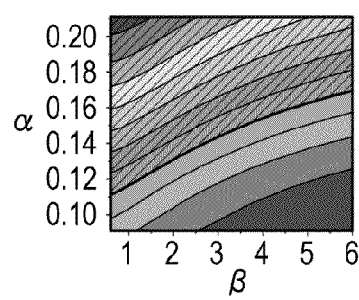
FIG. 16D is an $\alpha$-$\beta$ correlation diagram showing the distribution of a redness index with respect to the ratio $\alpha$ and the ratio $\beta$.

In Step S12, the values of each parameter calculated in Steps S7 to S10 are mapped on an α-β plane, and as shown in FIGS. 16A to 16D, the α-β correlation diagram showing the distribution of each parameter to the ratio α and the ratio β is formed. FIG. 16A shows the distribution of the visible light transmittance to the ratio α and the ratio β. FIG. 16B shows the distribution of the shielding factor to the ratio α and the ratio β. FIG. 16C shows the distribution of the blueness index to the ratio α and the ratio β. FIG. 16D shows the distribution of the redness index to the ratio α and the ratio β.

Next, in Step S13, a region which satisfies the condition of each parameter is extracted based on the α-β correlation diagram for each parameter shown in each of FIGS. 16A to 16D. In FIG. 16B, a region shown by hatching indicates a region in which the condition of the shielding factor is not satisfied. In FIG. 16C, a region shown by hatching indicates a region in which the condition of the blueness index is not satisfied. In FIG. 16D, a region shown by hatching indicates a region in which the condition of the redness index is not satisfied.

Figure 16E:
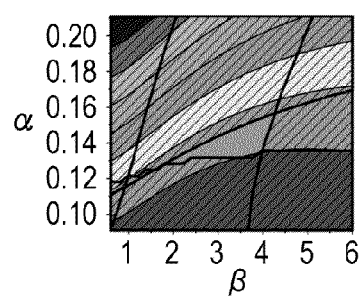
FIG. 16E shows the state in which the $\alpha$-$\beta$ correlation diagrams shown in FIGS. 16A to 16D are overlapped with each other.

When the α-β correlation diagrams thus formed shown in FIGS. 16A to 16D are overlapped with each other, a region in which the conditions of all the parameters are satisfied is extracted. FIG. 16E shows the state in which the α-β correlation diagrams shown in FIGS. 16A to 16D are overlapped with each other. In FIG. 16E, a region other than the regions shown by hatching is extracted. This region is a region which satisfies all the conditions of the parameters. That is, the region which satisfies the condition of each parameter is a region surrounded by boundary lines between a region in which the condition of each parameter is satisfied and a region in which the condition of each parameter is not satisfied.

The boundary line is mathematized in Step S14. For example, predetermined values on the boundary line are extracted, and an approximated curve of the boundary line between the region in which the condition of each parameter is satisfied and the region in which the condition of each parameter is not satisfied is obtained based on these values, and the boundary line is mathematized. Accordingly, the region in which the condition of each parameter is satisfied can be determined.

The region in which the condition of each parameter is satisfied with respect to the ratio α and the ratio β will be particularly described. First, the case in which the visible light transmittance, the blueness index, and the redness index are used as the parameters will be described for respective total film thicknesses L of the reflective layer 3.

(L=80 nm)

Figure 17:
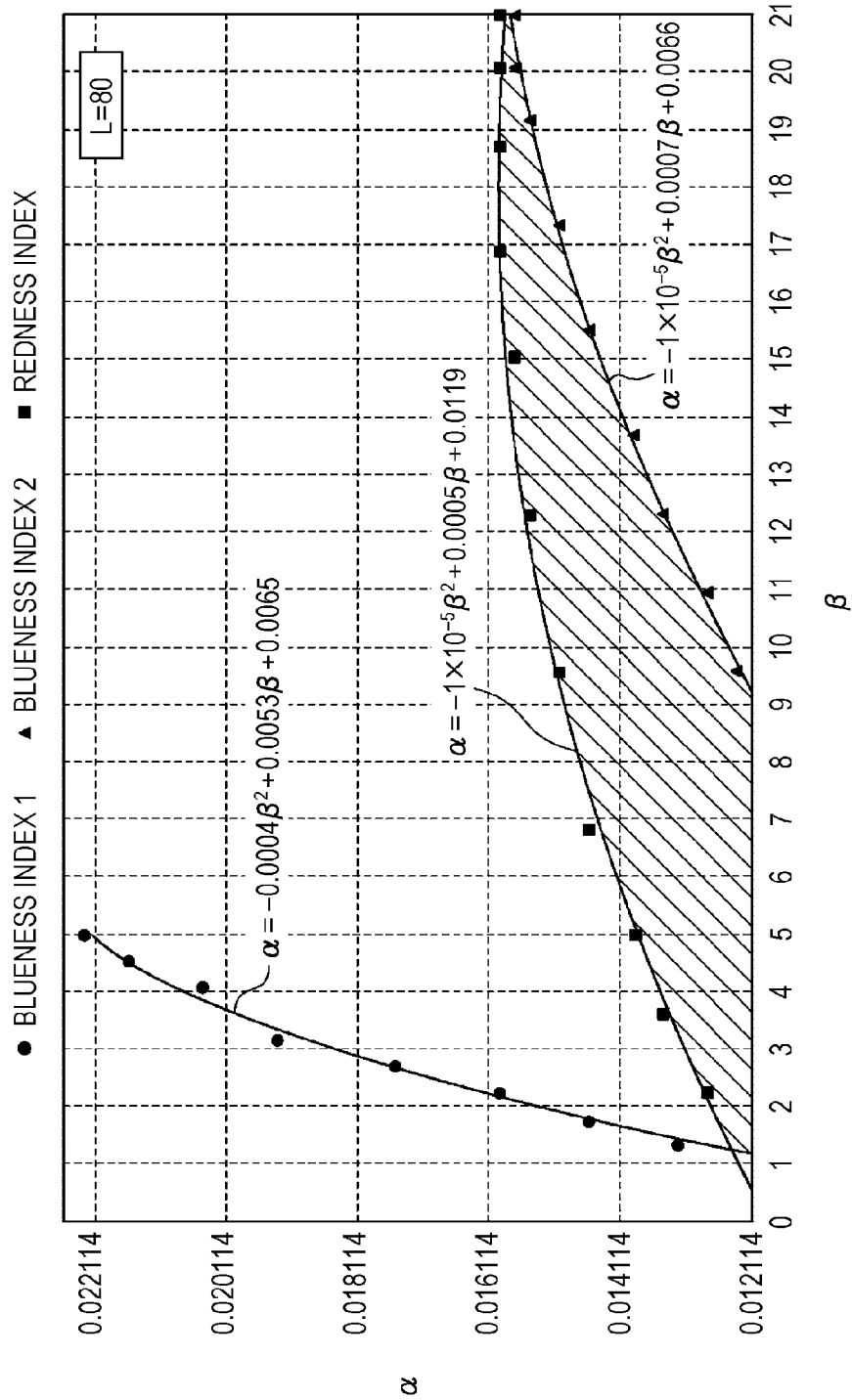
FIG. 17 is an $\alpha$-$\beta$ correlation diagram in which the visible light transmittance, the blueness index, and the redness index are each used as the parameter when the total film thickness L is 80 nm.

FIG. 17 shows an α-β correlation diagram based on the conditions of the visible light transmittance, the blueness index, and the redness index at a total film thickness L of 80 nm. In FIG. 17, a point "●" and a point "▲" each indicate a predetermined point on the boundary line between a region in which the condition of the blueness index is satisfied and a region in which the condition of the blueness index is not satisfied. A Point "■" indicates a predetermined point on the boundary line between a region in which the condition of the redness index is satisfied and a region in which the condition of the redness index is not satisfied. In FIG. 17, since predetermined points (α, β) on the boundary line between a region in which the condition of the visible light transmittance is satisfied and a region in which the condition of the visible light transmittance is not satisfied are outside the region shown by hatching, the points are not shown in the figure. In FIGS. 18 to 30 which will be described below, the above points also have the same meanings as those described above.

Based on the points on the boundary lines of the individual parameters plotted in the α-β correlation diagram, the approximated curves of the boundary lines of the individual parameters shown by the following formulas (5) to (7) are obtained.

$$\alpha = -0.0004\beta^2 + 0.0053\beta + 0.0065 \quad (5)$$

$$\alpha = -1 \times 10^{-5}\beta^2 + 0.0007\beta + 0.0066 \quad (6)$$

$$\alpha = -1 \times 10^{-5}\beta^2 + 0.0005\beta + 0.0119 \quad (7)$$

In this case, a region shown by hatching which is surrounded by the approximated curves shown by formulas (5) to (7) and a straight line shown by the following formula (8) is a region in which the conditions of the individual parameters are satisfied. The formula (8) is set in order to prevent the thickness of the metal layer from being decreased to 5 nm or less. The reason for this is that when the film thickness of the metals layer is 5 nm or less, the properties of a material used for the metal layer are changed and may be deviated from the simulation value with a high probability.

$$\alpha = 0.012114 \quad (8)$$

(L=90 nm)

Figure 18:
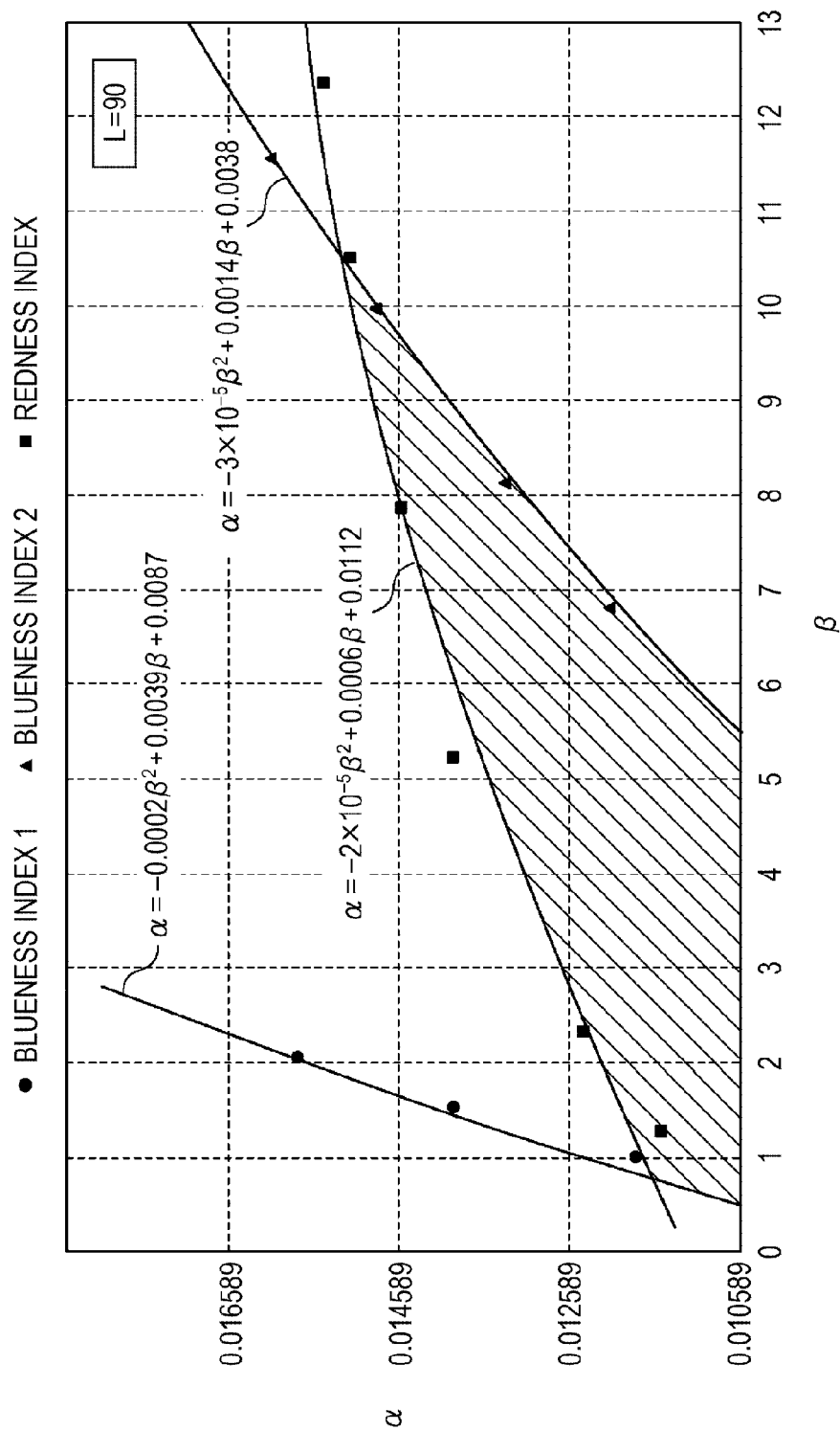
FIG. 18 is an $\alpha$-$\beta$ correlation diagram in which the visible light transmittance, the blueness index, and the redness index are each used as the parameter when the total film thickness L is 90 nm.

FIG. 18 shows an α-β correlation diagram based on the conditions of the visible light transmittance, the blueness index, and the redness index at a total film thickness L of 90 nm. In addition, in FIG. 18, since predetermined points (α, β) on the boundary line between a region in which the condition of the visible light transmittance is satisfied and a region in which the condition of the visible light transmittance is not satisfied are outside the region shown by hatching, the points are not shown in the figure. Based on the points on the boundary lines of the individual parameters plotted in the α-β correlation diagram, the approximated curves of the boundary lines of the individual parameters shown by the following formulas (9) to (11) are obtained.

$$\alpha = -0.0002\beta^2 + 0.0039\beta + 0.0087 \quad (9)$$

$$\alpha = -3 \times 10^{-5}\beta^2 + 0.0014\beta + 0.0038 \quad (10)$$

$$\alpha = -2 \times 10^{-5}\beta^2 + 0.0006\beta + 0.0112 \quad (11)$$

In this case, a region shown by hatching which is surrounded by the approximated curves shown by formulas (9) to (11) and a straight line shown by the following formula (12) is a region in which the conditions of the individual parameters are satisfied. The formula (12) is set in order to prevent the thickness of the metal layer from being decreased to 5 nm or less.

$$\alpha = 0.010589 \quad (12)$$

(L=100 nm)

Figure 19:
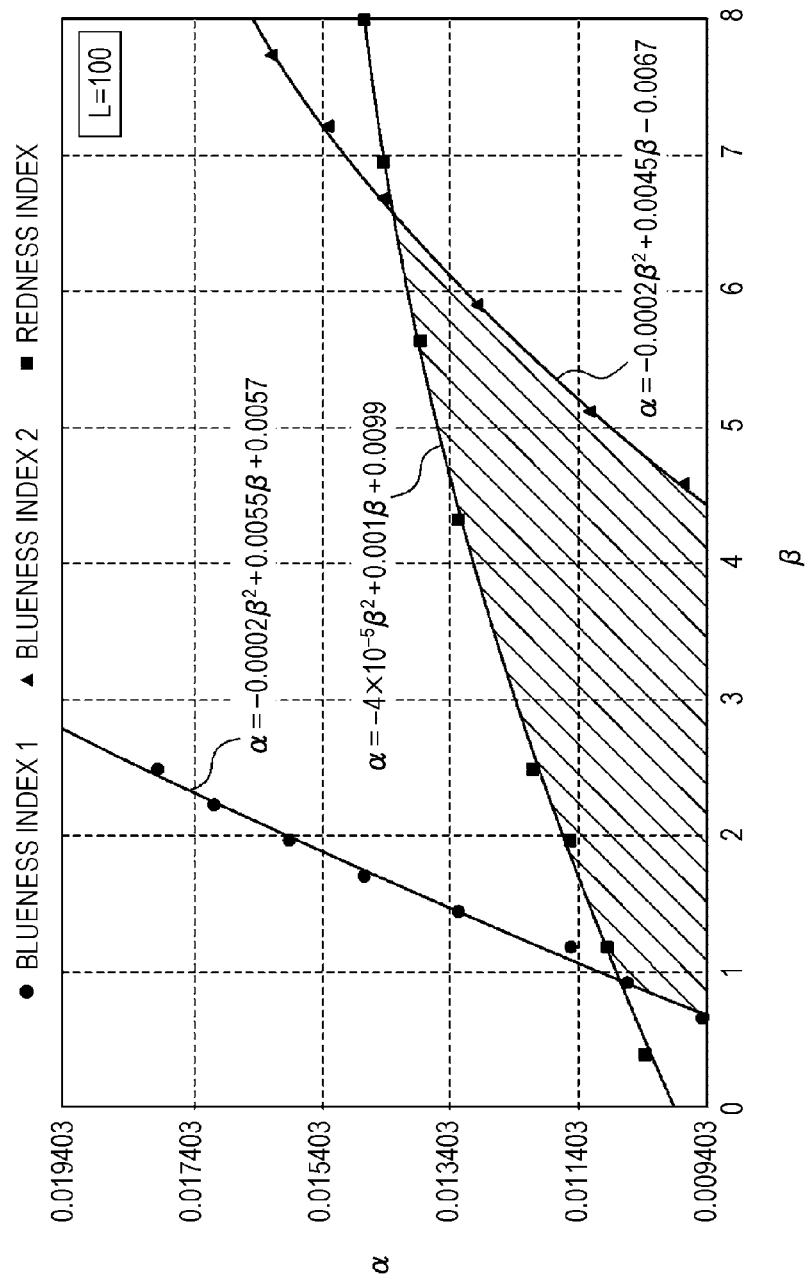
FIG. 19 is an $\alpha$-$\beta$ correlation diagram in which the visible light transmittance, the blueness index, and the redness index are each used as the parameter when the total film thickness L is 100 nm.

FIG. 19 shows an α-β correlation diagram based on the conditions of the visible light transmittance, the blueness index, and the redness index at a total film thickness L of 100 nm. In addition, in FIG. 19, since predetermined points (α, β) on the boundary line between a region in which the condition of the visible light transmittance is satisfied and a region in which the condition of the visible light transmittance is not satisfied are outside the region shown by hatching, the points are not shown in the figure. Based on the points on the boundary lines of the individual parameters plotted in the α-β correlation diagram, the approximated curves of the boundary lines of the individual parameters shown by the following formulas (13) to (15) are obtained.

$$\alpha = -0.0002\beta^2 + 0.0055\beta + 0.0057 \quad (13)$$

$$\alpha = -0.0002\beta^2 + 0.0045\beta - 0.0067 \quad (14)$$

$$\alpha = -4 \times 10^{-5}\beta^2 + 0.001\beta + 0.0099 \quad (15)$$

In this case, a region shown by hatching which is surrounded by the approximated curves shown by formulas (13) to (15) and a straight line shown by the following formula (16) is a region in which the conditions of the individual parameters are satisfied. The formula (16) is set in order to prevent the thickness of the metal layer from being decreased to 5 nm or less.

$$\alpha = 0.009403 \quad (16)$$

$(L=120 \text{ nm})$

Figure 20:
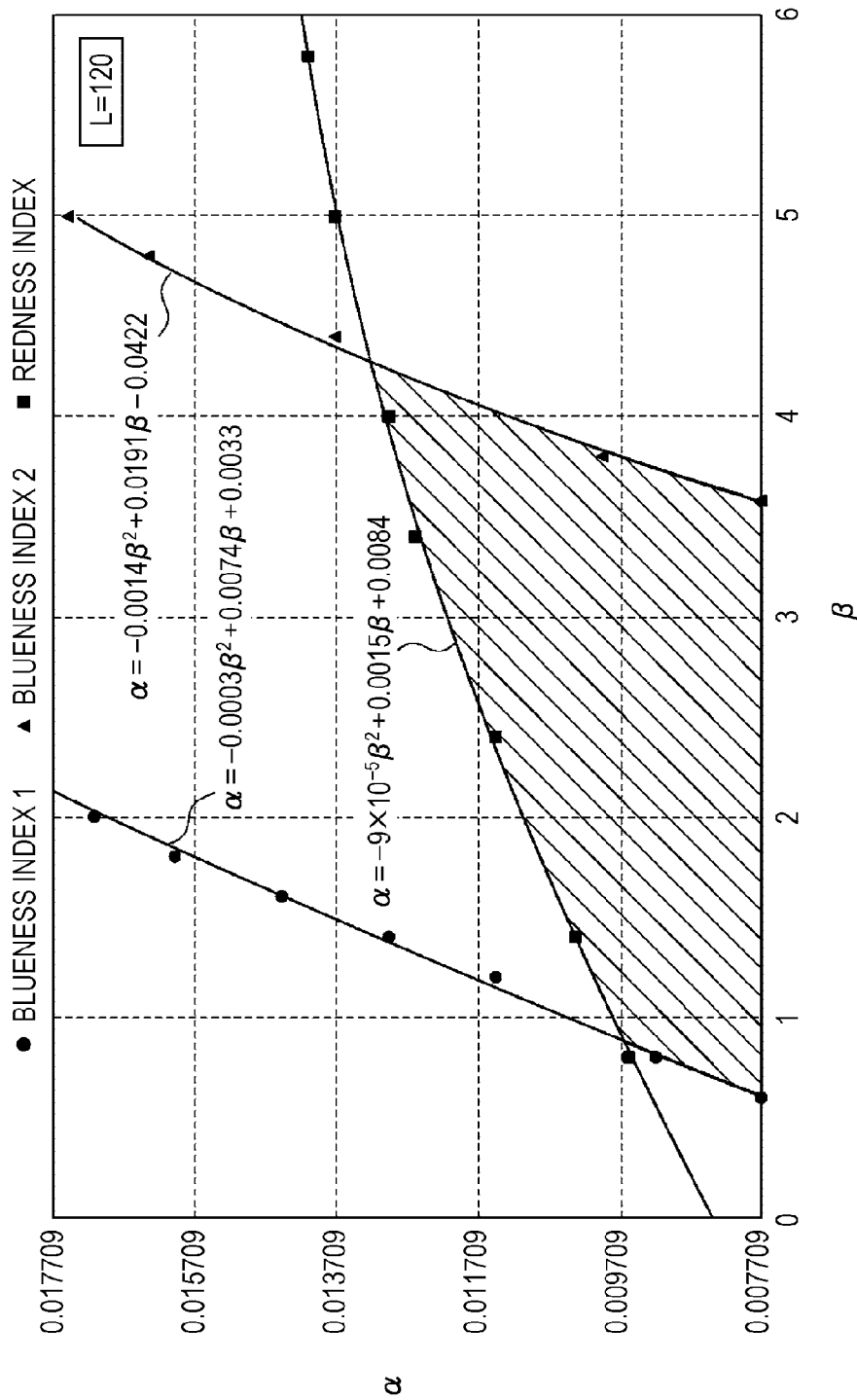
FIG. 20 is an $\alpha$-$\beta$ correlation diagram in which the visible light transmittance, the blueness index, and the redness index are each used as the parameter when the total film thickness L is 120 nm.

FIG. 20 shows an $\alpha$-$\beta$ correlation diagram based on the conditions of the visible light transmittance, the blueness index, and the redness index at a total film thickness L of 120 nm. In addition, in FIG. 20, since predetermined points ($\alpha$, $\beta$) on the boundary line between a region in which the condition of the visible light transmittance is satisfied and a region in which the condition of the visible light transmittance is not satisfied are outside the region shown by hatching, the points are not shown in the figure. Based on the points on the boundary lines of the individual parameters plotted in the $\alpha$-$\beta$ correlation diagram, the approximated curves of the boundary lines of the individual parameters shown by the following formulas (17) to (19) are obtained.

$$\alpha = -0.0003\beta^2 + 0.0074\beta + 0.0033 \quad (17)$$

$$\alpha = -0.0014\beta^2 + 0.0191\beta - 0.0422 \quad (18)$$

$$\alpha = -9 \times 10^{-5}\beta^2 + 0.0015\beta + 0.0084 \quad (19)$$

In this case, a region shown by hatching which is surrounded by the approximated curves shown by formulas (17) to (19) and a straight line shown by the following formula (20) is a region in which the conditions of the individual parameters are satisfied. The formula (20) is set in order to prevent the thickness of the metal layer from being decreased to 5 nm or less.

$$\alpha = 0.007709 \quad (20)$$

$(L=140 \text{ nm})$

Figure 21:
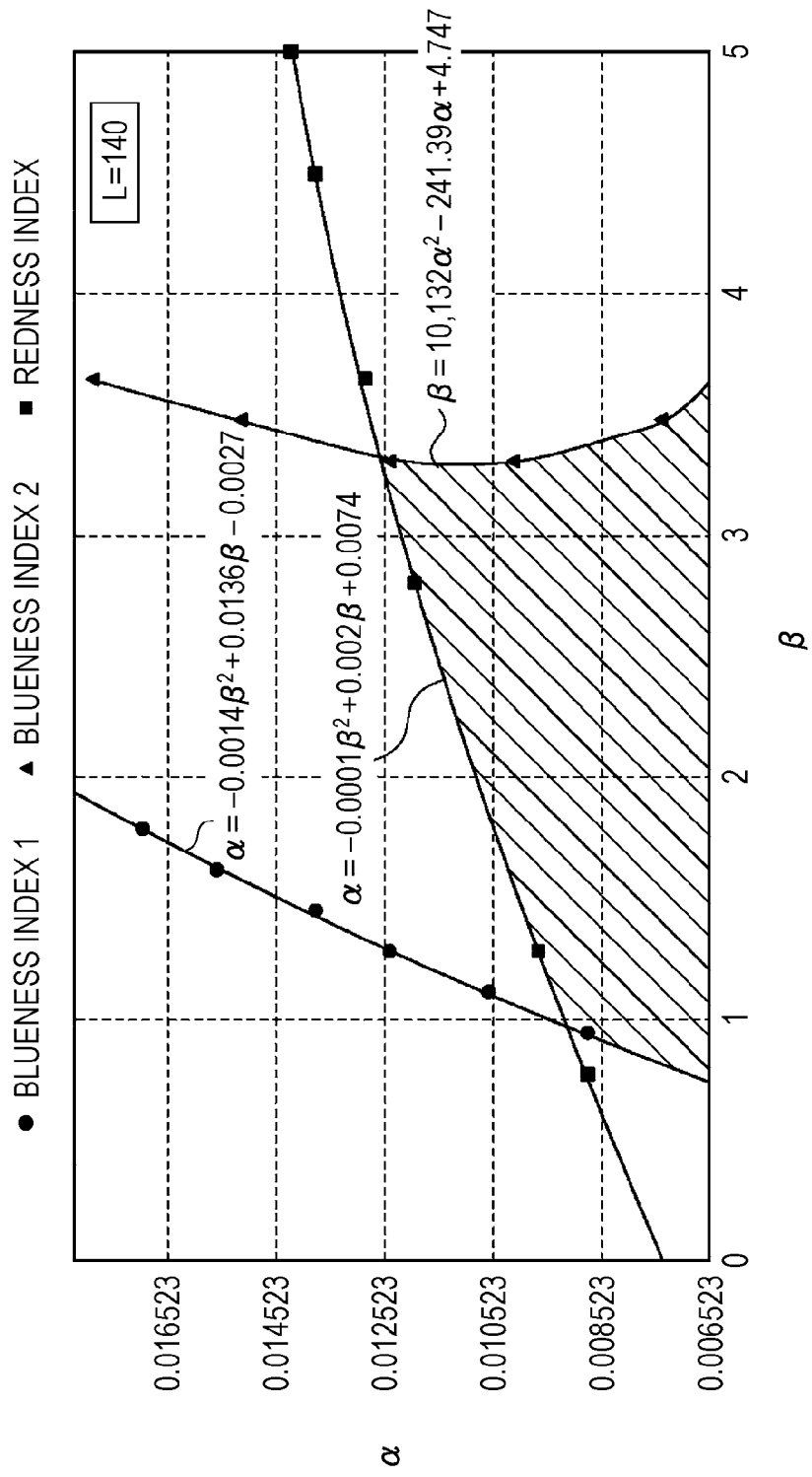
FIG. 21 is an $\alpha$-$\beta$ correlation diagram in which the visible light transmittance, the blueness index, and the redness index are each used as the parameter when the total film thickness L is 140 nm.

FIG. 21 shows an $\alpha$-$\beta$ correlation diagram based on the conditions of the visible light transmittance, the blueness index, and the redness index at a total film thickness L of 140 nm. In addition, in FIG. 21, since predetermined points ($\alpha$, $\beta$) on the boundary line between a region in which the condition of the visible light transmittance is satisfied and a region in which the condition of the visible light transmittance is not satisfied are outside the region shown by hatching, the points are not shown in the figure. Based on the points on the boundary lines of the individual parameters plotted in the $\alpha$-$\beta$ correlation diagram, the approximated curves of the boundary lines of the individual parameters shown by the following formulas (21) to (23) are obtained.

$$\alpha = -0.0014\beta^2 + 0.0136\beta - 0.0027 \quad (21)$$

$$\beta = 10{,}132\alpha^2 - 241.39\alpha + 4.747 \quad (22)$$

$$\alpha = -0.0001\beta^2 + 0.002\beta + 0.0074 \quad (23)$$

In this case, a region shown by hatching which is surrounded by the approximated curves shown by formulas (21) to (23) and a straight line shown by the following formula (24) is a region in which the conditions of the individual parameters are satisfied. The formula (24) is set in order to prevent the thickness of the metal layer from being decreased to 5 nm or less.

$$\alpha = 0.006523 \quad (24)$$

$(L=160 \text{ nm})$

Figure 22:
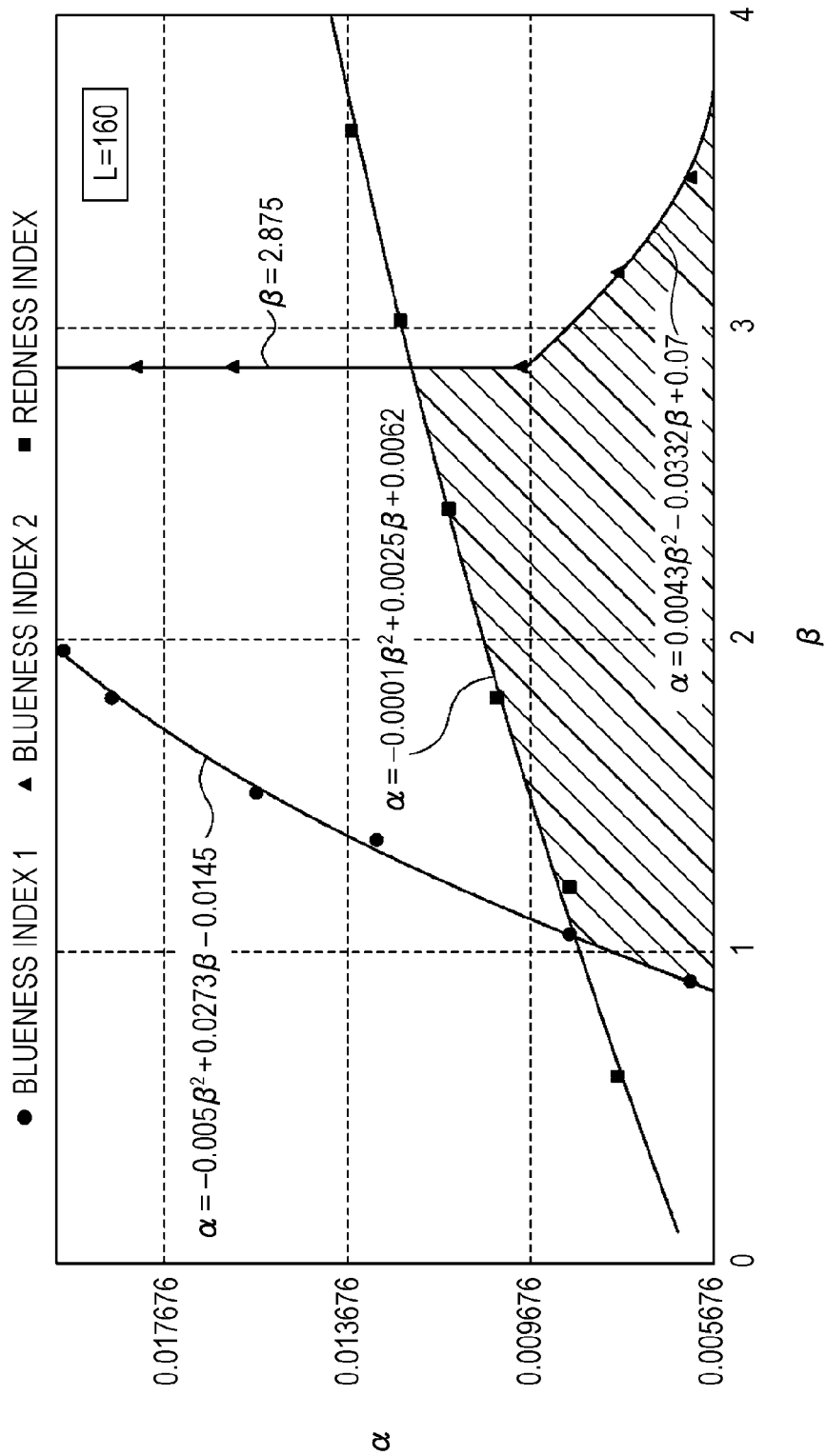
FIG. 22 is an $\alpha$-$\beta$ correlation diagram in which the visible light transmittance, the blueness index, and the redness index are each used as the parameter when the total film thickness L is 160 nm.

FIG. 22 shows an $\alpha$-$\beta$ correlation diagram based on the conditions of the visible light transmittance, the blueness index, and the redness index at a total film thickness L of 160 nm. In addition, in FIG. 22, since predetermined points ($\alpha$, $\beta$) on the boundary line between a region in which the condition of the visible light transmittance is satisfied and a region in which the condition of the visible light transmittance is not satisfied are outside the region shown by hatching, the points are not shown in the figure. Based on the points on the boundary lines of the individual parameters plotted in the $\alpha$-$\beta$ correlation diagram, the approximated curves of the boundary lines of the individual parameters shown by the following formulas (25) to (28) are obtained.

$$\alpha = -0.005\beta^2 + 0.0273\beta - 0.0145 \quad (25)$$

$$\alpha = 0.0043\beta^2 - 0.0332\beta + 0.07 \quad (26)$$

$$\beta = 2.875 \quad (27)$$

$$\alpha = -0.0001\beta^2 + 0.0025\beta + 0.0062 \quad (28)$$

In this case, a region shown by hatching which is surrounded by the approximated curves shown by formulas (25) to (28) and a straight line shown by the following formula (29) is a region in which the conditions of the individual parameters are satisfied. The formula (29) is set in order to prevent the thickness of the metal layer from being decreased to 5 nm or less.

$$\alpha = 0.005676 \quad (29)$$

$(L=180 \text{ nm})$

Figure 23:
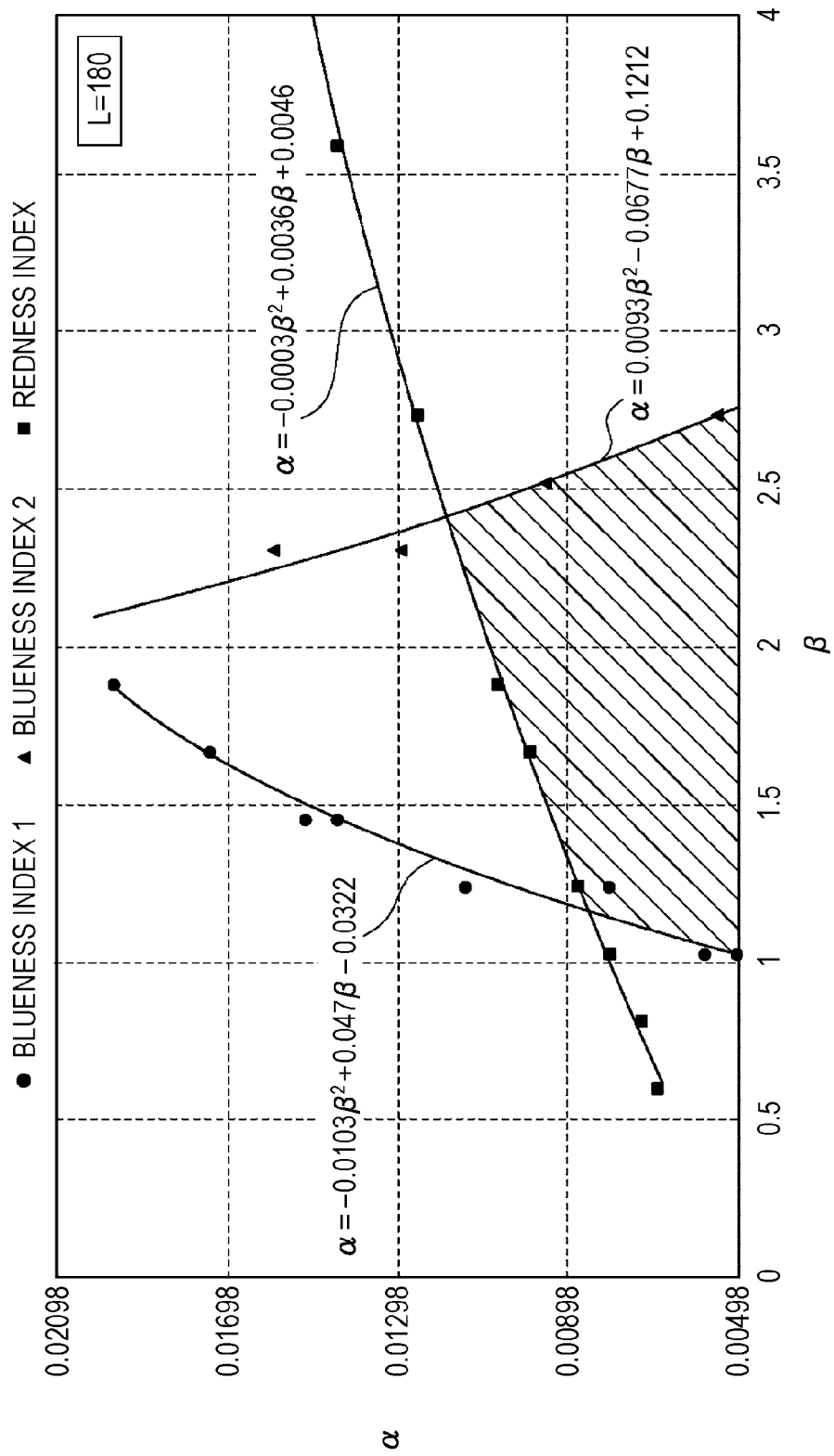
FIG. 23 is an $\alpha$-$\beta$ correlation diagram in which the visible light transmittance, the blueness index, and the redness index are each used as the parameter when the total film thickness L is 180 nm.

FIG. 23 shows an $\alpha$-$\beta$ correlation diagram based on the conditions of the visible light transmittance, the blueness index, and the redness index at a total film thickness L of 180 nm. In addition, in FIG. 23, since predetermined points ($\alpha$, $\beta$) on the boundary line between a region in which the condition of the visible light transmittance is satisfied and a region in which the condition of the visible light transmittance is not satisfied are outside the region shown by hatching, the points are not shown in the figure. Based on the points on the boundary lines of the individual parameters plotted in the $\alpha$-$\beta$ correlation diagram, the approximated curves of the boundary lines of the individual parameters shown by the following formulas (30) to (32) are obtained.

$$\alpha = -0.0103\beta^2 + 0.047\beta - 0.0322 \quad (30)$$

$$\alpha = 0.0093\beta^2 - 0.0677\beta + 0.1212 \quad (31)$$

$$\alpha = -0.0003\beta^2 + 0.0036\beta + 0.0046 \quad (32)$$

In this case, a region shown by hatching which is surrounded by the approximated curves shown by formulas (30) to (32) and a straight line shown by the following formula (33) is a region in which the conditions of the individual parameters are satisfied. The formula (33) is set in order to prevent the thickness of the metal layer from being decreased to 5 nm or less.

$$\alpha = 0.00498 \quad (33)$$

Next, besides the above visible light transmittance, blueness index, and redness index, the case in which the shielding factor is used as the parameter will be described for respective total film thicknesses L of the reflective layer 3.

$(L=80 \text{ nm})$

Figure 24:
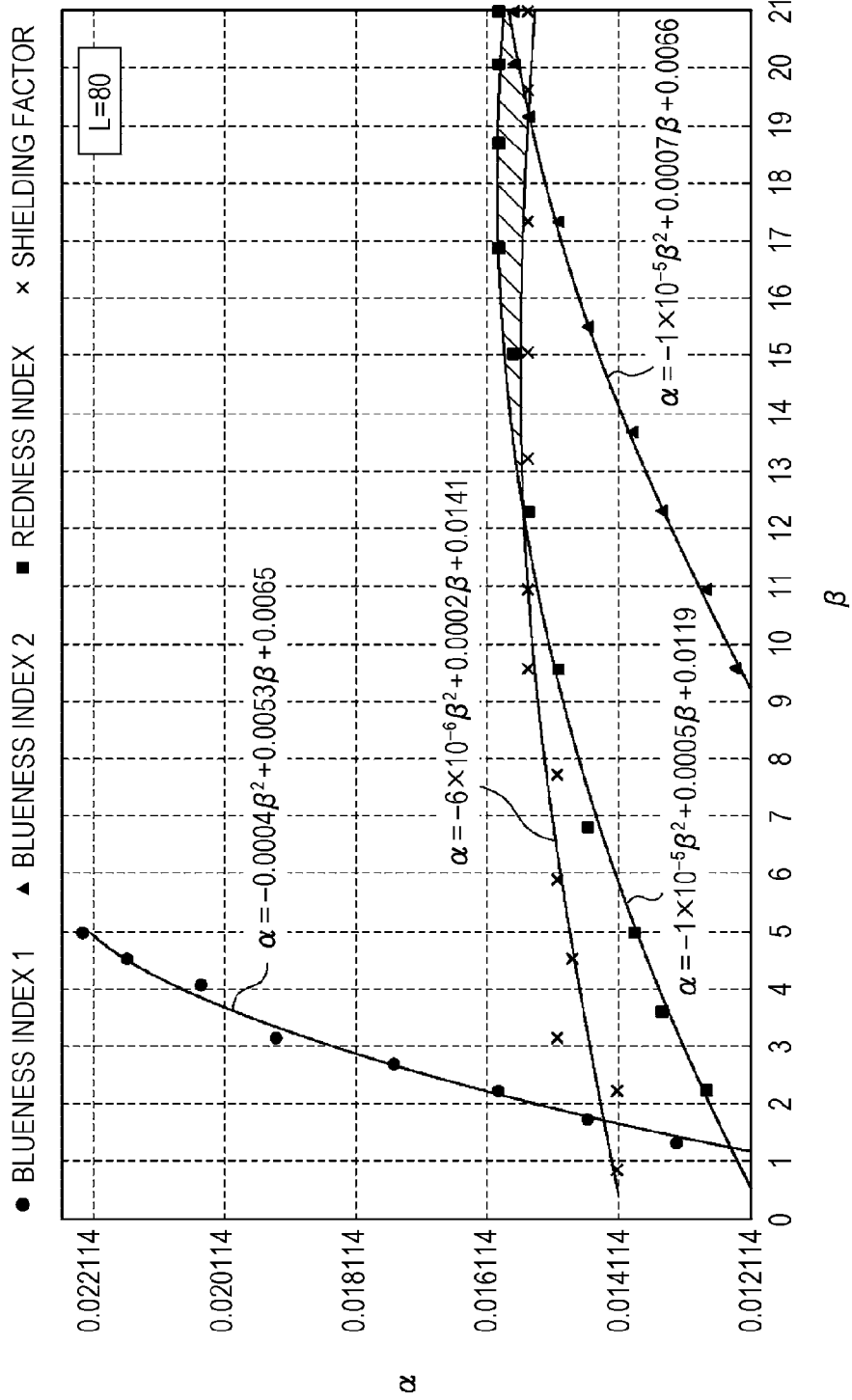
FIG. 24 is an $\alpha$-$\beta$ correlation diagram in which the visible light transmittance, the blueness index, the redness index, and the shielding factor are each used as the parameter when the total film thickness L is 80 nm.

FIG. 24 shows an $\alpha$-$\beta$ correlation diagram based on the conditions of the visible light transmittance, the blueness index, the redness index, and the shielding factor at a total film thickness L of 80 nm. In FIG. 24, a point "x" indicates a predetermined point on the boundary line between a region in which the condition of the shielding factor is satisfied and a region in which the condition of the shielding factor is not satisfied. In FIG. 24, since predetermined points (α, β) on the boundary line between a region in which the condition of the visible light transmittance is satisfied and a region in which the condition of the visible light transmittance is not satisfied are outside the region shown by hatching, the points are not shown in the figure. In FIGS. 25 to 30 which will be described below, the above point also has the same meaning as that described above.

In addition to the approximated curves of the boundary lines shown by formulas (5) to (7), based on the points on the boundary line of the shielding factor plotted in the α-β correlation diagram, the approximated curve of the boundary line shown by the following formula (34) is obtained.

$$\alpha = -6 \times 10^{-6} \beta^2 + 0.0002\beta + 0.0141 \qquad (34)$$

In this case, a region shown by hatching which is surrounded by the approximated curves shown by formulas (5) to (7) and formula (34) is a region in which the conditions of all the parameters are satisfied.

(L=90 nm)

Figure 25:
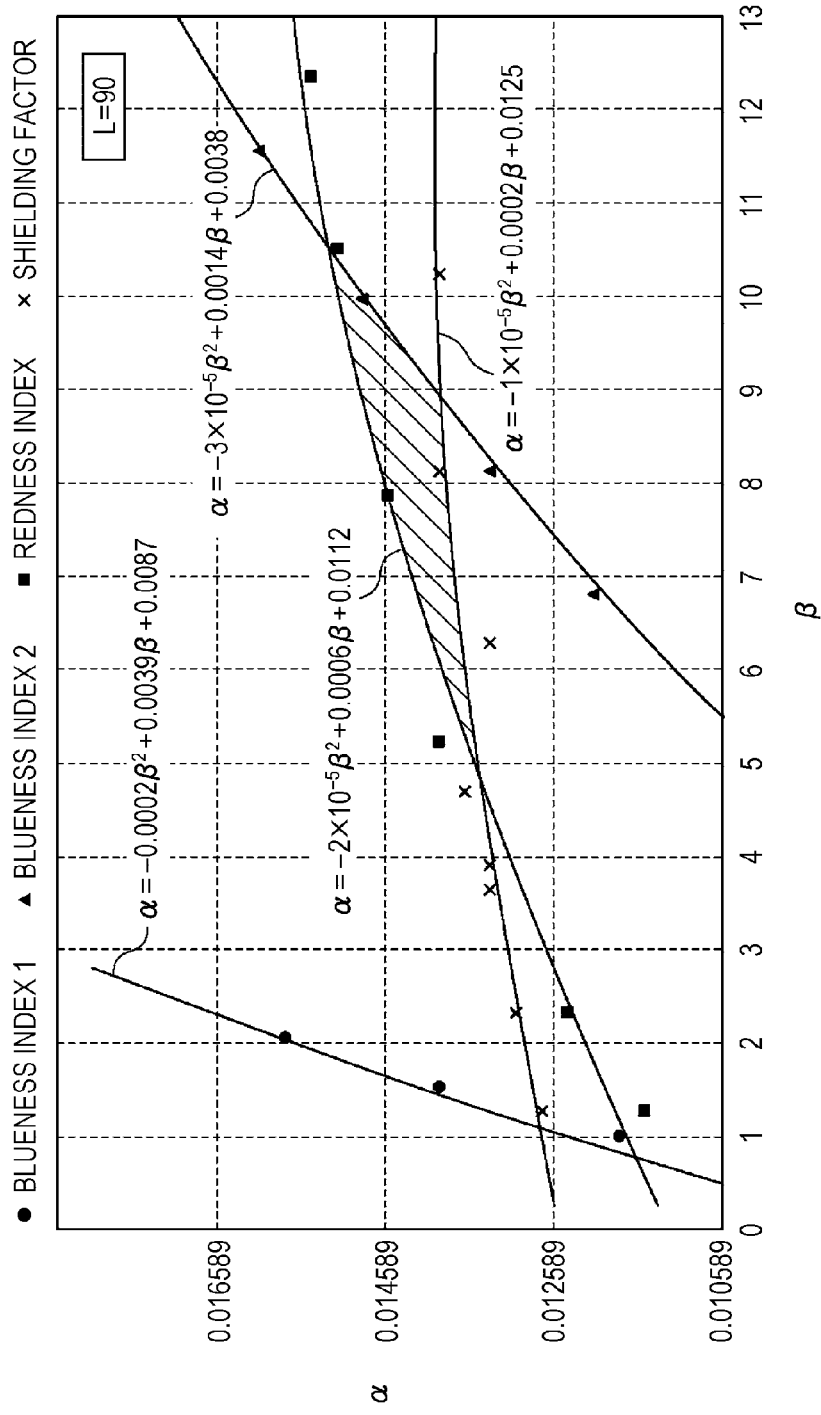
FIG. 25 is an $\alpha$-$\beta$ correlation diagram in which the visible light transmittance, the blueness index, the redness index, and the shielding factor are each used as the parameter when the total film thickness L is 90 nm.

FIG. 25 shows an α-β correlation diagram based on the conditions of the visible light transmittance, the blueness index, the redness index, and the shielding factor at a total film thickness L of 90 nm. In addition, in FIG. 25, since predetermined points (α, β) on the boundary line between a region in which the condition of the visible light transmittance is satisfied and a region in which the condition of the visible light transmittance is not satisfied are outside the region shown by hatching, the points are not shown in the figure. In addition to the approximated curves of the boundary lines shown by formulas (9) to (11), based on the points on the boundary line of the shielding factor plotted in the α-β correlation diagram, the approximated curve of the boundary line shown by the following formula (35) is obtained.

$$\alpha = -1 \times 10^{-5} \beta^2 + 0.0002\beta + 0.0125 \qquad (35)$$

In this case, a region shown by hatching which is surrounded by the approximated curves shown by formulas (9) to (11) and formula (35) is a region in which the conditions of all the parameters are satisfied.

(L=100 nm)

Figure 26:
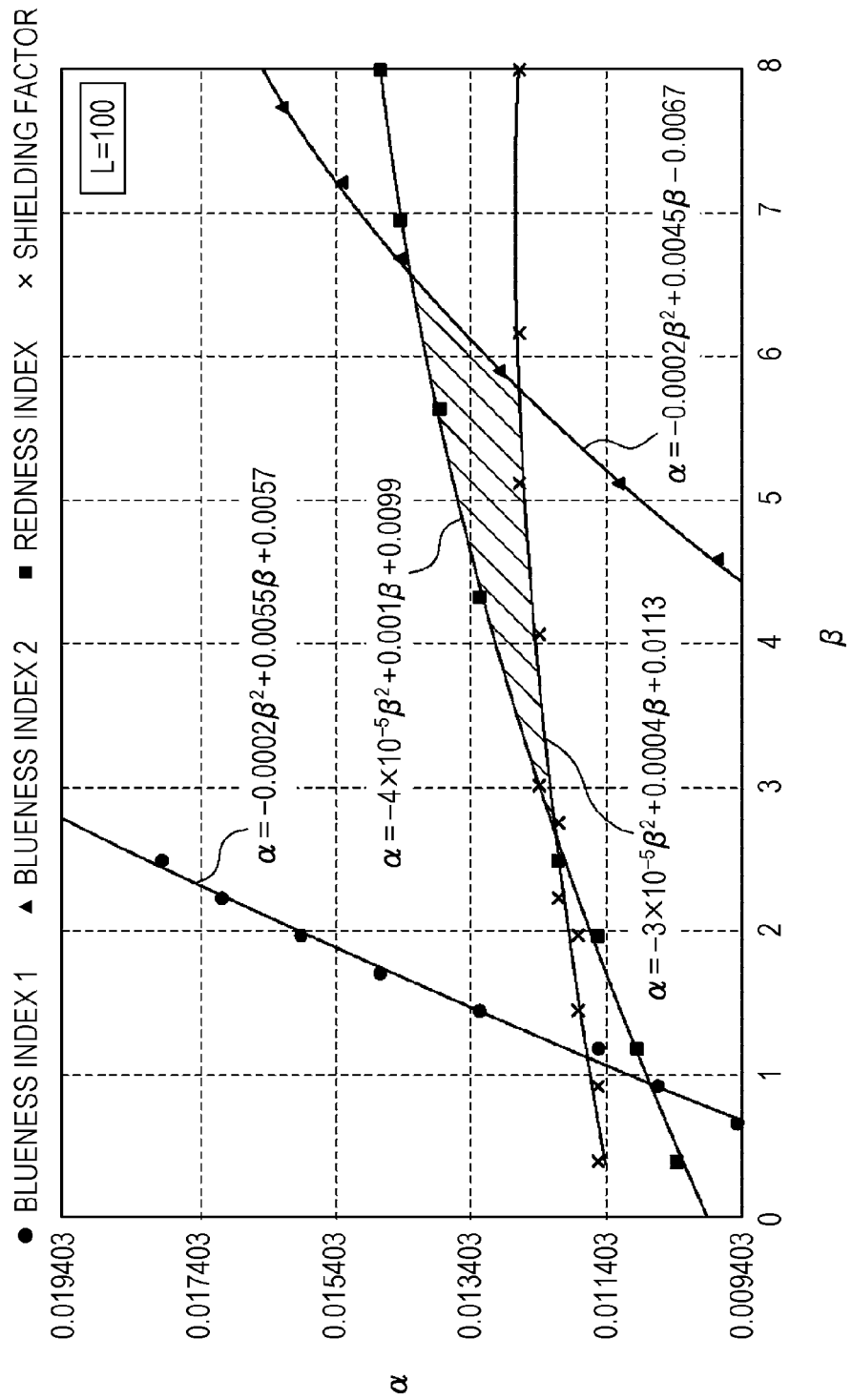
FIG. 26 is an $\alpha$-$\beta$ correlation diagram in which the visible light transmittance, the blueness index, the redness index, and the shielding factor are each used as the parameter when the total film thickness L is 100 nm.

FIG. 26 shows an α-β correlation diagram based on the conditions of the visible light transmittance, the blueness index, the redness index, and the shielding factor at a total film thickness L of 100 nm. In addition, in FIG. 26, since predetermined points (α, β) on the boundary line between a region in which the condition of the visible light transmittance is satisfied and a region in which the condition of the visible light transmittance is not satisfied are outside the region shown by hatching, the points are not shown in the figure. In addition to the approximated curves of the boundary lines shown by formulas (13) to (15), based on the points on the boundary line of the shielding factor plotted in the α-β correlation diagram, the approximated curve of the boundary line shown by the following formula (36) is obtained.

$$\alpha = -3 \times 10^{-5} \beta^2 + 0.0004\beta + 0.0113 \qquad (36)$$

In this case, a region shown by hatching which is surrounded by the approximated curves shown by formulas (13) to (15) and formula (36) is a region in which the conditions of all the parameters are satisfied.

(L=120 nm)

Figure 27:
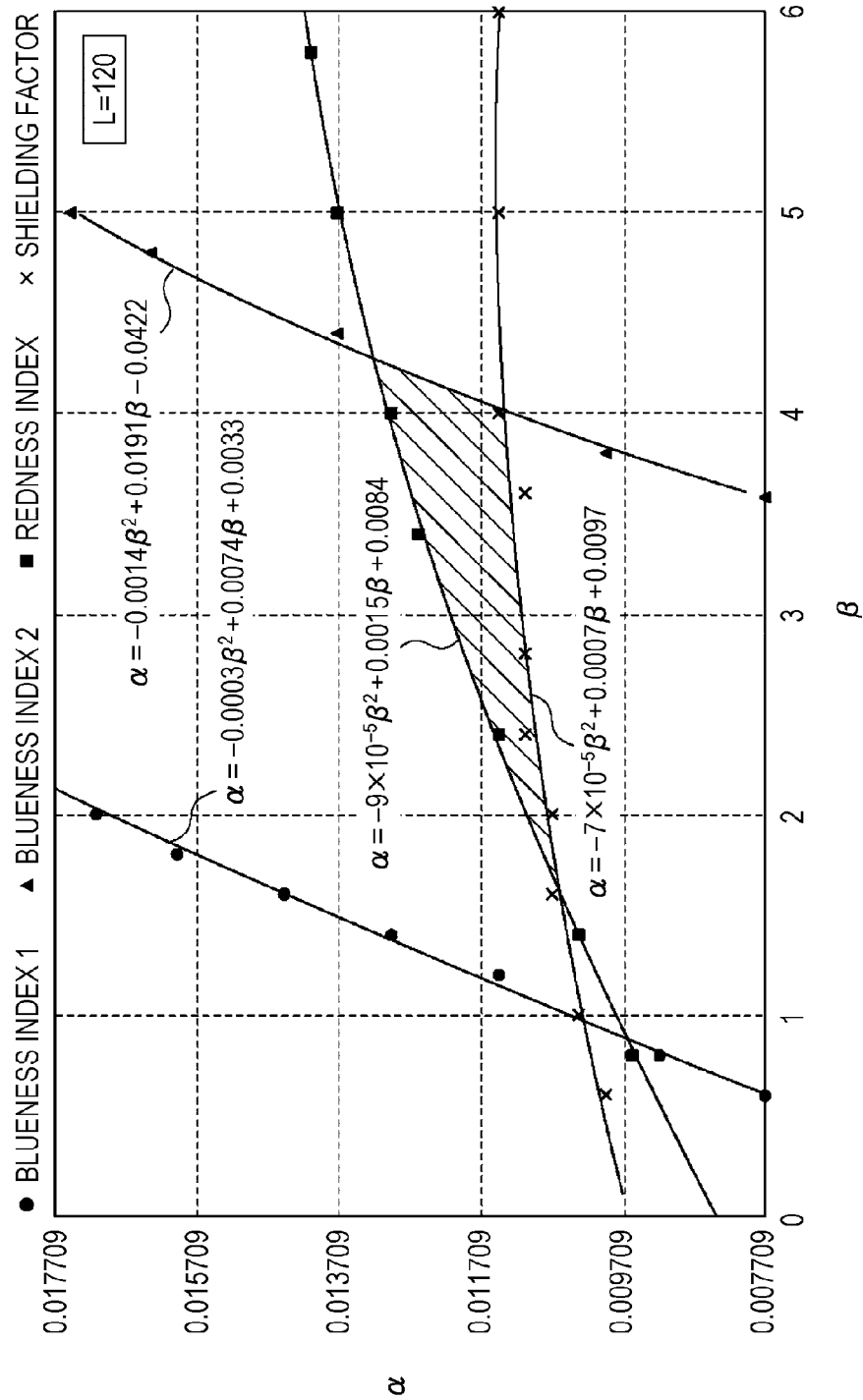
FIG. 27 is an $\alpha$-$\beta$ correlation diagram in which the visible light transmittance, the blueness index, the redness index, and the shielding factor are each used as the parameter when the total film thickness L is 120 nm.

FIG. 27 shows an α-β correlation diagram based on the conditions of the visible light transmittance, the blueness index, the redness index, and the shielding factor at a total film thickness L of 120 nm. In addition, in FIG. 27, since predetermined points (α, β) on the boundary line between a region in which the condition of the visible light transmittance is satisfied and a region in which the condition of the visible light transmittance is not satisfied are outside the region shown by hatching, the points are not shown in the figure. In addition to the approximated curves of the boundary lines shown by formulas (17) to (19), based on the points on the boundary line of the shielding factor plotted in the α-β correlation diagram, the approximated curve of the boundary line shown by the following formula (37) is obtained.

$$\alpha = -7 \times 10^{-5} \beta^2 + 0.0007\beta + 0.0097 \qquad (37)$$

In this case, a region shown by hatching which is surrounded by the approximated curves shown by formulas (17) to (19) and formula (37) is a region in which the conditions of all the parameters are satisfied.

(L=140 nm)

Figure 28:
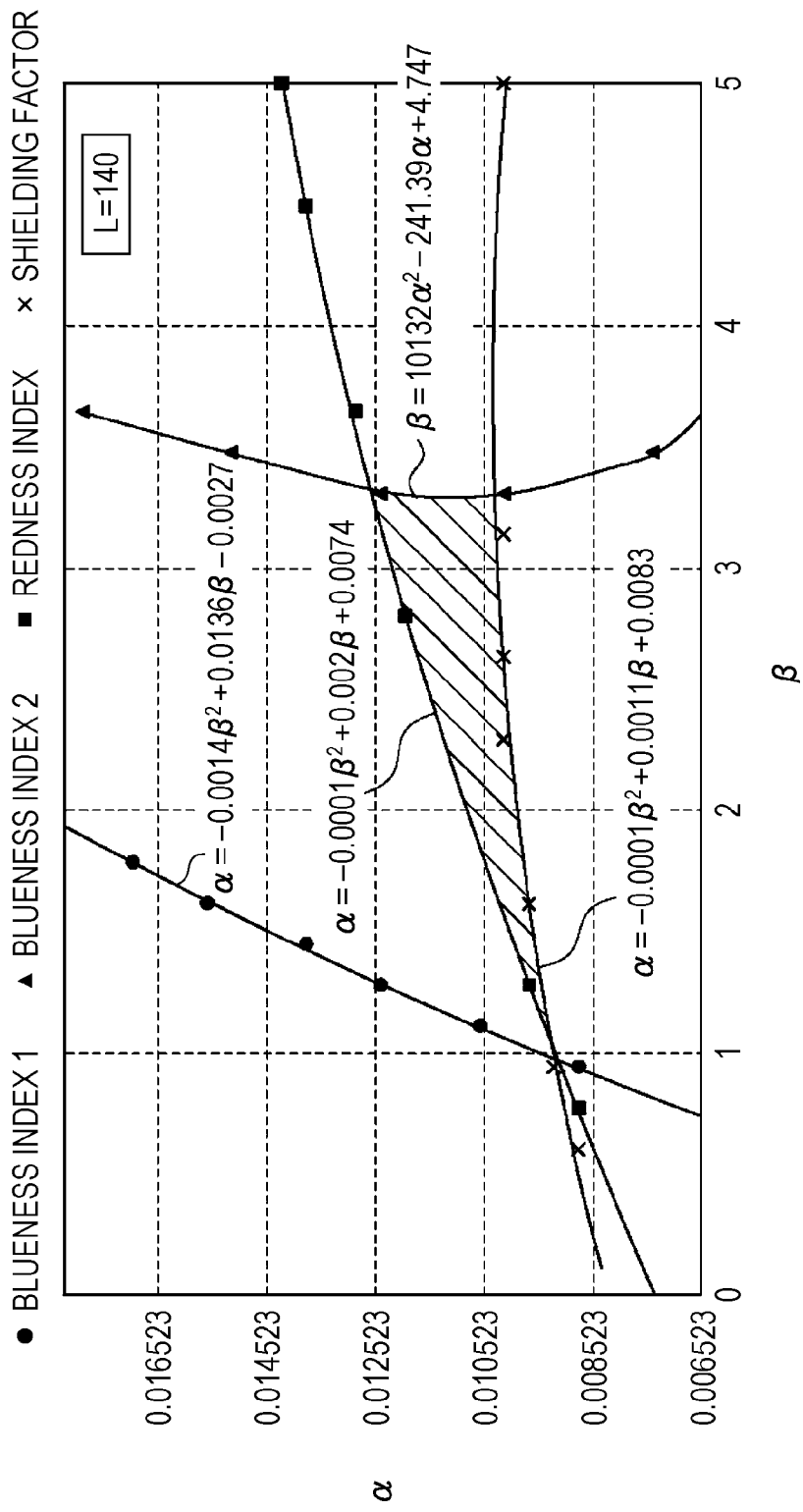
FIG. 28 is an $\alpha$-$\beta$ correlation diagram in which the visible light transmittance, the blueness index, the redness index, and the shielding factor are each used as the parameter when the total film thickness L is 140 nm.

FIG. 28 shows an α-β correlation diagram based on the conditions of the visible light transmittance, the blueness index, the redness index, and the shielding factor at a total film thickness L of 140 nm. In addition, in FIG. 28, since predetermined points (α, β) on the boundary line between a region in which the condition of the visible light transmittance is satisfied and a region in which the condition of the visible light transmittance is not satisfied are outside the region shown by hatching, the points are not shown in the figure. In addition to the approximated curves of the boundary lines shown by formulas (21) to (23), based on the points on the boundary line of the shielding factor plotted in the α-β correlation diagram, the approximated curve of the boundary line shown by the following formula (38) is obtained.

$$\alpha = -0.0001\beta^2 + 0.0011\beta + 0.0083 \qquad (38)$$

In this case, a region shown by hatching which is surrounded by the approximated curves shown by formulas (21) to (23) and formula (38) is a region in which the conditions of all the parameters are satisfied.

(L=160 nm)

Figure 29:
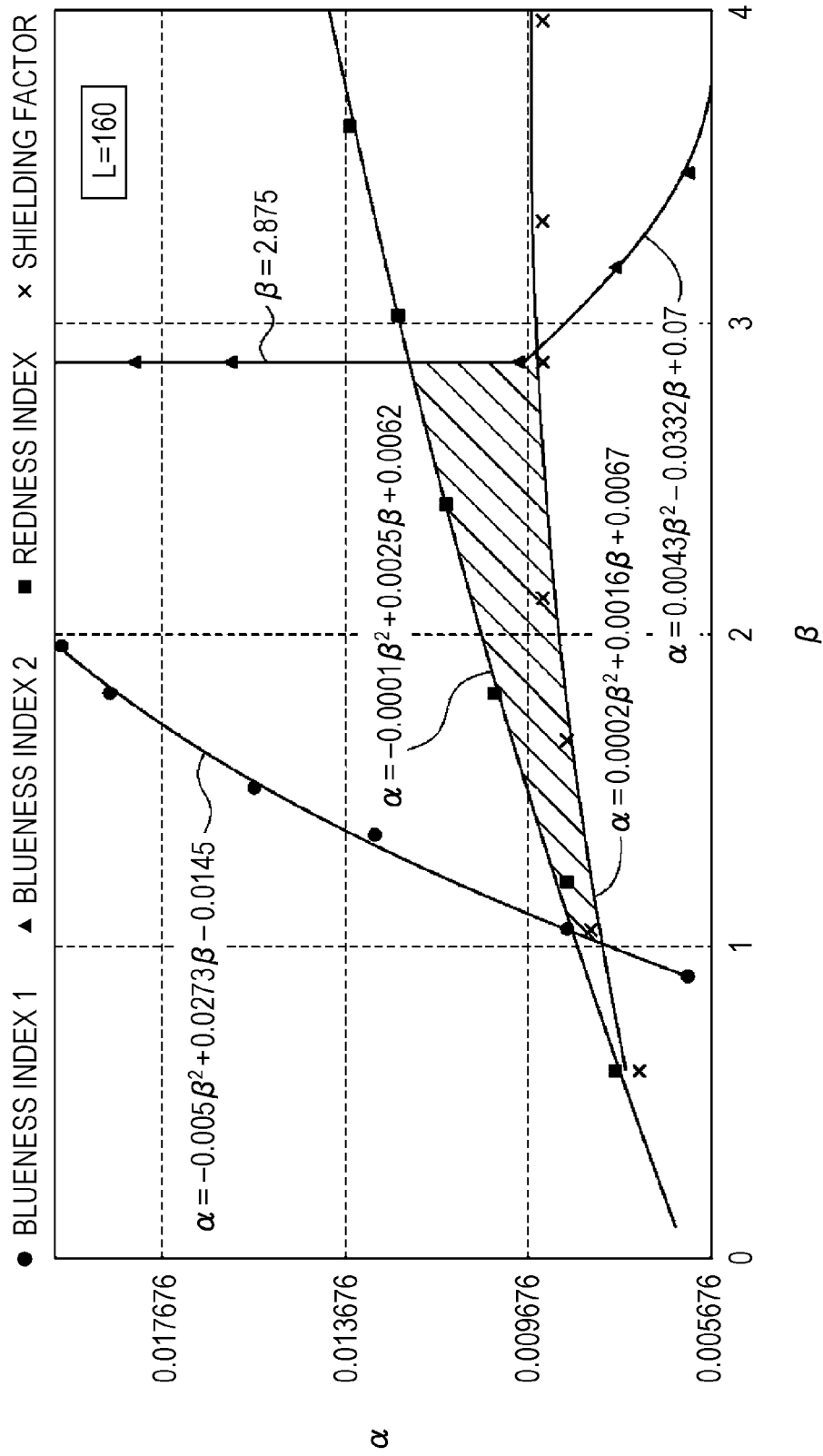
FIG. 29 is an $\alpha$-$\beta$ correlation diagram in which the visible light transmittance, the blueness index, the redness index, and the shielding factor are each used as the parameter when the total film thickness L is 160 nm.

FIG. 29 shows an α-β correlation diagram based on the conditions of the visible light transmittance, the blueness index, the redness index, and the shielding factor at a total film thickness L of 160 nm. In addition, in FIG. 29, since predetermined points (α, β) on the boundary line between a region in which the condition of the visible light transmittance is satisfied and a region in which the condition of the visible light transmittance is not satisfied are outside the region shown by hatching, the points are not shown in the figure. In addition to the approximated curves of the boundary lines shown by formulas (25) to (28), based on the points on the boundary line of the shielding factor plotted in the α-β correlation diagram, the approximated curve of the boundary line shown by the following formula (39) is obtained.

$$\alpha = -0.0002\beta^2 + 0.0016\beta + 0.0067 \qquad (39)$$

In this case, a region shown by hatching which is surrounded by the approximated curves shown by formulas (25) to (28) and formula (39) is a region in which the conditions of all the parameters are satisfied.

(L=180 nm)

Figure 30:
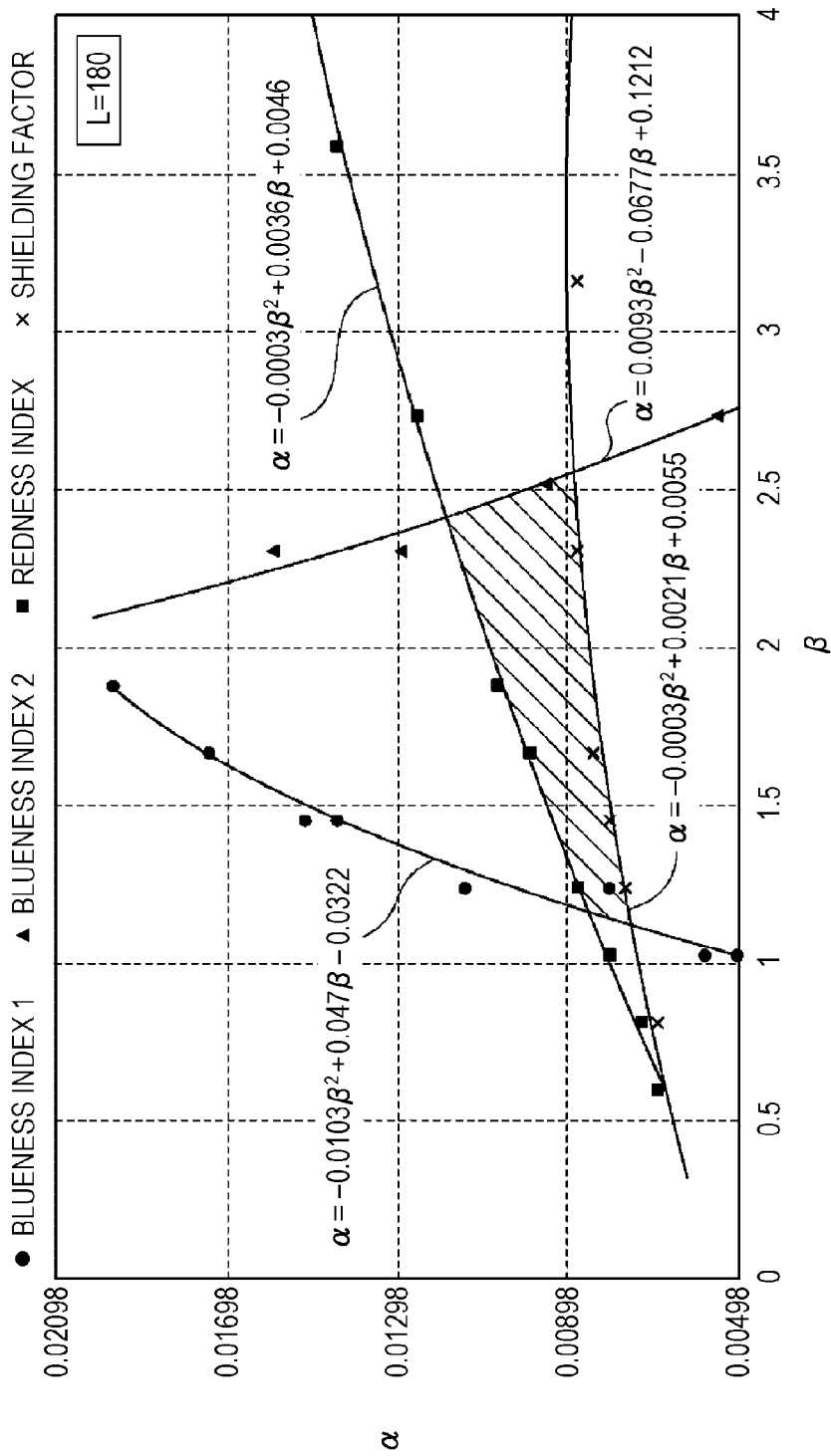
FIG. 30 is an $\alpha$-$\beta$ correlation diagram in which the visible light transmittance, the blueness index, the redness index, and the shielding factor are each used as the parameter when the total film thickness L is 180 nm.

FIG. 30 shows an α-β correlation diagram based on the conditions of the visible light transmittance, the blueness index, the redness index, and the shielding factor at a total film thickness L of 180 nm. In addition, in FIG. 30, since predetermined points ($\alpha$, $\beta$) on the boundary line between a region in which the condition of the visible light transmittance is satisfied and a region in which the condition of the visible light transmittance is not satisfied are outside the region shown by hatching, the points are not shown in the figure. In addition to the approximated curves of the boundary lines shown by formulas (30) to (32), based on the points on the boundary line of the shielding factor plotted in the $\alpha$-$\beta$ correlation diagram, the approximated curve of the boundary line shown by the following formula (40) is obtained.

$$\alpha = -0.0003\beta^2 + 0.0021\beta + 0.0055 \quad (40)$$

In this case, a region shown by hatching which is surrounded by the approximated curves shown by formulas (30) to (32) and formula (40) is a region in which the conditions of all the parameters are satisfied.

Figure 31:
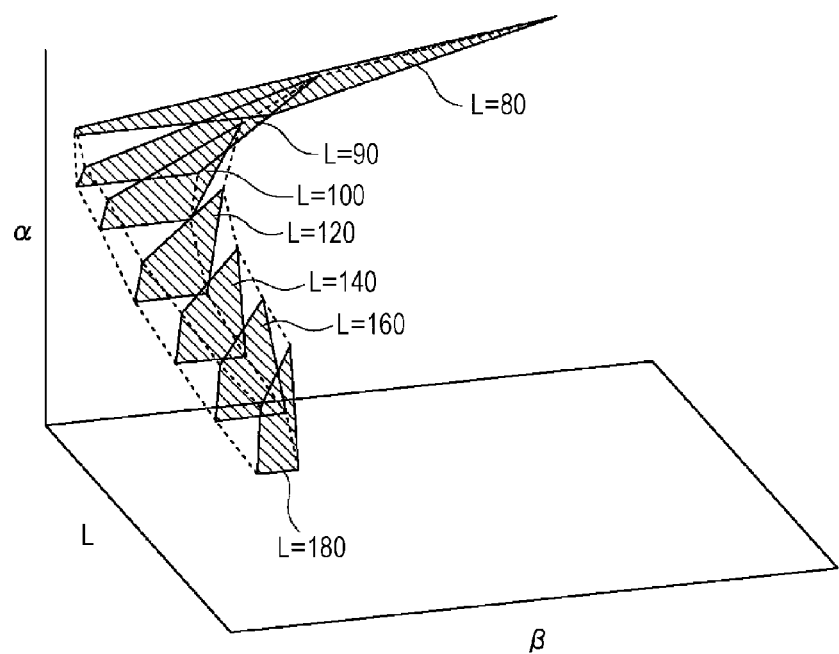
FIG. 31 is a schematic view obtained such that when the visible light transmittance, the blueness index, and the redness index are each used as the parameter, the regions which satisfy the conditions of the individual parameters are mapped on a three-dimensional plane.

Next, in the case in which the total film thickness L is other than the specific thickness, a method for determining a region which satisfies the conditions of the individual parameters will be described. FIG. 31 shows the case in which the regions which satisfy the conditions of the individual parameters determined based on the $\alpha$-$\beta$ correlation diagrams shown in FIGS. 17 to 23 are mapped on a three-dimensional plane using the ratio $\alpha$, the ratio $\beta$, and the total film thickness L as the axes. In this example, the region which satisfies the conditions of the individual parameters is shown when the visible light transmittance, the blueness index, and the redness index are used as the parameters. In addition, predetermined points ($\alpha$, $\beta$) on the boundary line at each L value between a region in which the condition of the visible light transmittance is satisfied and a region in which the condition of the visible light transmittance is not satisfied and an approximated curve obtained from the group of the points described above are outside the region at each L value shown by hatching in FIG. 31, the points and the approximated curve are not shown in the figure.

As shown in FIG. 31, it is believed that the regions which satisfy the conditions of the individual parameters are continuous with respect to the total film thickness L. Hence, in the case in which the total film thickness is other than the specific thickness, a region enclosed by regions at specific total film thicknesses L adjacent to each other and straight lines connecting between corresponding peaks of the above adjacent regions is defined as a region which satisfies the conditions of the individual parameters.

First, the case in which the visible light transmittance, the blueness index, and the redness index are used as the parameters, and the total film thickness L is set to a value between specific total film thicknesses L will be described.

(80 nm$\leq$L$\leq$90 nm)

When the total film thickness L is in a range of 80 to 90 nm, based on the information on the peaks of the regions which satisfy the conditions of the individual parameters shown in FIGS. 17 and 18, the following formulas (41) to (44) are obtained.

$$(\beta-0.5)/0.67 = (\alpha-0.01059)/0.00152478 = (90-L)/10 \quad (41)$$

$$(\beta-5.5)/3.75 = (\alpha-0.01059)/0.00152478 = (90-L)/10 \quad (42)$$

$$(\beta-10.4)/10.6 = (\alpha-0.01516)/0.00067768 = (90-L)/10 \quad (43)$$

$$(\beta-0.8)/0.45 = (\alpha-0.01161)/0.0008471 = (90-L)/10 \quad (44)$$

In this case, the region enclosed by the regions shown in FIGS. 17 and 18 and the straight lines shown by formulas (41) to (44) is a region which satisfies the conditions of the individual parameters.

(90 nm$\leq$L$\leq$100 nm)

When the total film thickness L is in a range of 90 to 100 nm, based on the information on the peaks of the regions which satisfy the conditions of the individual parameters shown in FIGS. 18 and 19, the following formulas (45) to (48) are obtained.

$$(0.7-\beta)/0.2 = (\alpha-0.0094)/0.00118594 = (100-L)/10 \quad (45)$$

$$(\beta-4.4)/1.1 = (\alpha-0.0094)/0.00118594 = (100-L)/10 \quad (46)$$

$$(\beta-6.5)/3.9 = (\alpha-0.01432)/0.0008471 = (100-L)/10 \quad (47)$$

$$(1-\beta)/0.2 = (\alpha-0.01093)/0.00067768 = (100-L)/10 \quad (48)$$

In this case, the region enclosed by the regions shown in FIGS. 18 and 19 and the straight lines shown by formulas (45) to (48) is a region which satisfies the conditions of the individual parameters.

(100 nm$\leq$L$\leq$120 nm)

When the total film thickness L is in a range of 100 to 120 nm, based on the information on the peaks of the regions which satisfy the conditions of the individual parameters shown in FIGS. 19 and 20, the following formulas (49) to (52) are obtained.

$$(\beta-0.6)/0.1 = (\alpha-0.00771)/0.0016942 = (120-L)/20 \quad (49)$$

$$(\beta-3.6)/0.8 = (\alpha-0.00771)/0.0016942 = (120-L)/20 \quad (50)$$

$$(\beta-4.25)/2.25 = (\alpha-0.0133)/0.00101652 = (120-L)/20 \quad (51)$$

$$(\beta-0.9)/0.1 = (\alpha-0.00974)/0.00118594 = (120-L)/20 \quad (52)$$

In this case, the region enclosed by the regions shown in FIGS. 19 and 20 and the straight lines shown by formulas (49) to (52) is a region which satisfies the conditions of the individual parameters.

(120 nm$\leq$L$\leq$140 nm)

When the total film thickness L is in a range of 120 to 140 nm, based on the information on the peaks of the regions which satisfy the conditions of the individual parameters shown in FIGS. 20 and 21, the following formulas (53) to (56) are obtained.

$$(0.75-\beta)/0.15 = (\alpha-0.00652)/0.00118594 = (140-L)/20 \quad (53)$$

$$(3.6543)/0.05 = (\alpha-0.00652)/0.00118594 = (140-L)/20 \quad (54)$$

$$(\beta-3.3)/0.95 = (\alpha-0.01245)/0.0008471 = (140-L)/20 \quad (55)$$

$$(3.47-\beta)/2.57 = (\alpha-0.00754)/0.00220246 = (140-L)/20 \quad (56)$$

In this case, the region enclosed by the regions shown in FIGS. 20 and 21 and the straight lines shown by formulas (53) to (56) is a region which satisfies the conditions of the individual parameters.

(140 nm$\leq$L$\leq$160 nm)

When the total film thickness L is in a range of 140 to 160 nm, based on the information on the peaks of the regions which satisfy the conditions of the individual parameters shown in FIGS. 21 and 22, the following formulas (57) to (60) are obtained.

$$(0.9-\beta)/0.15 = (\alpha-0.00568)/0.0008471 = (160-L)/20 \quad (57)$$

$$(3.8-\beta)/0.15 = (\alpha-0.00568)/0.0008471 = (160-L)/20 \quad (58)$$

$$(\beta-2.85)/0.45 = (\alpha-0.01203)/0.00042355 = (160-L)/20 \quad (59)$$

$$(\beta-1.05)/2.42 = (0.00864-\alpha)/0.00110123 = (160-L)/20 \quad (60)$$

In this case, the region enclosed by the regions shown in FIGS. 21 and 22 and the straight lines shown by formulas (57) to (60) is a region which satisfies the conditions of the individual parameters.

(160 nm≦L≦180 nm)

When the total film thickness L is in a range of 160 to 180 nm, based on the information on the peaks of the regions which satisfy the conditions of the individual parameters shown in FIGS. 22 and 23, the following formulas (61) to (64) are obtained.

$$(1.05-\beta)/0.15=(\alpha-0.005)/0.00067768=(180-L)/20 \quad (61)$$

$$(\beta-2.75)/1.05=(\alpha-0.005)/0.00067768=(180-L)/20 \quad (62)$$

$$(\beta-2.4)/0.45=(\alpha-0.01177)/0.00025413=(180-L)/20 \quad (63)$$

$$(1.2-\beta)/0.15=(\alpha-0.00856)0.00008471=(180-L)/20 \quad (64)$$

In this case, the region enclosed by the regions shown in FIGS. 22 and 23 and the straight lines shown by formulas (61) to (64) is a region which satisfies the conditions of the individual parameters.

Next, the case in which, besides the visible light transmittance, the blueness index, and the redness index, the shielding factor is used as the parameter and the total film thickness L is set to a value between specific total film thicknesses L will be described.

As in the case in which the visible light transmittance, the blueness index, and the redness index are used as the parameters, it is believed that regions which satisfy the individual parameters are continuous with respect to the total film thickness L. Hence, a region enclosed by regions at specific total film thicknesses L adjacent to each other and straight lines connecting between corresponding peaks of the above adjacent regions is defined as a region which satisfies the conditions of the individual parameters.

(80 nm≦L≦90 nm)

When the total film thickness L is in a range of 80 to 90 nm, based on the information on the peaks of the regions which satisfy the conditions of the individual parameters shown in FIGS. 24 and 25, the following formulas (65) to (69) are obtained.

$$(\beta-0.8)/11.6=(\alpha-0.01161)/0.00398137=(90-L)/10 \quad (65)$$

$$(\beta-8.9)/10.4=(\alpha-0.01398)/0.00152478=(90-L)/10 \quad (66)$$

$$(\beta-10.4)/10.6=(\alpha-0.01516)/0.00067768=(90-L)/10 \quad (67)$$

$$(\beta-4.9)/16.1=(\alpha-0.01347)/0.00237188=(90-L)/10 \quad (68)$$

$$(\beta-4.9)/7.5=(\alpha-0.01347)/0.00211775=(90-L)/10 \quad (69)$$

In this case, the region enclosed by the regions shown in FIGS. 24 and 25 and the straight lines shown by formulas (65) to (69) are a region which satisfies the conditions of the individual parameters.

(90 nm≦L≦100 nm)

When the total film thickness L is in a range of 90 to 100 nm, based on the information on the peaks of the regions which satisfy the conditions of the individual parameters shown in FIGS. 25 and 26, the following formulas (70) to (73) are obtained.

$$(1-\beta)/0.2=(\alpha-0.01093)/0.0067768=(100-L)/10 \quad (70)$$

$$(\beta-5.8)/3.1=(\alpha-0.01262)/0.00135536=(100-L)/10 \quad (71)$$

$$(\beta-6.5)/3.9=(\alpha-0.01432)/0.0008471=(100-L)/10 \quad (72)$$

$$(\beta-2.8)/2.1=(\alpha-0.0122)/0.00127065=(100-L)/10 \quad (73)$$

In this case, the region enclosed by the regions shown in FIGS. 25 and 26 and the straight lines shown by formulas (70) to (73) are a region which satisfies the conditions of the individual parameters.

(100 nm≦L≦120 nm)

When the total film thickness L is in a range of 100 to 120 nm, based on the information on the peaks of the regions which satisfy the conditions of the individual parameters shown in FIGS. 26 and 27, the following formulas (74) to (77) are obtained.

$$(\beta-0.9)/0.1=(\alpha-0.00974)/0.00118594=(120-L)/20 \quad (74)$$

$$(\beta-4)/1.8=(\alpha-0.01144)/0.00118594=(120-L)/20 \quad (75)$$

$$(\beta-4.25)/2.25=(\alpha-0.0133)/0.00101652=(120-L)/20 \quad (76)$$

$$(\beta-1.7)/1.1=(\alpha-0.01076)/0.00144007=(120-L)/20 \quad (77)$$

In this case, the region enclosed by the regions shown in FIGS. 26 and 27 and the straight lines shown by formulas (74) to (77) are a region which satisfies the conditions of the individual parameters.

(120 nm≦L≦140 nm)

When the total film thickness L is in a range of 120 to 140 nm, based on the information on the peaks of the regions which satisfy the conditions of the individual parameters shown in FIGS. 27 and 28, the following formulas (78) to (81) are obtained.

$$(1-\beta)/0.1=(\alpha-0.00923)/0.00050826=(140-L)/20 \quad (78)$$

$$(\beta-3.3)/0.7=(\alpha-0.01042)/0.00101652=(140-L)/20 \quad (79)$$

$$(\beta-3.3)/0.95=(\alpha-0.01245)/0.0008471=(140-L)/20 \quad (80)$$

$$(\beta-1.1)/0.6=(\alpha-0.0094)/0.00135536=(140-L)/20 \quad (81)$$

In this case, the region enclosed by the regions shown in FIGS. 27 and 28 and the straight lines shown by formulas (78) to (81) are a region which satisfies the conditions of the individual parameters.

(140 nm≦L≦160 nm)

When the total film thickness L is in a range of 140 to 160 nm, based on the information on the peaks of the regions which satisfy the conditions of the individual parameters shown in FIGS. 28 and 29, the following formulas (82) to (85) are obtained.

$$(1.05-\beta)/0.05=(\alpha-0.00822)/0.00101652=(160-L)/20 \quad (82)$$

$$(\beta-2.85)/0.45=(\alpha-0.00991)/0.00050826=(160-L)/20 \quad (83)$$

$$(\beta-2.85)/0.45=(\alpha-0.01203)/0.00042355=(160-L)/20 \quad (84)$$

$$(\beta-1.05)/0.05=(\alpha-0.00864)/0.00076239=(160-L)/20 \quad (85)$$

In this case, the region enclosed by the regions shown in FIGS. 28 and 29 and the straight lines shown by formulas (82) to (85) are a region which satisfies the conditions of the individual parameters.

(160 nm≦L≦180 nm)

When the total film thickness L is in a range of 160 to 180 nm, based on the information on the peaks of the regions which satisfy the conditions of the individual parameters shown in FIGS. 29 and 30, the following formulas (86) to (89) are obtained.

$$(1.15-\beta)/0.1=(\alpha-0.00754)/0.00067768=(180-L)/20 \quad (86)$$

$$(\beta-2.55)/0.3=(\alpha-0.00889)/0.00101652=(180-L)/20 \quad (87)$$

$$(\beta-2.4)/0.45=(\alpha-0.01177)/0.00025413=(180-L)/20 \quad (88)$$

$$(1.243)/0.15=(\alpha-0.00856)/0.00008471=(180-L)/20 \quad (89)$$

In this case, the region enclosed by the regions shown in FIGS. 29 and 30 and the straight lines shown by formulas (86) to (89) are a region which satisfies the conditions of the individual parameters.

As described above, when the total film thickness L is set and the film thicknesses of the individual layers are set so that the ratio α and the ratio β are in the region shown by hatching, a laminated film which satisfies the conditions of the individual parameters can be formed.

As described above, when the total film thickness L is other than the specific value, a region enclosed by regions at specific total film thicknesses L adjacent to each other and straight lines connecting between corresponding peaks of the adjacent regions is defined as a region which satisfies the conditions of the individual parameters; however, the region is not limited to this example. For example, when the total film thickness L is other than the specific value, a region in which regions at specific total film thicknesses L adjacent to each other are overlapped may be defined as a region which satisfies the conditions of the individual parameters.

Figure 32A:
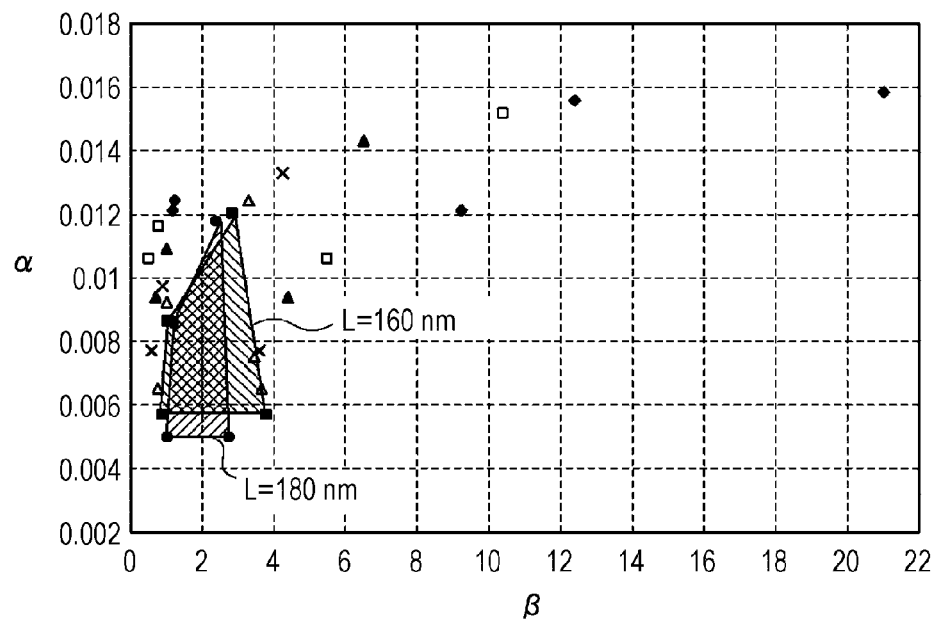
FIG. 32A is a schematic view obtained such that when the visible light transmittance, the blueness index, and the redness index are each used as the parameter, the regions which satisfy the conditions of the individual parameters are mapped on the same plane.

First, the case in which the visible light transmittance, the blueness index, and the redness index are used as the parameters will be described. FIG. 32A shows a graph in which when the visible light transmittance, the blueness index, and the redness are used as the parameters, regions which satisfy the conditions of the individual parameters are mapped on the same plane. In this example, the regions at total film thicknesses L of 160 and 180 nm are shown.

As shown in FIG. 32A, when the regions at the specific total film thicknesses L adjacent to each other are mapped on the same plane, a region in which the two regions are overlapped with each other is formed. In this case, the overlapped region can be defined as a region which satisfies the conditions of the individual parameters. The overlapped region can be determined based on the approximated curves forming the respective regions.

(80 nm<L<90 nm)

When the total film thickness L is in a range of more than 80 to less than 90 nm, based on the regions which satisfy the conditions of the individual parameters shown in FIGS. 17 and 18, the region surrounded by the following formulas (8), (10), and (11) satisfies the conditions of the individual parameters.

$$\alpha=0.012114 \quad (8)$$

$$\alpha=-3\times10^{-5}\beta^2+0.0014\beta+0.0038 \quad (10)$$

$$\alpha=-2\times10^{-5}\beta^2+0.0006\beta+0.0112 \quad (11)$$

(90 nm<L<100 nm)

When the total film thickness L is in a range of more than 90 to less than 100 nm, based on the regions which satisfy the conditions of the individual parameters shown in FIGS. 18 and 19, the region surrounded by the following formulas (11) to (15) satisfies the conditions of the individual parameters.

$$\alpha=-2\times10^{-5}\beta^2+0.0006\beta+0.0112 \quad (11)$$

$$\alpha=0.010589 \quad (12)$$

$$\alpha=-0.0002\beta^2+0.0055\beta+0.0057 \quad (13)$$

$$\alpha=-0.0002\beta^2+0.0045\beta-0.0067 \quad (14)$$

$$\alpha=-4\times10^{-5}\beta^2+0.001\beta+0.0099 \quad (15)$$

(100 nm<L<120 nm)

When the total film thickness L is in a range of more than 100 to less than 120 nm, based on the regions which satisfy the conditions of the individual parameters shown in FIGS. 19 and 20, the region surrounded by the following formulas (15) to (19) satisfies the conditions of the individual parameters.

$$\alpha=-4\times10^{-5}\beta^2+0.001\beta+0.0099 \quad (15)$$

$$\alpha=0.009403 \quad (16)$$

$$\alpha=-0.0003\beta^2+0.0074\beta+0.0033 \quad (17)$$

$$\alpha=-0.0014\beta^2+0.0191\beta-0.0422 \quad (18)$$

$$\alpha=-9\times10^{-5}\beta^2+0.0015\beta+0.0084 \quad (19)$$

(120 nm<L<140 nm)

When the total film thickness L is in a range of more than 120 to less than 140 nm, based on the regions which satisfy the conditions of the individual parameters shown in FIGS. 20 and 21, the region surrounded by the following formulas (20) to (23) satisfies the conditions of the individual parameters.

$$\alpha=0.007709 \quad (20)$$

$$\alpha=-0.0014\beta^2+0.0136\beta-0.0027 \quad (21)$$

$$\beta=10,132\alpha^2-241.39\alpha+4.747 \quad (22)$$

$$\alpha=-0.0001\beta^2+0.002\beta+0.0074 \quad (23)$$

(140 nm<L<160 nm)

When the total film thickness L is in a range of more than 140 to less than 160 nm, based on the regions which satisfy the conditions of the individual parameters shown in FIGS. 21 and 22, the region surrounded by the following formulas (23) to (28) satisfies the conditions of the individual parameters.

$$\alpha=-0.0001\beta^2+0.002\beta+0.0074 \quad (23)$$

$$\alpha=0.006523 \quad (24)$$

$$\alpha=-0.005\beta^2+0.0273\beta-0.0145 \quad (25)$$

$$\alpha=0.0043\beta^2-0.0332\beta+0.07 \quad (26)$$

$$\beta=2.875 \quad (27)$$

$$\alpha=-0.0001\beta^2+0.0025\beta+0.0062 \quad (28)$$

(160 nm<L<180 nm)

When the total film thickness L is in a range of more than 160 to less than 180 nm, based on the regions which satisfy the conditions of the individual parameters shown in FIGS. 22 and 23, the region surrounded by the following formulas (28) to (32) satisfies the conditions of the individual parameters.

$$\alpha=-0.0001\beta^2+0.0025\beta+0.0062 \quad (28)$$

$$\alpha=0.005676 \quad (29)$$

$$\alpha = -0.0103\beta^2 + 0.047\beta - 0.0322 \quad (30)$$

$$\alpha = 0.0093\beta^2 - 0.0677\beta + 0.1212 \quad (31)$$

$$\alpha = -0.0003\beta^2 + 0.0036\beta + 0.0046 \quad (32)$$

Figure 32B:
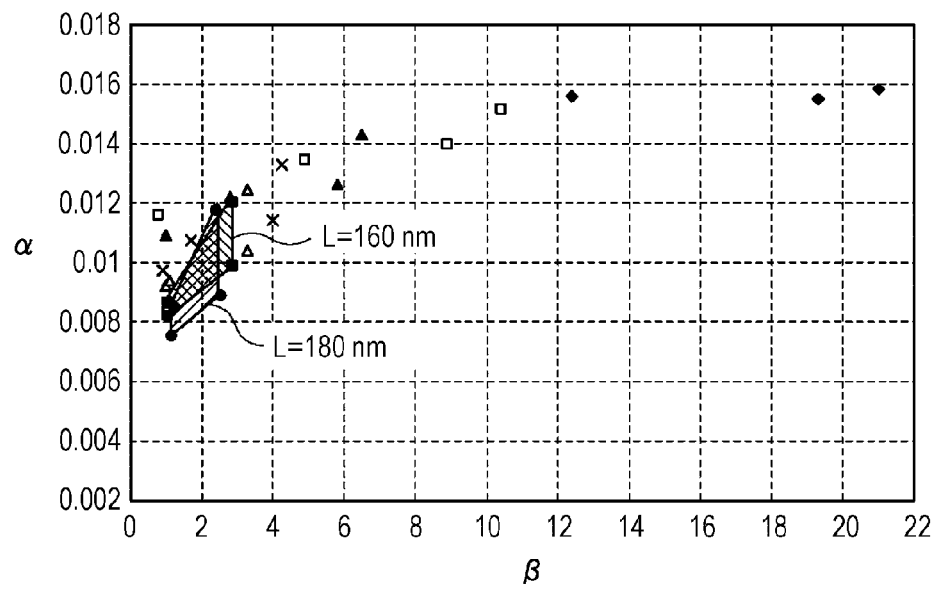
FIG. 32B is a schematic view obtained such that when the visible light transmittance, the blueness index, the redness index, and the shielding factor are each used as the parameter, the regions which satisfy the conditions of the individual parameters are mapped on the same plane.

Next, besides the visible light transmittance, the blueness index, and the redness index, the case in which the shielding factor is used as the parameter will be described. FIG. 32B shows a graph in which when the visible light transmittance, the blueness index, the redness index, and the shielding factor are used as the parameters, regions which satisfy the conditions of the individual parameters are mapped on the same plane. In this example, the regions at total film thicknesses L of 160 and 180 nm are shown.

As shown in FIG. 32B, when the regions at the specific total film thicknesses L adjacent to each other are mapped on the same plane, a region in which the two regions are overlapped with each other is formed. In this case, the overlapped region can be defined as a region which satisfies the conditions of the individual parameters. The overlapped region can be determined based on the approximated curves forming the respective regions.

In addition, when the total film thickness is in a range of more than 80 to less than 90 nm, even if the regions which satisfy the conditions of the individual parameters shown in FIGS. 24 and 25 are mapped on the same plane, no overlapped region therebetween is present; hence, the region which satisfy the conditions of the individual parameters may not be determined by this method.

(90 nm<$L$<100 nm)

When the total film thickness L is in a range of more than 90 to less than 100 nm, based on the regions which satisfy the conditions of the individual parameters shown in FIGS. 25 and 26, the region surrounded by the following formulas (11), (14), (15), and (35) satisfies the conditions of the individual parameters.

$$\alpha = -2 \times 10^{-5}\beta^2 + 0.0006\beta + 0.0112 \quad (11)$$

$$\alpha = -0.0002\beta^2 + 0.0045\beta - 0.0067 \quad (14)$$

$$\alpha = -4 \times 10^{-5}\beta^2 + 0.001\beta + 0.0099 \quad (15)$$

$$\alpha = -1 \times 10^{-5}\beta^2 + 0.0002\beta + 0.0125 \quad (35)$$

(100 nm<$L$<120 nm)

When the total film thickness L is in a range of more than 100 to less than 120 nm, based on the regions which satisfy the conditions of the individual parameters shown in FIGS. 26 and 27, the region surrounded by the following formulas (15), (18), (19) and (36) satisfies the conditions of the individual parameters.

$$\alpha = -4 \times 10^{-5}\beta^2 + 0.001\beta + 0.0099 \quad (15)$$

$$\alpha = -0.0014\beta^2 + 0.0191\beta - 0.0422 \quad (18)$$

$$\alpha = -9 \times 10^{-5}\beta^2 + 0.0015\beta + 0.0084 \quad (19)$$

$$\alpha = -3 \times 10^{-5}\beta^2 + 0.0004\beta + 0.0113 \quad (36)$$

(120 nm<$L$<140 nm)

When the total film thickness L is in a range of more than 120 to less than 140 nm, based on the regions which satisfy the conditions of the individual parameters shown in FIGS. 27 and 28, the region surrounded by the following formulas (19), (22), (23), and (37) satisfies the conditions of the individual parameters.

$$\alpha = -9 \times 10^{-5}\beta^2 + 0.0015\beta + 0.0084 \quad (19)$$

$$\beta = 10{,}132\alpha^2 - 241.39\alpha + 4.747 \quad (22)$$

$$\alpha = -0.0001\beta^2 + 0.002\beta + 0.0074 \quad (23)$$

$$\alpha = -7 \times 10^{-5}\beta^2 + 0.0007\beta + 0.0097 \quad (37)$$

(140 nm<$L$<160 nm)

When the total film thickness L is in a range of more than 140 to less than 160 nm, based on the regions which satisfy the conditions of the individual parameters shown in FIGS. 28 and 29, the region surrounded by the following formulas (23), (26), (28), (27) and (38) satisfies the conditions of the individual parameters.

$$\alpha = -0.0001\beta^2 + 0.002\beta + 0.0074 \quad (23)$$

$$\alpha = 0.0043\beta^2 - 0.0332\beta + 0.07 \quad (26)$$

$$\alpha = -0.0001\beta^2 + 0.0025\beta + 0.0062 \quad (28)$$

$$\beta = 2.875 \quad (27)$$

$$\alpha = -0.0001\beta^2 + 0.0011\beta + 0.0083 \quad (38)$$

(160 nm<$L$<180 nm)

When the total film thickness L is in a range of more than 160 to less than 180 nm, based on the regions which satisfy the conditions of the individual parameters shown in FIGS. 29 and 30, the region surrounded by the following formulas (28), (30), (32), (39), and (40) satisfies the conditions of the individual parameters.

$$\alpha = -0.0001\beta^2 + 0.0025\beta + 0.0062 \quad (28)$$

$$\alpha = -0.0103\beta^2 + 0.047\beta - 0.0322 \quad (30)$$

$$\alpha = -0.0003\beta^2 + 0.0036\beta + 0.0046 \quad (32)$$

$$\alpha = -0.0002\beta^2 + 0.0016\beta + 0.0067 \quad (39)$$

$$\alpha = -0.0003\beta^2 + 0.0021\beta + 0.0055 \quad (40)$$

According to the first embodiment, when the region which satisfies the conditions of the individual parameters is determined with respect to the ratio $\alpha$ and the ratio $\beta$ determined in accordance with the film thicknesses of the individual layers of the reflective layer 3, and the film thickness of the reflective layer 3 is set so that the ratio $\alpha$ and the ratio $\beta$ are included in this region, the change in color tone can be suppressed.

MODIFIED EXAMPLES

Hereinafter, modified examples of the above embodiment will be described.

First Modified Example

Figure 33A:
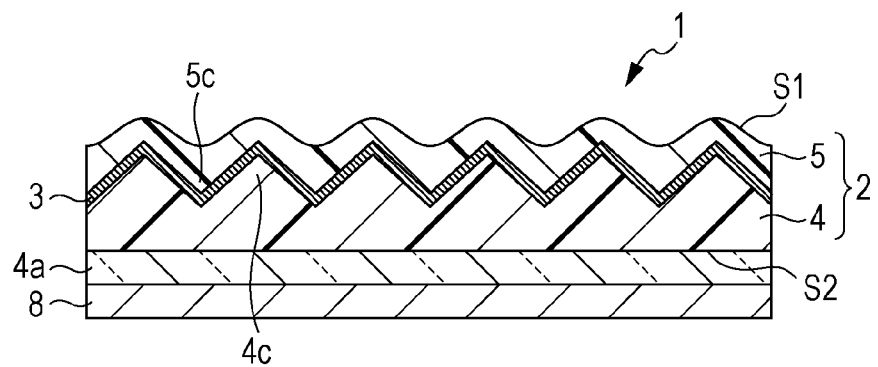
FIG. 33A is a cross-sectional view showing a first modification according to the first embodiment.

FIG. 33A is a cross-sectional view showing a first modified example according to the first embodiment. As shown in FIG. 33A, an optical film 1 according to this first modified example has an incident surface S1 having a concavo-convex shape. The concavo-convex shape of this incident surface S1 and a concavo-convex shape of a first optical layer 4 are formed, for example, so that the concavo-convex shapes thereof may correspond to each other, and the position of the vertex of each convex portion and the position of the bottom of each concave portion of the incident surface S1 coincide with those of the first optical layer 4. The concavo-convex shape of the incident surface S1 is preferably gentler than the concavo-convex shape of the first optical layer 4.

Second Modified Example

Figure 33B:
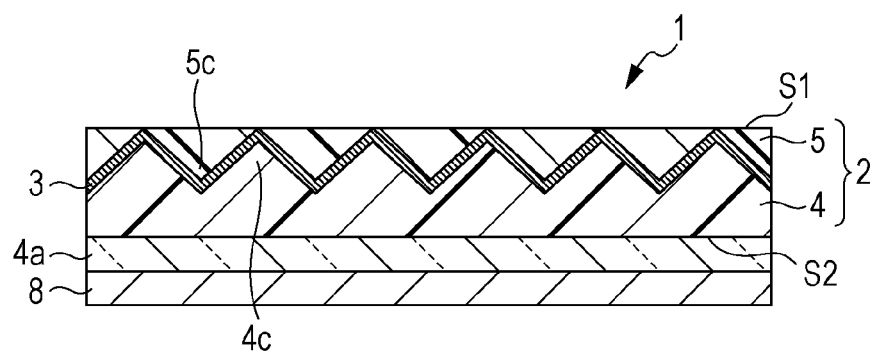
FIG. 33B is a cross-sectional view showing a second modification according to the first embodiment.

FIG. 33B is a cross-sectional view showing a second modified example according to the first embodiment. As shown in FIG. 33B, in an optical film 1 according to this second modified example, the position of the vertex of each convex portion of a concavo-convex surface of a first optical layer 4 on which a reflective layer 3 is formed is formed to have a height approximately equivalent to the height of an incident surface S1 of the first optical layer 4.

2. Second Embodiment

FIGS. 34A to 37B are views each showing an example of the structure of an optical film according to a second embodiment. In the second embodiment, elements corresponding to those in the first embodiment are designated by the same reference numerals as those in the first embodiment. In the second embodiment, structures 4c are two-dimensionally arranged in one primary surface of a first optical layer 4, and this is a point different from that of the first embodiment. The two-dimensional arrangement is preferably a two-dimensional arrangement in a closest-packed state. The reason for this is that the directional reflectance can be improved.

Figure 34A:
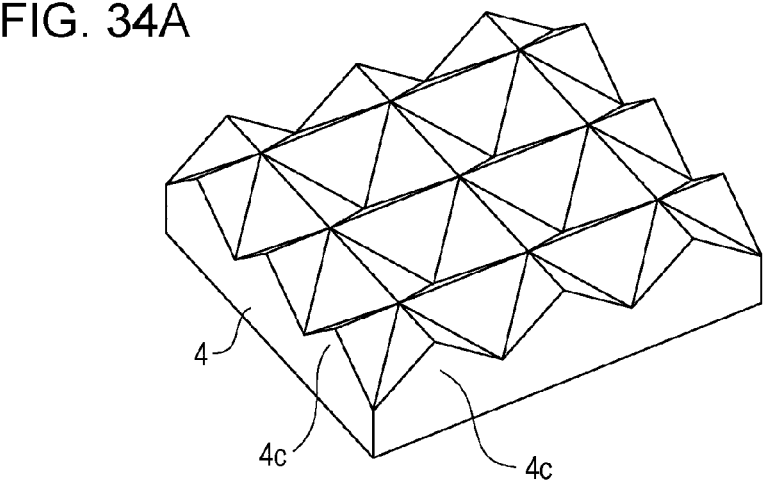
FIG. 34A is a perspective view showing a first structural example of a first optical layer of an optical film according to a second embodiment.
Figure 34B:
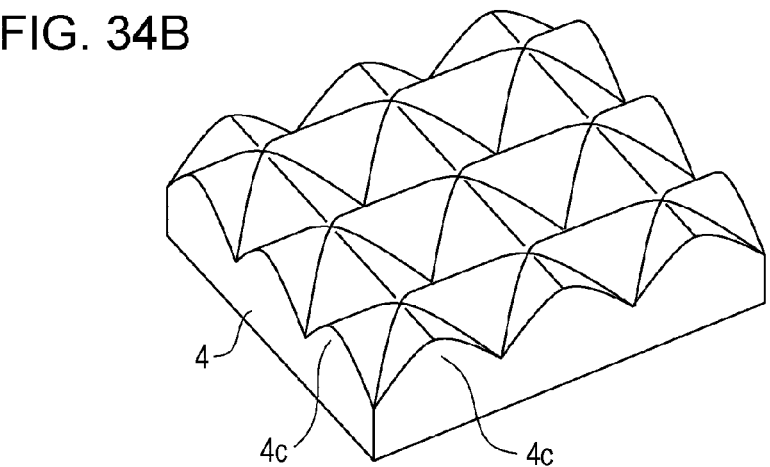
FIG. 34B is a perspective view showing a second structural example of the first optical layer of the optical film according to the second embodiment.
Figure 34C:
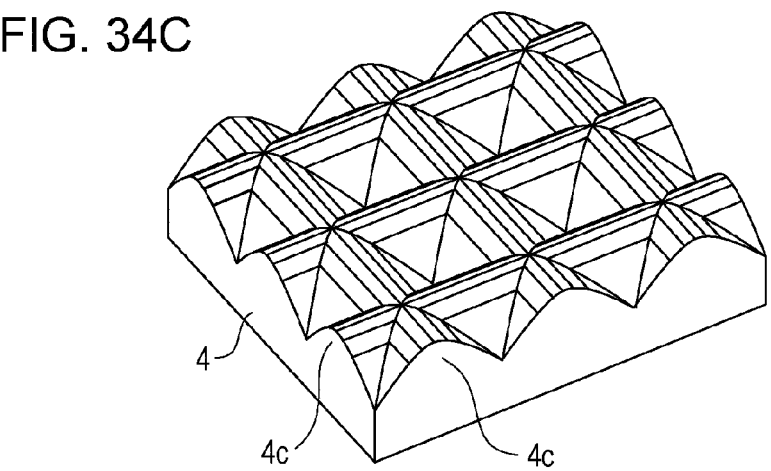
FIG. 34C is a perspective view showing a third structural example of the first optical layer of the optical film according to the second embodiment.

As shown in FIGS. 34A and 34B, for example, one primary surface of the first optical layer 4 is formed so that columnar structures (pillar shaped structures) 4c are arranged to orthogonally intersect each other. In particular, first structures 4c arranged in a first direction and second structures 4c arranged in a second direction perpendicular to the first direction are arranged so as to penetrate each other through side surfaces thereof. For example, the columnar structure 4c is a convex portion or a concave portion having a columnar shape, such as a prism shaper (FIG. 34A) or a lenticular shape (FIG. 34B) or a convex portion or a concave portion thereof in which a vertex of the column has a polygonal shape (such as a pentagonal shape (FIG. 34C).

Figure 35A:
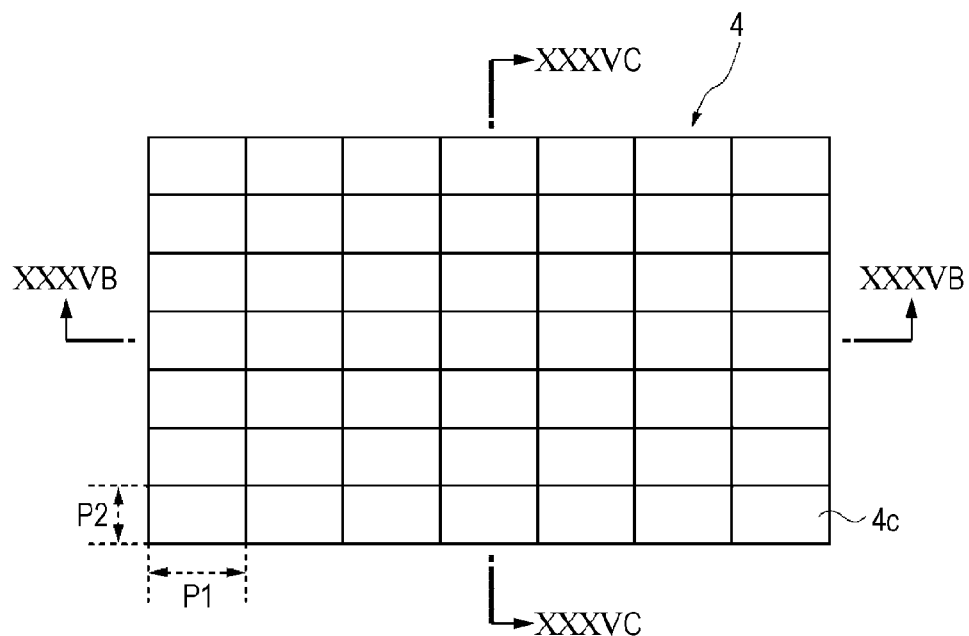
FIG. 35A is a plan view showing the third structural example of the first optical layer of the optical film according to the second embodiment.
Figure 35B:
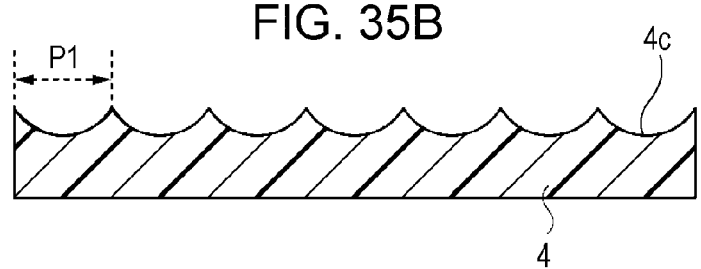
FIG. 35B is a cross-sectional view of the first optical layer taken along the line XXXVB-XXXVB shown in FIG. 35A.
Figure 35C:
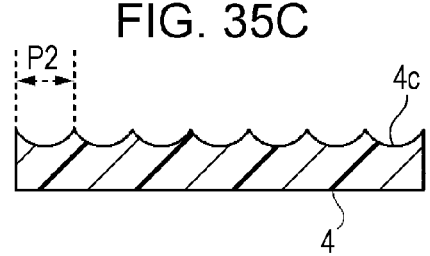
FIG. 35C is a cross-sectional view of the first optical layer taken along the line XXXVC-XXXVC shown in FIG. 35A.
Figure 36A:
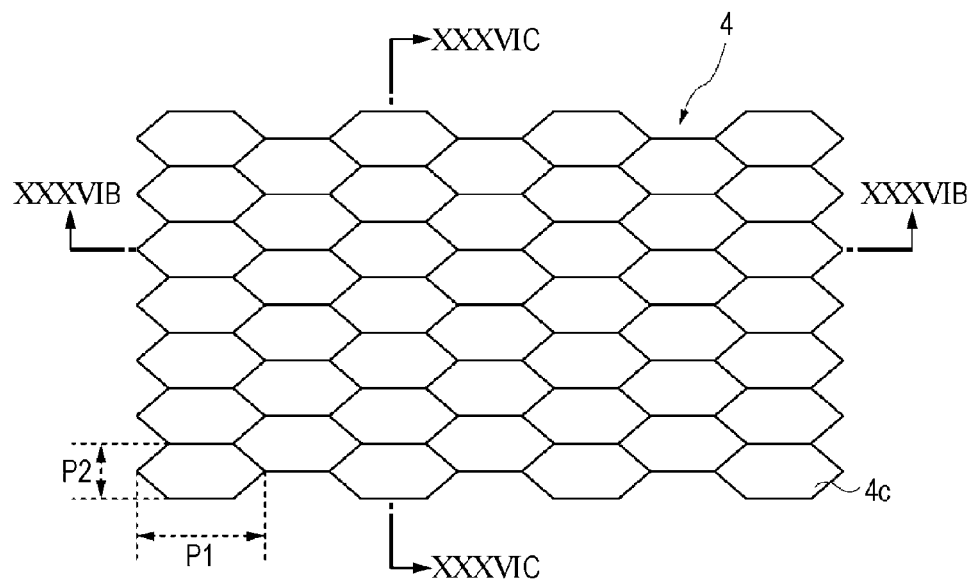
FIG. 36A is a plan view showing a fourth structural example of the first optical layer of the optical film according to the second embodiment.
Figure 36B:
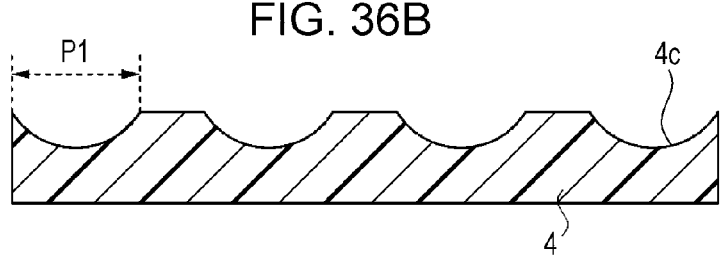
FIG. 36B is a cross-sectional view of the first optical layer taken along the line XXXVIB-XXXVIB shown in FIG. 36A.
Figure 36C:
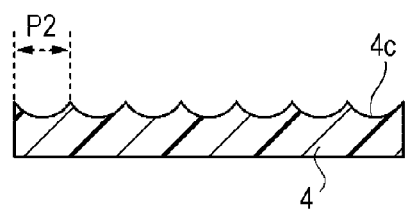
FIG. 36C is a cross-sectional view of the first optical layer taken along the line XXXVIC-XXXVIC shown in FIG. 36A.
Figure 37A:
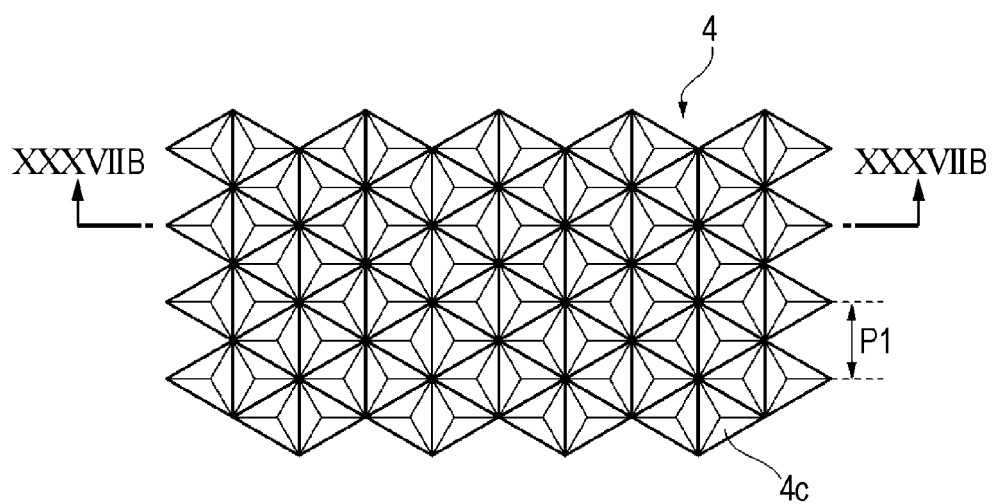
FIG. 37A is a plan view showing a fifth structural example of the first optical layer of the optical film according to the second embodiment.
Figure 37B:
FIG. 37B is a cross-sectional view of the first optical layer taken along the line XXXVIIB-XXXVIIB shown in FIG. 37A.

In addition, for example, structures 4c each having a spherical shape or a corner cube shape may be two-dimensionally arranged in one primary surface of the first optical layer 4 in a closest-packed state so as to form a close-packed array, such as a square close-packed array, a delta close-packed array, or a hexagonal close-packed array. As shown in FIGS. 35A to 35C, for example, the square close-packed array is formed by arranging structures 4c each having a quadrangular bottom surface (such as a square shape) in a square close-packed state, that is, in a matrix state (a lattice state). For example, as shown in FIGS. 36A to 36C, the hexagonal close-packed array is formed by arranging structures 4c each having a hexagonal bottom surface in a hexagonal close-packed state. For example, as shown in FIGS. 37A and 37B, the delta close-packed array is formed by arranging structures 4c each having a triangle bottom surface (such as a triangular pyramid) in a closest-packed state.

The structure 4c is a convex portion or a concave portion of a corner cube shape, a hemispherical shape, a semi-ellipsoidal shape, a prism shape, a cylindrical shape, a free-form shape, a polygonal shape, a conical shape, a polygonal pyramid shape, a truncated cone shape, a paraboloidal surface shape, or the like. The bottom of the structure 4c has, for example, a circular shape, an elliptical shape, or a polygonal shape, such as a triangular shape, a quadrangular shape, a hexagonal shape, or an octagonal shape. A pitch P1 and a pitch P2 of the structure 4c are preferably appropriately selected in accordance with desired optical properties. In addition, when the primary axis of the structure 4c is inclined with respect to the normal orthogonal to an incident surface of an optical film 1, it is preferable that the primary axis of the structure 4c is inclined in at least one arrangement direction of the two-dimensional arrangement of the structures 4c. When the optical film 1 is adhered on a window material arranged in a direction approximately perpendicular to the ground, it is preferable that the primary axis of the structure 4c is inclined to a lower side of the window material (ground side) with respect to the normal.

When the structure 4c has a corner cube shape, if a ridgeline R is large, the primary axis is preferably inclined skyward, and in order to suppress downward reflection, the primary axis is preferably inclined to the ground side. Since being obliquely incident on a film, sunlight is not likely to reach the back of the structure, and hence, the shape thereof at an incident light side is important. That is, when R of a ridgeline portion is large, the amount of retroreflection light is decreased, and hence, by inclining the primary axis skyward, this phenomenon can be suppressed. In addition, in the corner cube body, when reflection is performed three times at a reflection surface, the retroreflection can be realized; however, light partially leak in a direction other than that of the retroreflection when reflection is performed twice. By inclining the corner cube to the ground side, a large part of this leakage light can be returned skyward. As described above, in accordance with the shape and/or the purpose, the primary axis may be inclined in any direction.

3. Third Embodiment

Figure 38A:
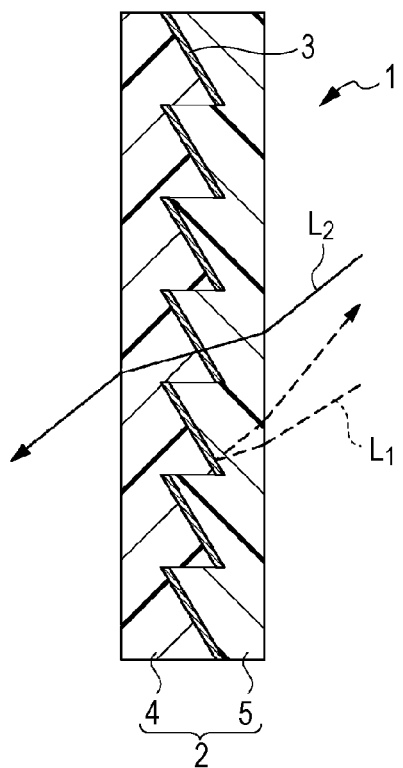
FIG. 38A is a cross-sectional view showing one structural example of an optical film according to a third embodiment.

FIG. 38A is a cross-sectional view showing one structural example of an optical film according to a third embodiment. In the third embodiment, elements corresponding to those in the first embodiment are designated by the same reference numerals as those in the first embodiment, and descriptions thereof are omitted. In the third embodiment, reflective layers 3 inclined to the incident surface on which light is incident are included in an optical layer 2 and are arranged in parallel to each other, and this is a point different from that of the first embodiment.

Figure 38B:
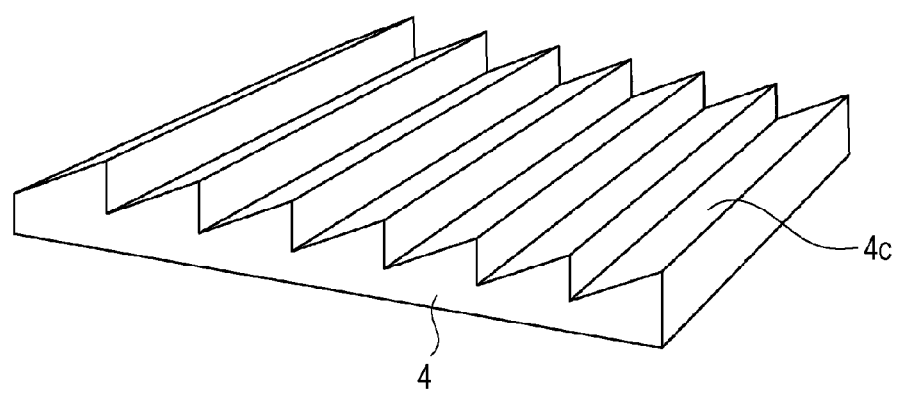
FIG. 38B is a perspective view showing one structural example of a first optical layer of the optical film according to the third embodiment.

FIG. 38B is a perspective view showing one example of the structure of the optical film according to the third embodiment. Structures 4c are each a convex portion of a triangular column extending in one direction and are one-dimensionally arranged in one direction. A cross-section of the structure 4c perpendicular to the extending direction has, for example, a right triangle shape. On the inclined surface of the structure 4c at an acute angle side, the reflective layer 3 is formed, for example, by a thin film-forming method, such as a deposition method or a sputtering method, having directivity.

According to the third embodiment, a plurality of reflective layers 3 is arranged in parallel in the optical layer 2. According to this structure, the number of reflections by the reflective layer 3 can be reduced as compared to that in the case in which the structure 4c having a corner cube shape or a prism shape is formed. Hence, the reflectance can be increased, and the absorption of light by the reflective layer 3 can be reduced.

4. Fourth Embodiment

In a fourth embodiment, light having a specific wavelength is directionally reflected, light having a wavelength other than the specific wavelength is scattered, and this is a point different from that of the first embodiment. An optical film 1 includes a light scattering material scattering incident light.

This scattering material is provided, for example, at least one of places located on a surface of an optical layer 2, in the optical layer 2, and between a reflective layer 3 and the optical layer 2. The light scattering material is preferably provided at least one of places located between the reflective layer 3 and a first optical layer 4, in the first optical layer 4, and on the surface thereof. When being adhered to a support member, such as a window material, the optical film 1 may be applied to either an indoor side or an outdoor side. When the optical film 1 is adhered to the outdoor side, a light scattering material scattering light having a wavelength other than the specific wavelength is preferably provided only between the reflective layer 3 and the support member, such as a window material. The reason for this is that when the light scattering material is present between the reflective layer 3 and an incident surface, directional reflection properties are lost. In addition, when the optical film 1 is adhered to the indoor side, the light scattering material is preferably provided between the reflective layer 3 and an emission surface opposite to the adhesion surface.

Figure 39A:
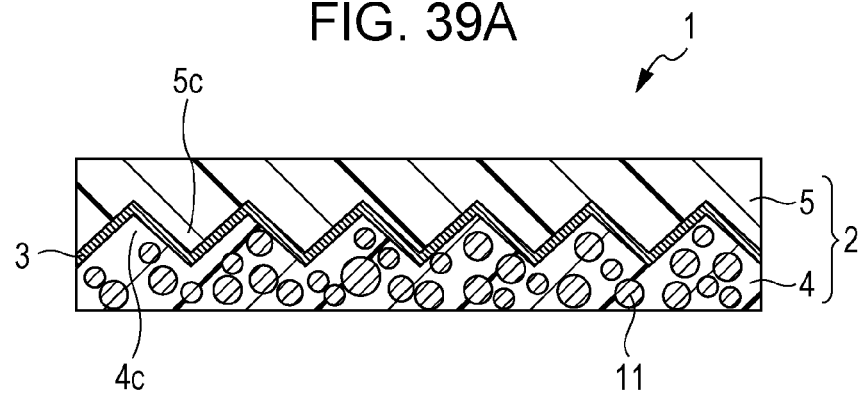
FIG. 39A is a cross-sectional view showing a first structural example of an optical film according to a fourth embodiment.

FIG. 39A is a cross-sectional view showing a first structural example of the optical film 1 according to the fourth embodiment. As shown in FIG. 39A, the first optical layer 4 contains a resin and fine particles 1l. The fine particles 11 have a different refractive index from that of the resin which is a primary component of the first optical layer 4. As the fine particles 1l, for example, at least one type of organic particles and inorganic particles may be used. In addition, hollow fine particles may also be used as the fine particles 1l. As the fine particles 1l, for example, inorganic particles, such as silica or alumina, or organic particles, such as a polystyrene, an acrylic resin, or a copolymer thereof, may be mentioned, and silica fine particles are particularly preferable.

Figure 39B:
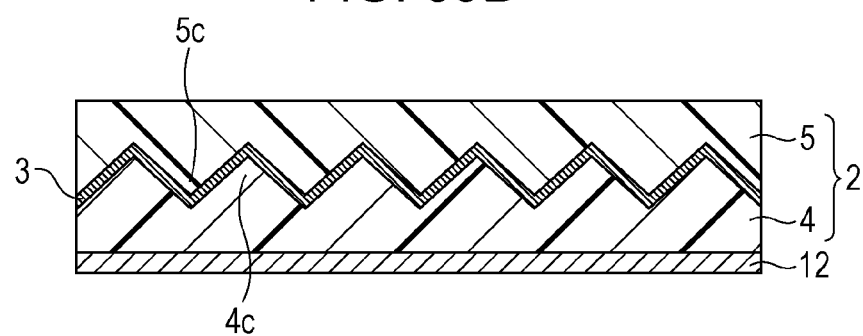
FIG. 39B is a cross-sectional view showing a second structural example of the optical film according to the fourth embodiment.

FIG. 39B is a cross-sectional view showing a second structural example of the optical film 1 according to the fourth embodiment. As shown in FIG. 39B, the optical film 1 further includes a light diffusion layer 12 on the surface of the first optical layer 4. The light diffusion layer 12 contains, for example, a resin and fine particles. As the fine particles, the same particles as those described above may be used.

Figure 39C:
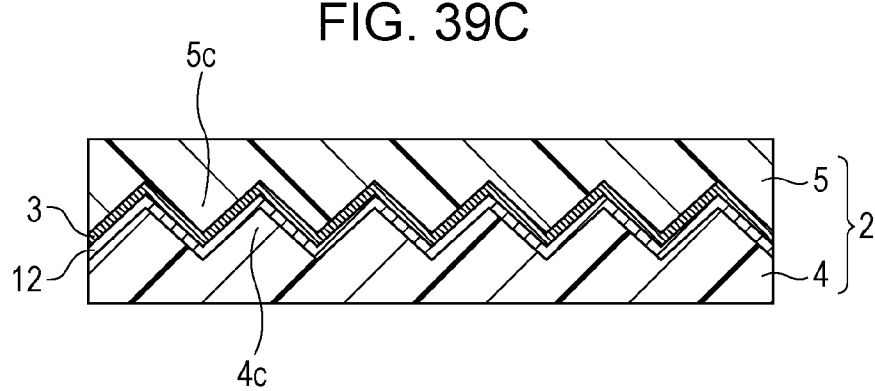
FIG. 39C is a cross-sectional view showing a third structural example of the optical film according to the fourth embodiment.

FIG. 39C is a cross-sectional view showing a third structural example of the optical film 1 according to the fourth embodiment. As shown in FIG. 39C, the optical film 1 further includes a light diffusion layer 12 between the reflective layer 3 and the first optical layer 4. The light diffusion layer 12 contains, for example, a resin and fine particles. As the fine particles, the same particles as those described above may be used.

According to the fourth embodiment, light, such as infrared light, having a specific wavelength can be directionally reflected, and light, such as visible light, having a wavelength other than the specific wavelength, can be scattered. Therefore, when the optical film 1 is made clouded as described above, design characteristics may be imparted thereto.

5. Fifth Embodiment

Figure 40A:
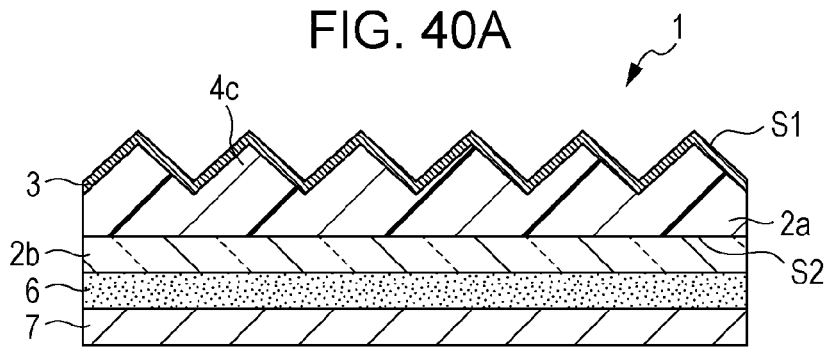
FIG. 40A is a cross-sectional view showing one structural example of an optical film according to a fifth embodiment.

FIG. 40A is a cross-sectional view showing one structural example of an optical film according to a fifth embodiment. In the fifth embodiment, elements corresponding to those in the first embodiment are designated by the same reference numerals as those in the first embodiment, and descriptions thereof are omitted. As shown in FIG. 40A, in an optical film 1 according to the fifth embodiment, a concavo-convex surface of an optical layer 2a is not embedded with a resin material, and a reflective layer 3 formed on the concavo-convex surface of the optical layer 2a is exposed; hence, this is a point different from that of the first embodiment. The optical film 1 has an incident surface S1 having a concavo-convex shape on which light, such as sunlight, is incident and an emission surface S2 from which, of light incident on this incident surface S1, light transmitting the optical film 1 is emitted.

If necessary, the optical film 1 may further include a base member 2b on the emission surface S2 of the optical layer 2a. In addition, if necessary, the optical film 1 may further includes a bonding layer 6 and a peeling layer 7 on the emission surface S2 of the optical layer 2a or on the base member 2b. As the optical layer 2a and the base member 2b, members similar to the first optical layer 4 and the base member 4a in the first embodiment may be used, respectively.

Figure 40B:
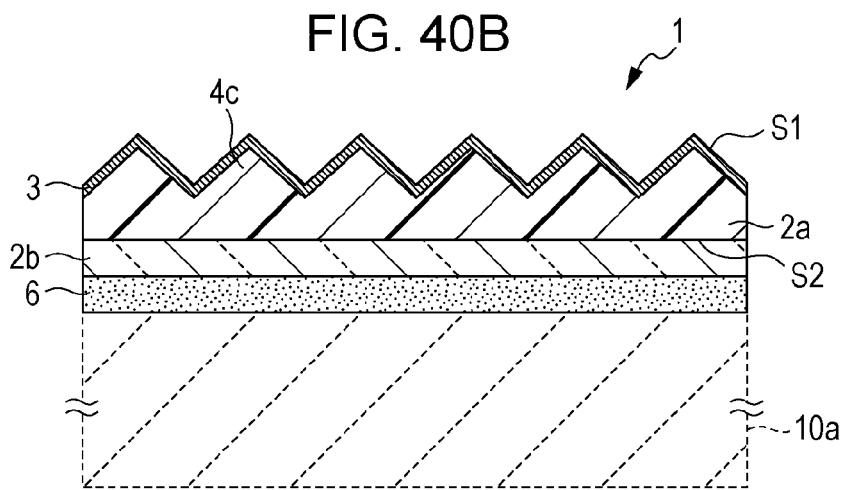
FIG. 40B is a cross-sectional view showing one structural example in which the optical film according to the fifth embodiment is adhered to an adherend.

FIG. 40B is a cross-sectional view showing one example in which the optical film according to the fifth embodiment is adhered to an adherend. As shown in FIG. 40B, the emission surface S2 of the optical film 1 is adhered, for example, to an adherend 10a with the bonding layer 6 interposed therebetween. As the adherend 10a, a window material, a blind, a rolling screen, a pleated screen, or the like is preferable.

According to the fifth embodiment, since the concavo-convex surface of the optical layer 2a on which the reflective layer 3 is formed is used as the incident surface S1, some of incident light is scattered by the incident surface S1, and some of light which is no scattered transmits the optical film 1. Hence, an opaque optical film 1 can be obtained although the brightness of light can be sensed by incident light. The optical film 1 having properties as described above is preferably used, for example, for an interior member, an exterior member, or an insolation shielding member, each of which is used to protect personal privacy, and more particularly, for a window material, a blind, a rolling screen, a pleated screen, or the like.

6. Sixth Embodiment

Figure 41:
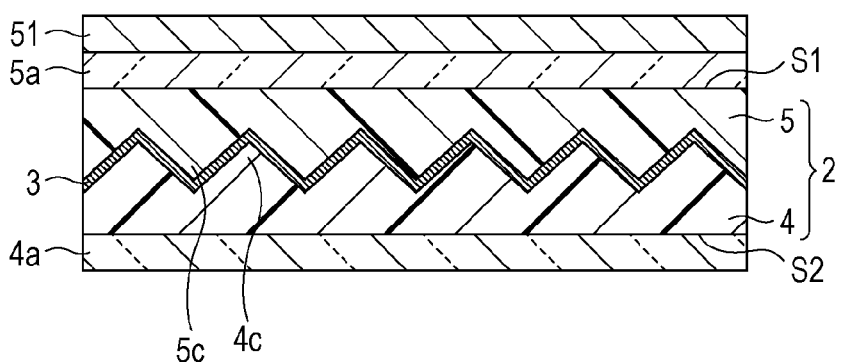
FIG. 41 is a cross-sectional view showing one structural example of an optical film according to a sixth embodiment.

FIG. 41 is a cross-sectional view showing one structural example of an optical film according to a sixth embodiment. In the sixth embodiment, a self-cleaning effect layer 51 having a cleaning effect is further provided on an exposed surface, which is one of an incident surface S1 and an emission surface S2 of an optical film 1, opposite to a surface adhered to an adherend, and this is a point different from that of the first embodiment. The self-cleaning effect layer contains, for example, a photocatalyst. As the photocatalyst, for example, $TiO_2$ may be used.

As described above, the optical film 1 allows incident light to partially transmit therethrough. For example, when the optical film 1 is used outdoors or in a very dirty room, light is scattered by dust attached to the surface of the optical film 1, and transmission properties and reflection properties thereof will be lost; hence, the surface of the optical film 1 preferably maintains optically transparency at any time. Therefore, it is preferable that the surface is excellent, for example, in water-repellent or hydrophilic properties and automatically exhibits a cleaning effect.

According to the sixth embodiment, since the optical film 1 includes a self-cleaning effect layer 51, for example, water-repellent or hydrophilic properties can be imparted to the incident surface. Therefore, adhesion of stains or the like to the incident surface is suppressed, and degradation in directional reflection properties can be suppressed.

7. Seventh Embodiment

In the first embodiment, although the case in which the present application is applied, for example, to a window material is described by way of example, the present application is not limited thereto and may also be applied to an interior member, an exterior member, or the like other than the window material. In addition, besides fixed interior members and exterior members, such as walls and roofs, the present application may also be applied to a device which can introduce sunlight into a space, such as a room, by moving an interior member or an exterior member to adjust a transmission quantity and/or a reflection quantity of sunlight in accordance with the change in light quantity of sunlight caused by the change in seasons and times. In a seventh embodiment, as one example of the device described above, an insolation shielding device (blind device) will be described which is able to adjust a shielding quantity of incident light by changing the angle of an insolation shielding member group including a plurality of insolation shielding members.

Figure 42:
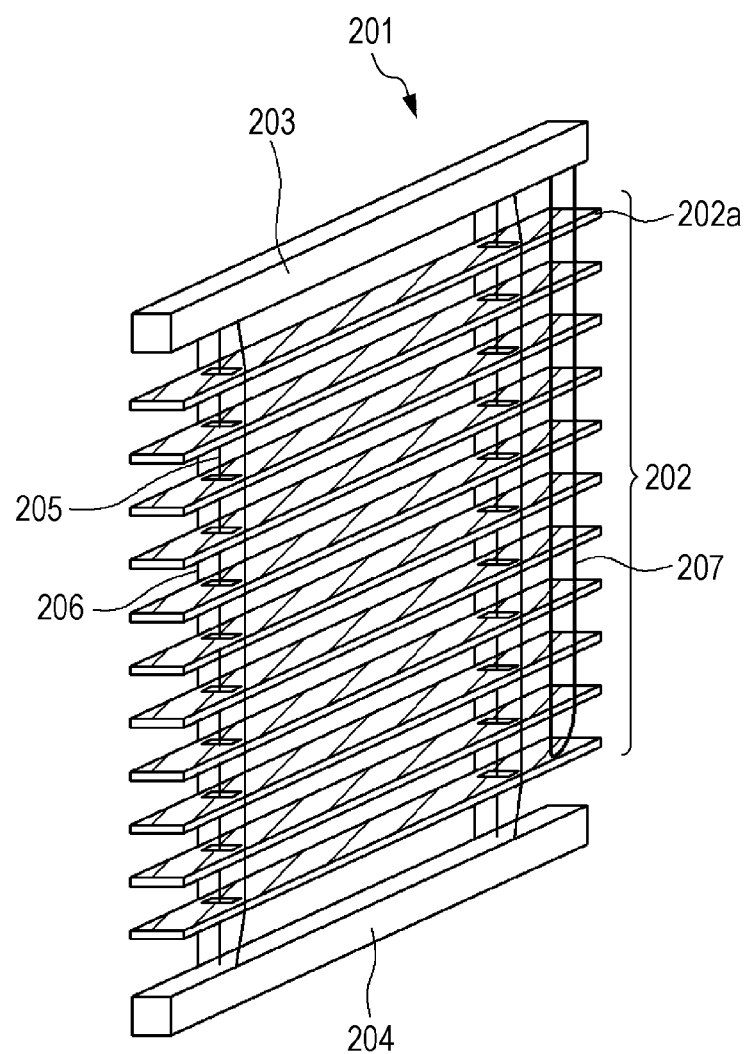
FIG. 42 is a perspective view showing one structural example of a blind device according to a seventh embodiment.

FIG. 42 is a perspective view showing one structural example of a blind device according to the seventh embodiment. As shown in FIG. 42, a blind device 201 which is an insolation shielding device includes a head box 203, a slat group (insolation shielding member group) 202 formed of a plurality of slats (feathers) 202a, and a bottom rail 204. The head box 203 is provided above the slat group 202 formed of a plurality of slats 202a. From the head box 203, a ladder code 206 and an up-and-down code 205 extend downward, and the bottom rail 204 is suspended at the lower ends of these codes. The slats 202a which are insolation shielding members each have, for example, a long and narrow rectangular shape and are suspended and supported with predetermined intervals by the ladder code 206 extending downward from the head box 203. In addition, an operation unit (not shown), such as a rod, for adjusting the angle of the slat group 202 formed of a plurality of slats 202a is provided in the head box 203.

The head box 203 is a driving unit which adjusts the quantity of light introduced into a space, such as a room, by rotating the slat group 202 formed of a plurality of slats 202a in response to the operation of the operation unit such as a rod. In addition, the head box 203 also functions as a driving unit (up-and-down unit) of appropriately moving the slat group 202 up and down in response to the operation of an operation unit such as an up-and-down operation code 207.

Figure 43A:
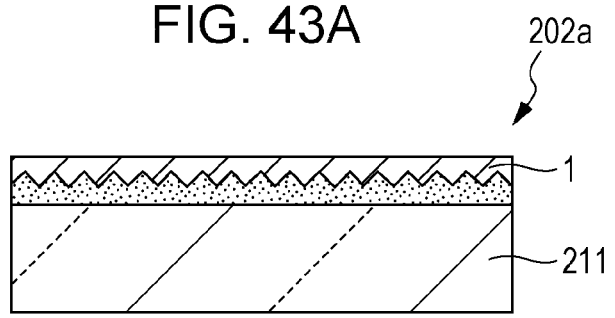
FIG. 43A is a cross-sectional view showing a first structural example of a slat.

FIG. 43A is a cross-sectional view showing a first structural example of the slat. As shown in FIG. 43A, the slat 202a includes a base member 211 and an optical film 1. Of the two primary surfaces of the base member 211, the optical film 1 is preferably provide at an incident surface side (for example, a side facing a window material) on which outdoor light is incident when the slat group 202 is closed. The optical film 1 and the base member 211 are bonded to each other, for example, with a bonding layer, such as an adhesive layer or a tacky layer.

As the shape of the base member 211, for example, a sheet, a film, or a plate shape may be mentioned. As a material for the base member 211, for example, a glass, a resin material, a paper material, or a cloth material may be used, and in consideration of introduction of visible light into a predetermined space, such as a room, a resin material having transparency is preferably used. As a glass, a resin material, a paper material, or a cloth material, a material which is commonly used as a related rolling screen may be used. As the optical film 1, the optical films 1 according to the first to the sixth embodiments may be used alone or in combination.

Figure 43B:
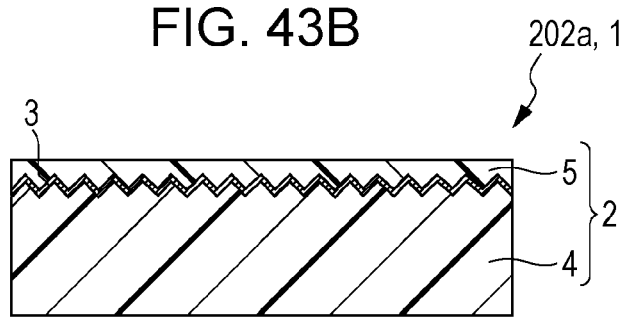
FIG. 43B is a cross-sectional view showing a second structural example of the slat.

FIG. 43B is a cross-sectional view showing a second structural example of the slat. As shown in FIG. 43B, in this second structural example, an optical film 1 is used as the slat 202a. It is preferable that the optical film 1 can be supported by the ladder code 206 and has rigidity so as to maintain its shape while being supported.

8. Eighth Embodiment

In an eighth embodiment, a rolling screen device will be described which is one example of an insolation shielding device capable of adjusting the shielding quantity of incident light by rolling up or out an insolation shielding member.

Figure 44A:
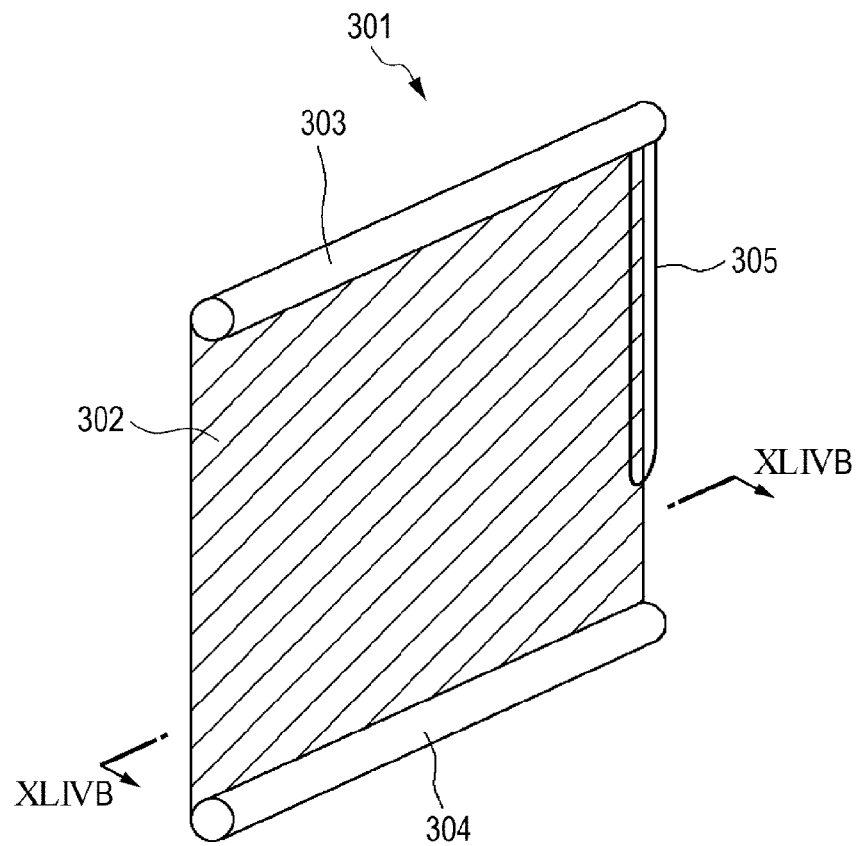
FIG. 44A is a perspective view showing one structural example of a rolling screen device according to an eighth embodiment.

FIG. 44A is a perspective view showing one structural example of the rolling screen device according to the eighth embodiment. As shown in FIG. 44A, a rolling screen device 301 which is an insolation shielding device includes a screen 302, a head box 303, and a core material 304. The head box 303 is configured to move the screen 302 up and down by operating an operation unit, such as a chain 305. The head box 303 has a roller to roll up the screen inside and to roll it out, and one end of the screen 302 is bonded to this roller. In addition, the core material 304 is bonded to the other end of the screen 302. The screen 302 has flexibility, and the shape thereof is not particularly limited and is preferably selected in accordance with the shape of a window material or the like, such as a rectangular shape, to which the rolling screen device 301 is applied.

Figure 44B:
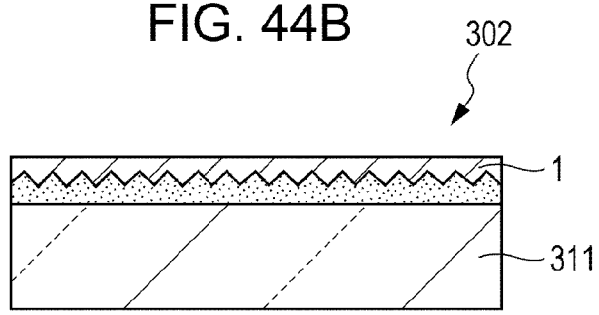
FIG. 44B is a cross-sectional view showing one structural example of a screen 302.

FIG. 44B is a cross-sectional view showing one structural example of the screen 302. As shown in FIG. 44B, the screen 302 includes a base member 311 and an optical film 1 and preferably has flexibility. Of the two primary surfaces of the base member 311, the optical film 1 is preferably provided at an incident surface side (side facing a window material) on which outdoor light is incident. The optical film 1 and the base member 311 are bonded to each other, for example, by a bonding layer, such as an adhesive layer or a tacky layer. In addition, the structure of the screen 302 is not limited to this example, and the optical film 1 itself may also be used as the screen 302.

As the shape of the base member 311, for example, a sheet, a film, or a plate shape may be mentioned. As a material for the base member 311, for example, a glass, a resin material, a paper material, or a cloth material may be used, and in consideration of introduction of visible light into a predetermined space, such as a room, a resin material having transparency is preferably used. As a glass, a resin material, a paper material, or a cloth material, a material which is commonly used as a related rolling screen may be used. As the optical film 1, the optical films 1 according to the first to the sixth embodiments may be used alone or in combination.

9. Ninth Embodiment

In a ninth embodiment, an example will be described in which the present application is applied to a fitting (an interior member or an exterior member) having a lighting portion in which an optical element having directional reflection properties is provided.

Figure 45A:
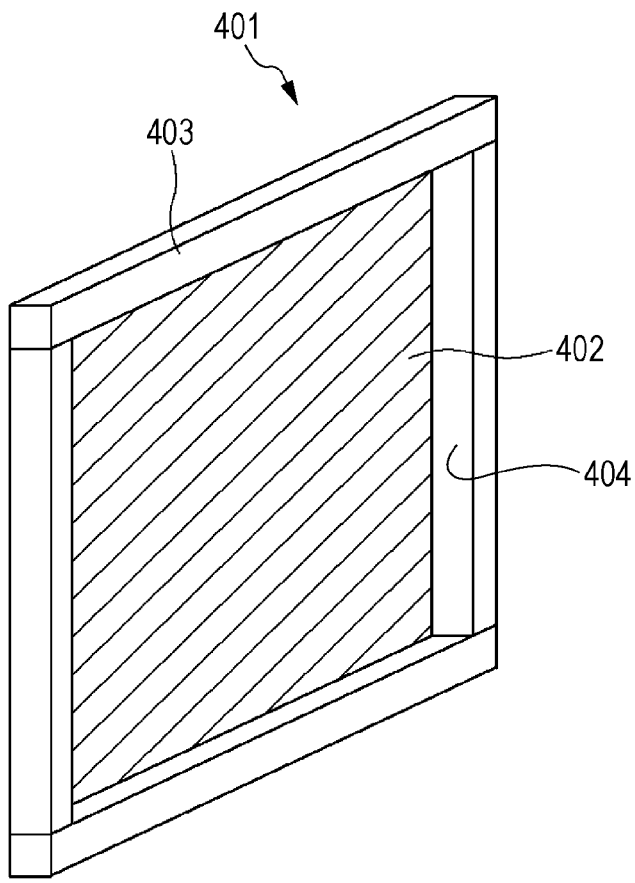
FIG. 45A is a perspective view showing one structural example of a shoji (Japanese paper shielding door) according to a ninth embodiment.

FIG. 45A is a perspective view showing one structural example of a fitting according to the ninth embodiment. As shown in FIG. 45A, a fitting 401 has the structure in which an optical element 402 is provided in a lighting portion 404. In particular, the fitting 401 includes the optical element 402 and a frame member 403 provided along the periphery thereof. The optical element 402 is fixed by the frame member 403, and if necessary, the optical element 402 can be removed by disassembling the frame member 403. As the fitting 401, for example, although a paper shielding door, such as a Japanese shoji, may be mentioned, the present application is not limited to this example and may also be applied to various fittings each having a lighting portion.

Figure 45B:
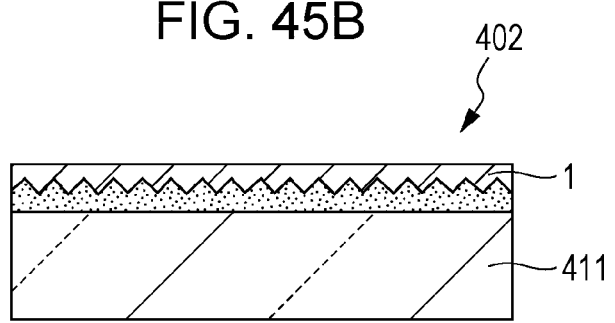
FIG. 45B is a cross-sectional view showing one structural example of the shoji.

FIG. 45B is a cross-sectional view showing one structural example of the optical element 402. As shown in FIG. 45B, the optical element 402 includes a base member 411 and an optical film 1. Of the two primary surfaces of the base member 411, the optical film 1 is provided at an incident surface side (side facing a window material) on which outdoor light is incident. The optical film 1 and the base member 411 are bonded to each other, for example, by a bonding layer, such as an adhesive layer or a tacky layer. In addition, the structure of the shoji 402 is not limited to this example, and the optical film 1 itself may also be used as the optical element 402.

The base member 411 is, for example, a sheet, a film, or a substrate, each of which has flexibility. As the base member 411, for example, a glass, a resin material, a paper material, or a cloth material may be used, and in consideration of introduction of visible light into a predetermined space, such as a room, a resin material having transparency is preferably used. As a glass, a resin material, a paper material, or a cloth material, a material which is commonly used as an optical element of a related fitting may be used. As the optical film 1, the optical films 1 according to the first to the sixth embodiments may be used alone or in combination.

Examples

Hereafter, although the present application will be particularly described with reference to examples, this present application is not limited only to these examples.

In the following examples, the optical properties of a laminated film were obtained by simulation in which the thicknesses of individual layers of the laminated film of a reflective layer 3 were changed. The simulation was performed using an optical simulation software "Light Tools" of Optical Research Associates (ORA) for each of laminated films of the following Sample 1-1 to Sample 7-5, and the values of the visible light transmittance, the shielding factor, the blueness index, and the redness index were obtained by changing the ratio α and the ratio β.

(Sample 1-1)

First, it was assumed that high refractive-index layers and metal layers were laminated to form a laminated film having a five-layer structure. The details of the structure of this laminated film are shown below.

Lamination structure: high refractive-index layer/metal layer/high refractive-index layer/metal layer/high refractive-index layer Total film thickness L: 80 nm
High refractive-index layer:
Material: GAZO
Refractive index: 1.936
Geometric film thickness of each of the first and the fifth layers: 6.73 nm
Geometric film thickness of the third layer: 56.53 nm
Metal layer:
Material: AgNdCu
Refractive index: 0.164
Geometric film thickness of each of the second and the fourth layers: 5.0 nm
Ratio α: 0.0121
Ratio β: 8.4

(Sample 1-2)

The laminated film was assumed in a manner similar to that of Sample 1-1 except that the film thicknesses of the individual layers were changed so that the ratio α was 0.0138 and the ratio β was 12.4.

(Sample 1-3)

The laminated film was assumed in a manner similar to that of Sample 1-1 except that the film thicknesses of the individual layers were changed so that the ratio α was 0.0138 and the ratio β was 17.9.

(Sample 1-4)

The laminated film was assumed in a manner similar to that of Sample 1-1 except that the film thicknesses of the individual layers were changed so that the ratio α was 0.0155 and the ratio β was 17.4.

(Sample 1-5)

The laminated film was assumed in a manner similar to that of Sample 1-1 except that the film thicknesses of the individual layers were changed so that the ratio α was 0.0172 and the ratio β was 14.6.

(Sample 2-1)

The laminated film was assumed in a manner similar to that of Sample 1-1 except that the total film thickness L was set to 90 nm and the film thicknesses of the individual layers were changed so that the ratio α was 0.0106 and the ratio β was 4.

(Sample 2-2)

The laminated film was assumed in a manner similar to that of Sample 2-1 except that the film thicknesses of the individual layers were changed so that the ratio α was 0.0123 and the ratio β was 10.6.

(Sample 2-3)

The laminated film was assumed in a manner similar to that of Sample 2-1 except that the film thicknesses of the individual layers were changed so that the ratio α was 0.014 and the ratio β was 7.6.

(Sample 2-4)

The laminated film was assumed in a manner similar to that of Sample 2-1 except that the film thicknesses of the individual layers were changed so that the ratio α was 0.0157 and the ratio β was 1.6.

(Sample 2-5)

The laminated film was assumed in a manner similar to that of Sample 2-1 except that the film thicknesses of the individual layers were changed so that the ratio α was 0.0157 and the ratio β was 9.

(Sample 3-1)

The laminated film was assumed in a manner similar to that of Sample 1-1 except that the total film thickness L was set to 100 nm and the film thicknesses of the individual layers were changed so that the ratio α was 0.0095 and the ratio β was 4.2.

(Sample 3-2)

The laminated film was assumed in a manner similar to that of Sample 3-1 except that the film thicknesses of the individual layers were changed so that the ratio α was 0.0122 and the ratio β was 6.6.

(Sample 3-3)

The laminated film was assumed in a manner similar to that of Sample 3-1 except that the film thicknesses of the individual layers were changed so that the ratio α was 0.0129 and the ratio β was 4.8.

(Sample 3-4)

The laminated film was assumed in a manner similar to that of Sample 3-1 except that the film thicknesses of the individual layers were changed so that the ratio α was 0.0129 and the ratio β was 7.4.

(Sample 3-5)

The laminated film was assumed in a manner similar to that of Sample 3-1 except that the film thicknesses of the individual layers were changed so that the ratio α was 0.0146 and the ratio β was 4.8.

(Sample 4-1)
The laminated film was assumed in a manner similar to that of Sample 1-1 except that the total film thickness L was set to 120 nm and the film thicknesses of the individual layers were changed so that the ratio α was 0.0094 and the ratio β was 3.

(Sample 4-2)
The laminated film was assumed in a manner similar to that of Sample 4-1 except that the film thicknesses of the individual layers were changed so that the ratio α was 0.0111 and the ratio β was 4.6.

(Sample 4-3)
The laminated film was assumed in a manner similar to that of Sample 4-1 except that the film thicknesses of the individual layers were changed so that the ratio α was 0.0128 and the ratio β was 4.

(Sample 4-4)
The laminated film was assumed in a manner similar to that of Sample 4-1 except that the film thicknesses of the individual layers were changed so that the ratio α was 0.0128 and the ratio β was 5.8.

(Sample 4-5)
The laminated film was assumed in a manner similar to that of Sample 4-1 except that the film thicknesses of the individual layers were changed so that the ratio α was 0.0145 and the ratio β was 3.

(Sample 5-1)
The laminated film was assumed in a manner similar to that of Sample 1-1 except that the total film thickness L was set to 140 nm and the film thicknesses of the individual layers were changed so that the ratio α was 0.0065 and the ratio β was 2.4.

(Sample 5-2)
The laminated film was assumed in a manner similar to that of Sample 5-1 except that the film thicknesses of the individual layers were changed so that the ratio α was 0.0082 and the ratio β was 3.8.

(Sample 5-3)
The laminated film was assumed in a manner similar to that of Sample 5-1 except that the film thicknesses of the individual layers were changed so that the ratio α was 0.0099 and the ratio β was 1.6.

(Sample 5-4)
The laminated film was assumed in a manner similar to that of Sample 5-1 except that the film thicknesses of the individual layers were changed so that the ratio α was 0.0099 and the ratio β was 4.2.

(Sample 5-5)
The laminated film was assumed in a manner similar to that of Sample 5-1 except that the film thicknesses of the individual layers were changed so that the ratio α was 0.0116 and the ratio β was 1.6.

(Sample 6-1)
The laminated film was assumed in a manner similar to that of Sample 1-1 except that the total film thickness L was set to 160 nm and the film thicknesses of the individual layers were changed so that the ratio α was 0.0057 and the ratio β was 2.2.

(Sample 6-2)
The laminated film was assumed in a manner similar to that of Sample 6-1 except that the film thicknesses of the individual layers were changed so that the ratio α was 0.0074 and the ratio β was 3.6.

(Sample 6-3)
The laminated film was assumed in a manner similar to that of Sample 6-1 except that the film thicknesses of the individual layers were changed so that the ratio α was 0.0091 and the ratio β was 1.6.

(Sample 6-4)
The laminated film was assumed in a manner similar to that of Sample 6-1 except that the film thicknesses of the individual layers were changed so that the ratio α was 0.0108 and the ratio β was 1.2.

(Sample 6-5)
The laminated film was assumed in a manner similar to that of Sample 6-1 except that the film thicknesses of the individual layers were changed so that the ratio α was 0.0125 and the ratio β was 3.2.

(Sample 7-1)
The laminated film was assumed in a manner similar to that of Sample 1-1 except that the total film thickness L was set to 180 nm and the film thicknesses of the individual layers were changed so that the ratio α was 0.005 and the ratio β was 1.8.

(Sample 7-2)
The laminated film was assumed in a manner similar to that of Sample 7-1 except that the film thicknesses of the individual layers were changed so that the ratio α was 0.0067 and the ratio β was 3.4.

(Sample 7-3)
The laminated film was assumed in a manner similar to that of Sample 7-1 except that the film thicknesses of the individual layers were changed so that the ratio α was 0.0101 and the ratio β was 2.

(Sample 7-4)
The laminated film was assumed in a manner similar to that of Sample 7-1 except that the film thicknesses of the individual layers were changed so that the ratio α was 0.0118 and the ratio β was 1.6.

(Sample 7-5)
The laminated film was assumed in a manner similar to that of Sample 7-1 except that the film thicknesses of the individual layers were changed so that the ratio α was 0.0135 and the ratio β was 2.

[Simulation Results]
The results of the simulation on the laminated films of Sample 1-1 to Sample 7-5 are shown in Table 1.

TABLE 1

| SAMPLE | LAMINATION STRUCTURE (FIRST/SECOND/THIRD/ FOURTH/FIFTH LAYER) | TOTAL FILM THICKNESS L [nm] | α | β | GEOMETRIC FILM THICKNESS (FIRST/SECOND/THIRD/ FOURTH/FIFTH LAYER) [nm] |
|---|---|---|---|---|---|
| 1-1 | GAZO/AgNdCu/GAZO/ | 80 | 0.0121 | 8.4 | 6.73/5.0/56.53/5.0/6.73 |
| 1-2 | AgNdCu/GAZO | | 0.0138 | 12.4 | 4.78/5.61/59.23/5.61/4.78 |
| 1-3 | | | 0.0138 | 17.9 | 3.46/5.61/61.87/5.61/3.46 |
| 1-4 | | | 0.0155 | 17.4 | 3.49/6.19/60.65/6.19/3.49 |
| 1-5 | | | 0.0172 | 14.6 | 4.01/6.75/58.49/6.75/4.01 |
| 2-1 | GAZO/AgNdCu/GAZO/ | 90 | 0.0106 | 4 | 13.33/5.00/53.33/5.00/13.33 |
| 2-2 | AgNdCu/GAZO | | 0.0123 | 10.6 | 6.24/5.70/66.13/5.70/6.24 |
| 2-3 | | | 0.014 | 7.6 | 8.05/6.37/61.16/6.37/8.05 |
| 2-4 | | | 0.0157 | 1.6 | 21.10/7.03/33.76/7.03/21.10 |
| 2-5 | | | 0.0157 | 9 | 6.90/7.03/62.14/7.03/6.90 |

TABLE 1-continued

| 3-1 | GAZO/AgNdCu/GAZO/ | 100 | 0.0095 | 4.2 | 14.50/5.05/60.92/5.04/14.50 |
| 3-2 | AgNdCu/GAZO | | 0.0112 | 6.6 | 10.27/5.83/67.80/5.83/10.27 |
| 3-3 | | | 0.0129 | 4.8 | 12.77/6.60/61.27/6.60/12.77 |
| 3-4 | | | 0.0129 | 7.4 | 9.23/6.60/68.34/6.60/9.23 |
| 3-5 | | | 0.0146 | 4.8 | 12.55/7.34/60.23/7.34/12.55 |
| 4-1 | GAZO/AgNdCu/GAZO/ | 120 | 0.0094 | 3 | 21.60/5.99/64.81/5.99/21.60 |
| 4-2 | AgNdCu/GAZO | | 0.0111 | 4.6 | 16.08/6.95/73.95/6.95/16.08 |
| 4-3 | | | 0.0128 | 4 | 17.38/7.87/69.50/7.87/17.38 |
| 4-4 | | | 0.0128 | 5.8 | 13.37/7.87/77.52/7.87/13.37 |
| 4-5 | | | 0.0145 | 3 | 20.50/8.76/61.49/8.76/20.50 |
| 5-1 | GAZO/AgNdCu/GAZO/ | 140 | 0.0065 | 2.4 | 29.54/5.00/70.90/5.00/29.54 |
| 5-2 | AgNdCu/GAZO | | 0.0082 | 3.8 | 22.00/6.19/83.61/6.19/22.00 |
| 5-3 | | | 0.0099 | 1.6 | 34.82/7.33/55.70/7.33/34.82 |
| 5-4 | | | 0.0099 | 4.2 | 20.22/7.33/84.90/7.33/20.22 |
| 5-5 | | | 0.0116 | 1.6 | 34.20/8.43/54.72/8.43/34.20 |
| 6-1 | GAZO/AgNdCu/GAZO/ | 160 | 0.0057 | 2.2 | 35.70/5.02/78.55/5.02/35.70 |
| 6-2 | AgNdCu/GAZO | | 0.0074 | 3.6 | 26.28/6.40/94.62/6.40/26.28 |
| 6-3 | | | 0.0091 | 1.6 | 40.15/7.73/64.24/7.73/40.15 |
| 6-4 | | | 0.0108 | 1.2 | 44.37/9.02/53.24/9.02/44.37 |
| 6-5 | | | 0.0125 | 3.2 | 26.83/10.25/85.84/10.25/26.83 |
| 7-1 | GAZO/AgNdCu/GAZO/ | 180 | 0.005 | 1.8 | 44.73/5.01/80.51/5.01/44.73 |
| 7-2 | AgNdCu/GAZO | | 0.0067 | 3.4 | 30.89/6.59/105.04/6.59/30.89 |
| 7-3 | | | 0.0101 | 2 | 40.21/9.57/80.43/9.57/40.21 |
| 7-4 | | | 0.0118 | 1.6 | 43.90/10.98/70.24/10.98/43.90 |
| 7-5 | | | 0.0135 | 2 | 38.83/12.35/77.65/12.35/38.83 |

| SAMPLE | OPTICAL FILM THICKNESS (FIRST/THIRD/FIFTH LAYER) [nm] | VISIBLE LIGHT TRANSMITTANCE [%] | SHIELDING FACTOR | BLUENESS INDEX | REDNESS INDEX |
|---|---|---|---|---|---|
| 1-1 | 13.03/109.44/13.03 | 77 | 0.66 | 0.147 | 0.175 |
| 1-2 | 9.25/114.68/9.25 | 75.2 | 0.63 | 0.148 | 0.206 |
| 1-3 | 6.69/119.79/6.69 | 75.6 | 0.63 | 0.159 | 0.194 |
| 1-4 | 6.75/117.42/6.75 | 73 | 0.59 | 0.149 | 0.244 |
| 1-5 | 7.76/113.23/7.76 | 69.4 | 0.56 | 0.133 | 0.302 |
| 2-1 | 25.81/103.25/25.81 | 77 | 0.67 | 0.138 | 0.171 |
| 2-2 | 12.08/128.02/12.08 | 76 | 0.64 | 0.173 | 0.167 |
| 2-3 | 15.58/118.40/15.58 | 73 | 0.59 | 0.145 | 0.236 |
| 2-4 | 40.84/65.35/40.84 | 60.7 | 0.53 | 0.165 | 0.39 |
| 2-5 | 13.37/120.30/13.37 | 70.4 | 0.56 | 0.143 | 0.283 |
| 3-1 | 2.08/117.94/28.08 | 78 | 0.69 | 0.149 | 0.143 |
| 3-2 | 19.89/131.25/19.89 | 76.4 | 0.64 | 0.171 | 0.156 |
| 3-3 | 24.71/118.63/24.71 | 73 | 0.59 | 0.138 | 0.233 |
| 3-4 | 17.88/132.30/17.88 | 74.3 | 0.6 | 0.171 | 0.198 |
| 3-5 | 24.29/116.60/24.29 | 69.4 | 0.55 | 0.129 | 0.296 |
| 4-1 | 41.82/125.47/41.82 | 77 | 0.66 | 0.131 | 0.158 |
| 4-2 | 31.12/143.17/31.12 | 75 | 0.61 | 0.171 | 0.167 |
| 4-3 | 33.64/134.56/33.64 | 71.7 | 0.56 | 0.146 | 0.247 |
| 4-4 | 25.88/150.09/25.88 | 72.7 | 0.56 | 0.2 | 0.2 |
| 4-5 | 39.68/119.04/36.68 | 65 | 0.51 | 0.113 | 0.358 |
| 5-1 | 57.20/137.27/57.20 | 80.3 | 0.74 | 0.112 | 0.119 |
| 5-2 | 42.60/161.88/42.60 | 77 | 0.67 | 0.169 | 0.112 |
| 5-3 | 67.40/107.84/67.40 | 71.7 | 0.59 | 0.106 | 0.247 |
| 5-4 | 39.14/164.38/39.14 | 75 | 0.61 | 0.196 | 0.127 |
| 5-5 | 66.22/105.95/66.22 | 66 | 0.53 | 0.113 | 0.327 |
| 6-1 | 69.12/152.07/69.12 | 81.5 | 0.75 | 0.102 | 0.112 |
| 6-2 | 50.89/183.19/50.89 | 76.6 | 0.68 | 0.174 | 0.108 |
| 6-3 | 77.73/124.36/77.73 | 73.4 | 0.59 | 0.099 | 0.219 |
| 6-4 | 85.89/103.07/85.89 | 62.8 | 0.51 | 0.149 | 0.346 |
| 6-5 | 51.93/166.19/51.93 | 70 | 0.51 | 0.194 | 0.234 |
| 7-1 | 86.60/155.87/86.60 | 82.5 | 0.76 | 0.108 | 0.107 |
| 7-2 | 59.81/203.35/59.81 | 75.8 | 0.69 | 0.176 | 0.115 |
| 7-3 | 77.86/155.71/77.86 | 73 | 0.55 | 0.114 | 0.216 |
| 7-4 | 84.99/135.98/84.99 | 63 | 0.47 | 0.112 | 0.365 |
| 7-5 | 75.17/150.34/75.17 | 61.6 | 0.44 | 0.119 | 0.368 |

From Table 1, the following are found.

($L$=80 nm)

When the Visible Light Transmittance, the Blueness Index, and the redness index are used as the parameters, since Samples 1-1, 1-2, and 1-4 satisfy the conditions of the individual parameters, the set ratio α and ratio β are in the region show in FIG. 17. In Sample 1-3, the condition of the blueness index is not satisfied, and hence, the set ratio α and ratio β are out of the region shown in FIG. 17. In Sample 1-5, the conditions of the visible light transmittance and the redness index are not satisfied, and hence, the set ratio α and ratio β are out of the region shown in FIG. 17.

In addition, besides the visible light transmittance, the blueness index, and the redness index, when the shielding factor is further used as the parameter, in Sample 1-4, the condition of the shielding factor is also satisfied, and hence, the set ratio α and ratio β are in the region shown in FIG. 24.

In Samples 1-1 and 1-2, the condition of the shielding factor is not satisfied, and hence, the set ratio α and ratio β are out of the region shown in FIG. 24.

(L=90 nm)

When the Visible Light Transmittance, the Blueness Index, and the redness index are used as the parameters, since Samples 2-1 and 2-3 satisfy the conditions of the individual parameters, the set ratio α and ratio β are in the region show in FIG. 18. In Sample 2-2, the condition of the blueness index is not satisfied, and hence the set ratio α and ratio β are out of the region shown in FIG. 18. In Sample 2-4, the conditions of the visible light transmittance, the blueness index, and the redness index are not satisfied, and hence, the set ratio α and ratio β are out of the region shown in FIG. 18. In Sample 2-5, the condition of the redness index is not satisfied, and hence, the set ratio α and ratio β are out of the region shown in FIG. 18.

In addition, besides the visible light transmittance, the blueness index, and the redness index, when the shielding factor is further used as the parameter, in Sample 2-3, the condition of the shielding factor is also satisfied, and hence, the set ratio α and ratio β are in the region shown in FIG. 25. In Sample 2-1, the condition of the shielding factor is not satisfied, and hence, the set ratio α and ratio β are out of the region shown in FIG. 25.

(L=100 nm)

When the Visible Light Transmittance, the Blueness Index, and the redness index are used as the parameters, since Samples 3-1 and 3-3 satisfy the conditions of the individual parameters, the set ratio α and ratio β are in the region show in FIG. 19. In Samples 3-2 and 3-4, the condition of the blueness index is not satisfied, and hence, the set ratio α and ratio β are out of the region shown in FIG. 19. In Sample 3-5, the conditions of the visible light transmittance and the redness index are not satisfied, and hence, the set ratio α and ratio β are out of the region shown in FIG. 19.

In addition, besides the visible light transmittance, the blueness index, and the redness index, when the shielding factor is further used as the parameter, in Sample 3-3, the condition of the shielding factor is also satisfied, and hence, the set ratio α and ratio β are in the region shown in FIG. 26. In Sample 3-1, the condition of the shielding factor is not satisfied, and hence, the set ratio α and ratio β are out of the region shown in FIG. 26.

(L=120 nm)

When the Visible Light Transmittance, the Blueness Index, and the redness index are used as the parameters, since Samples 4-1 and 4-3 satisfy the conditions of the individual parameters, the set ratio α and ratio β are in the region show in FIG. 20. In Samples 4-2 and 4-4, the condition of the blueness index is not satisfied, and hence, the set ratio α and ratio β are out of the region shown in FIG. 20. In Sample 4-5, the conditions of the visible light transmittance and the redness index are not satisfied, and hence, the set ratio α and ratio β are out of the region shown in FIG. 20.

In addition, besides the visible light transmittance, the blueness index, and the redness index, when the shielding factor is further used as the parameter, in Sample 4-3, the condition of the shielding factor is also satisfied, and hence, the set ratio α and ratio β are in the region shown in FIG. 27. In Sample 4-1, the condition of the shielding factor is not satisfied, and hence, the set ratio α and ratio β are out of the region shown in FIG. 27.

(L=140 nm)

When the Visible Light Transmittance, the Blueness Index, and the redness index are used as the parameters, since Samples 5-1 and 5-3 satisfy the conditions of the individual parameters, the set ratio α and ratio β are in the region show in FIG. 21. In Samples 5-2 and 5-4, the condition of the blueness index is not satisfied, and hence, the set ratio α and ratio β are out of the region shown in FIG. 21. In Sample 5-5, the conditions of the visible light transmittance and the redness index are not satisfied, and hence, the set ratio α and ratio β are out of the region shown in FIG. 21.

In addition, besides the visible light transmittance, the blueness index, and the redness index, when the shielding factor is further used as the parameter, in Sample 5-3, the condition of the shielding factor is also satisfied, and hence, the set ratio α and ratio β are in the region shown in FIG. 28. In Sample 5-1, the condition of the shielding factor is not satisfied, and hence, the set ratio α and ratio β are out of the region shown in FIG. 28.

(L=160 nm)

When the Visible Light Transmittance, the Blueness Index, and the redness index are used as the parameters, since Samples 6-1 and 6-3 satisfy the conditions of the individual parameters, the set ratio α and ratio β are in the region show in FIG. 22. In Samples 6-2 and 6-5, the condition of the blueness index is not satisfied, and hence, the set ratio α and ratio β are out of the region shown in FIG. 22. In Sample 6-4, the conditions of the visible light transmittance and the redness index are not satisfied, and hence, the set ratio α and ratio β are out of the region shown in FIG. 22.

In addition, besides the visible light transmittance, the blueness index, and the redness index, when the shielding factor is further used as the parameter, in Sample 6-3, the condition of the shielding factor is also satisfied, and hence, the set ratio α and ratio β are in the region shown in FIG. 29. In Sample 6-1, the condition of the shielding factor is not satisfied, and hence, the set ratio α and ratio β are out of the region shown in FIG. 29.

(L=180 nm)

When the Visible Light Transmittance, the Blueness Index, and the redness index are used as the parameters, since Samples 7-1 and 7-3 satisfy the conditions of the individual parameters, the set ratio α and ratio β are in the region show in FIG. 23. In Sample 7-2, the condition of the blueness index is not satisfied, and hence, the set ratio α and ratio β are out of the region shown in FIG. 23. In Samples 7-4 and 7-5, the conditions of the visible light transmittance and the redness index are not satisfied, and hence, the set ratio α and ratio β out of the region shown in FIG. 23.

In addition, besides the visible light transmittance, the blueness index, and the redness index, when the shielding factor is further used as the parameter, in Sample 7-3, the condition of the shielding factor is also satisfied, and hence, the set ratio α and ratio β are in the region shown in FIG. 30. In Sample 7-1, the condition of the shielding factor is not satisfied, and hence, the set ratio α and ratio β are out of the region shown in FIG. 30.

Heretofore, although the embodiments of the present application have been particularly described, the present application is not limited to the above embodiments, and various modifications may be made without departing from the technical scope of the present application.

For example, the structures, methods, shapes, materials, numerical values, and the like described in the above embodiments are only used by way of example, and if necessary, for example, different structures, methods, shapes, materials, and numerical values from those described above may also be used.

In addition, the structures of the above embodiments may be used in combination without departing from the spirit and scope of the present application.

In addition, in the above embodiments, although the case in which the blind device and the rolling screen device are manually operated is described by way of example, the blind device and the rolling screen device may be electrically operated.

In addition, in the above embodiments, although the structure in which the optical film is adhered to an adherend, such as a window material, is described by way of example, the structure in which an adherend, such as a window material, is formed of the first or the second optical layer itself of the optical film may also be used. Accordingly, the function of directional reflection can be imparted beforehand to an optical element, such as a window material.

In addition, in the above embodiments, although the case in which the optical element is an optical film is described by way of example, the shape of the optical element is not limited to a film, and for example, a plate or a block shape may also be used.

In the above embodiments, although the case in which the present application is applied to an interior member or an exterior member, such as a window material, a fitting, a slat of a blind device, or a screen of a rolling screen device, is described by way of example, the present application is not limited to the case described above and may also be applied to an interior member and an exterior member other than those mentioned above.

As the interior member or the exterior member to which the optical element according to an embodiment is applied, for example, an interior member or an exterior member formed from the optical element itself and an interior member or an exterior member formed from a transparent base member to which a directional reflector is adhered may be mentioned. By installing the interior member or the exterior member as described above in the vicinity of a window inside a room, for example, only infrared rays can be directionally reflected outside, and visible rays can be introduced inside. Accordingly, when the interior member or the exterior member is installed, the necessity for interior illumination is also reduced. In addition, since scatter reflection into a room hardly occurs by the interior member or the exterior member, an increase in ambient temperature can also be suppressed. In addition, in accordance with necessary purposes, such as visibility control and improvement in strength, the optical element may also be applied to a bonding member other than a transparent base member.

In addition, in the above embodiments, although the case in which the present application is applied to a blind device and a rolling screen device is described by way of example, the present application is not limited to this case and may also be applied to various insolation shielding devices to be installed in the interior of a room or building.

In addition, in the above embodiments, although the case in which the present application is applied to an insolation shielding device (such as a rolling screen device) capable of adjusting the shielding quantity of incident light by rolling up or out an insolation shielding member is described by way of example, the present application is not limited to this case. For example, the present application may also be applied to an insolation shielding device capable of adjusting the shielding quantity of incident light by folding up an insolation shielding member. As the insolation shielding device as described above, for example, there may be mentioned a pleated screen device in which the shielding quantity of incident light is adjusted by folding up a screen, which is an insolation shielding member, into an accordion form.

In the above embodiments, although the case in which the present application is applied to a horizontal blind device (venetian blind device) is described by way of example, the present application may also be applied to an upright blind device (vertical blind device).

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An optical element comprising:
a first optical layer having a light emission surface;
a wavelength-selective reflective layer provided on the first optical layer; and
a second optical layer provided on the wavelength-selective reflective layer and having a light incidence surface,
wherein the wavelength-selective reflective layer has a structure including at least five layers in which high refractive-index layers and metal layers are alternately laminated to each other,
when a geometric film thickness L of the entire wavelength-selective reflective layer is 80 nm, a ratio $\alpha$ of an optical film thickness of the entire metal layers to an optical film thickness of the entire high refractive-index layers and a ratio $\beta$ of an optical film thickness of a third high refractive-index layer from one of a first optical layer side and a second optical layer side to an optical film thickness of a first high refractive-index layer therefrom are included in a first region surrounded by the following formulas (1) to (4),
when the geometric film thickness L of the entire wavelength-selective reflective layer is 90 nm, the ratio $\alpha$ and the ratio $\beta$ are included in a second region surrounded by the following formulas (5) to (8), and
when the geometric film thickness L of the entire wavelength-selective reflective layer is in a range of 80 to 90 nm, the ratio $\alpha$ and the ratio $\beta$ are included in a space enclosed by the first region, the second region, and the following formulas (9) to (12)

$$\alpha=-0.0004\beta^2+0.0053\beta+0.0065 \qquad (1)$$

$$\alpha=-1\times10^{-5}\beta^2+0.0007\beta+0.0066 \qquad (2)$$

$$\alpha=-1\times10^{-5}\beta^2+0.0005\beta+0.0119 \qquad (3)$$

$$\alpha=0.012114 \qquad (4)$$

$$\alpha=-0.0002\beta^2+0.0039\beta+0.0087 \qquad (5)$$

$$\alpha=-3\times10^{-5}\beta^2+0.0014\beta+0.0038 \qquad (6)$$

$$\alpha=-2\times10^{-5}\beta^2+0.0006\beta+0.0112 \qquad (7)$$

$$\alpha=0.010589 \qquad (8)$$

$$(\beta-0.5)/0.67=(\alpha-0.01059)/0.00152478=(90-L)/10 \qquad (9)$$

$$(\beta-5.5)/3.75=(\alpha-0.01059)/0.00152478=(90-L)/10 \qquad (10)$$

$$(\beta-10.4)/10.6=(\alpha-0.01516)/0.00067768=(90-L)/10 \qquad (11)$$

$$(\beta-0.8)/0.45=(\alpha-0.01161)/0.0008471=(90-L)/10 \qquad (12).$$

2. The optical element according to claim 1,
wherein when the geometric film thickness L of the entire wavelength-selective reflective layer is 80 nm, the ratio α and the ratio β are included in a third region surrounded by formulas (1) to (3) and the following formula (54),
when the geometric film thickness L of the entire wavelength-selective reflective layer is 90 nm, the ratio α and the ratio β are included in a fourth region surrounded by formulas (5) to (7) and the following formula (55), and
when the geometric film thickness L of the entire wavelength-selective reflective layer is in a range of 80 to 90 nm, the ratio α and the ratio β are included in a space enclosed by the third region, the fourth region, and the following formulas (56) to (60)

$$\alpha = -6 \times 10^{-6}\beta^2 + 0.0002\beta + 0.0141 \qquad (54)$$

$$\alpha = -1 \times 10^{-5}\beta^2 + 0.0002\beta + 0.0125 \qquad (55)$$

$$(\beta - 0.8)/11.6 = (\alpha - 0.01161)/0.00398137 = (90 - L)/10 \qquad (56)$$

$$(\beta - 8.9)/10.4 = (\alpha - 0.01398)/0.00152478 = (90 - L)/10 \qquad (57)$$

$$(\beta - 10.4)/10.6 = (\alpha - 0.01516)/0.00067768 = (90 - L)/10 \qquad (58)$$

$$(\beta - 4.9)/16.1 = (\alpha - 0.01347)/0.00237188 = (90 - L)/10 \qquad (59)$$

$$(\beta - 4.9)/7.5 = (\alpha - 0.01347)/0.00211775 = (90 - L)/10 \qquad (60).$$

3. The optical element according to claim 1,
wherein the first optical layer has a concavo-convex surface,
the wavelength-selective reflective layer is provided on the concavo-convex surface, and
the second optical layer is provided on the wavelength-selective reflective layer so as to fill the concavo-convex surface.
4. The optical element according to claim 1,
wherein the film thickness of the first high refractive-index layer is approximately equal to that of the fifth high refractive-index layer.
5. The optical element according to claim 1,
wherein the film thickness of a second metal layer is approximately equal to that of a fourth metal layer.
6. The optical element according to claim 1,
wherein the refractive index of each high refractive-index layer and the refractive index of each metal layer are each a refractive index at a light wavelength of 550 nm.
7. The optical element according to claim 1,
wherein each high refractive-index layer has a refractive index higher than that of each metal layer.
8. The optical element according to claim 1,
wherein the refractive index of each high refractive-index layer is in a range of 1.7 to 2.6.
9. The optical element according to claim 1,
wherein each high refractive-index layer contains at least one selected from the group consisting of niobium oxide, zinc oxide, titanium oxide, and tantalum oxide, and
each metal layer contains a Ag alloy.
10. A window material comprising:
the optical element according to claim 1.
11. A fitting comprising:
the optical element according to claim 1 at a lighting portion.
12. An insolation shielding device comprising:
at least one insolation shielding member which shields sunlight,
wherein the insolation shielding member includes the optical element according to claim 1.
13. An optical element comprising:
a first optical layer having a light emission surface;
a wavelength-selective reflective layer provided on the first optical layer; and
a second optical layer provided on the wavelength-selective reflective layer and having a light incidence surface,
wherein the wavelength-selective reflective layer has a structure including at least five layers in which high refractive-index layers and metal layers are alternately laminated to each other,
when a geometric film thickness L of the entire wavelength-selective reflective layer is 90 nm, a ratio α of an optical film thickness of the entire metal layers to an optical film thickness of the entire high refractive-index layers and a ratio β of an optical film thickness of a third high refractive-index layer from one of a first optical layer side and a second optical layer side to an optical film thickness of a first high refractive-index layer therefrom are included in a first region surrounded by the following formulas (5) to (8),
when the geometric film thickness L of the entire wavelength-selective reflective layer is 100 nm, the ratio α and the ratio β are included in a second region surrounded by the following formulas (13) to (16), and
when the geometric film thickness L of the entire wavelength-selective reflective layer is in a range of 90 to 100 nm, the ratio α and the ratio β are included in a space enclosed by the first region, the second region, and the following formulas (17) to (20)

$$\alpha = -0.0002\beta^2 + 0.0039\beta + 0.0087 \qquad (5)$$

$$\alpha = -3 \times 10^{-5}\beta^2 + 0.0014\beta + 0.0038 \qquad (6)$$

$$\alpha = -2 \times 10^{-5}\beta^2 + 0.0006\beta + 0.0112 \qquad (7)$$

$$\alpha = 0.010589 \qquad (8)$$

$$\alpha = -0.0002\beta^2 + 0.0055\beta + 0.0057 \qquad (13)$$

$$\alpha = -0.0002\beta^2 + 0.0045\beta - 0.0067 \qquad (14)$$

$$\alpha = -4 \times 10^{-5}\beta^2 + 0.001\beta + 0.0099 \qquad (15)$$

$$\alpha = 0.009403 \qquad (16)$$

$$(0.7 - \beta)/0.2 = (\alpha - 0.0094)/0.00118594 = (100 - L)/10 \qquad (17)$$

$$(\beta - 4.4)/1.1 = (\alpha - 0.0094)/0.00118594 = (100 - L)/10 \qquad (18)$$

$$(\beta - 6.5)/3.9 = (\alpha - 0.01432)/0.0008471 = (100 - L)/10 \qquad (19)$$

$$(1 - \beta)/0.2 = (\alpha - 0.01093)/0.00067768 = (100 - L)/10 \qquad (20).$$

14. The optical element according to claim 13,
wherein when the geometric film thickness L of the entire wavelength-selective reflective layer is 90 nm, the ratio α and the ratio β are included in a third region surrounded by formulas (5) to (7) and the following formula (55),
when the geometric film thickness L of the entire wavelength-selective reflective layer is 100 nm, the ratio α and the ratio β are included in a fourth region surrounded by formulas (13) to (15) and the following formula (61), and
when the geometric film thickness L of the entire wavelength-selective reflective layer is in a range of 90 to 100 nm, the ratio α and the ratio β are included in a space enclosed by the third region, the fourth region, and the following formulas (62) to (65)

$$\alpha=-1\times10^{-5}\beta^2+0.0002\beta+0.0125 \quad (55)$$

$$\alpha=-3\times10^{-5}\beta^2+0.0004\beta+0.0113 \quad (61)$$

$$(1-\beta)/0.2=(\alpha-0.01093)/0.0067768=(100-L)/10 \quad (62)$$

$$(\beta-5.8)/3.1=(\alpha-0.01262)/0.00135536=(100-L)/10 \quad (63)$$

$$(\beta-6.5)/3.9=(\alpha-0.01432)/0.0008471=(100-L)/10 \quad (64)$$

$$(\beta-2.8)/2.1=(\alpha-0.0122)/0.00127065=(100-L)/10 \quad (65).$$

15. An optical element comprising:
a first optical layer having a light emission surface;
a wavelength-selective reflective layer provided on the first optical layer; and
a second optical layer provided on the wavelength-selective reflective layer and having a light incidence surface,
wherein the wavelength-selective reflective layer has a structure including at least five layers in which high refractive-index layers and metal layers are alternately laminated to each other,
when a geometric film thickness L of the entire wavelength-selective reflective layer is 100 nm, a ratio $\alpha$ of an optical film thickness of the entire metal layers to an optical film thickness of the entire high refractive-index layers and a ratio $\beta$ of an optical film thickness of a third high refractive-index layer from one of a first optical layer side and a second optical layer side to an optical film thickness of a first high refractive-index layer therefrom are included in a first region surrounded by the following formulas (13) to (16),
when the geometric film thickness L of the entire wavelength-selective reflective layer is 120 nm, the ratio $\alpha$ and the ratio $\beta$ are included in a second region surrounded by the following formulas (21) to (24), and
when the geometric film thickness L of the entire wavelength-selective reflective layer is in a range of 100 to 120 nm, the ratio $\alpha$ and the ratio $\beta$ are included in a space enclosed by the first region, the second region, and the following formulas (25) to (28)

$$\alpha=-0.0002\beta^2+0.0055\beta+0.0057 \quad (13)$$

$$\alpha=-0.0002\beta^2+0.0045\beta-0.0067 \quad (14)$$

$$\alpha=-4\times10^{-5}\beta^2+0.001\beta+0.0099 \quad (15)$$

$$\alpha=0.009403 \quad (16)$$

$$\alpha=-0.0003\beta^2+0.0074\beta+0.0033 \quad (21)$$

$$\alpha=-0.0014\beta^2+0.0191\beta-0.0422 \quad (22)$$

$$\alpha=-9\times10^{-5}\beta^2+0.0015\beta+0.0084 \quad (23)$$

$$\alpha=0.007709 \quad (24)$$

$$(\beta-0.6)/0.1=(\alpha-0.00771)/0.0016942=(120-L)/20 \quad (25)$$

$$(\beta-3.6)/0.8=(\alpha-0.00771)/0.0016942=(120-L)/20 \quad (26)$$

$$(\beta-4.25)/2.25=(\alpha-0.0133)/0.00101652=(120-L)/20 \quad (27)$$

$$(\beta-0.9)/0.1=(\alpha-0.00974)/0.00118594=(120-L)/20 \quad (28).$$

16. The optical element according to claim 15,
wherein when the geometric film thickness L of the entire wavelength-selective reflective layer is 100 nm, the ratio $\alpha$ and the ratio $\beta$ are included in a third region surrounded by formulas (13) to (15) and the following formula (61),
when the geometric film thickness L of the entire wavelength-selective reflective layer is 120 nm, the ratio $\alpha$ and the ratio $\beta$ are included in a fourth region surrounded by formulas (21) to (23) and the following formula (66), and
when the geometric film thickness L of the entire wavelength-selective reflective layer is in a range of 100 to 120 nm, the ratio $\alpha$ and the ratio $\beta$ are included in a space enclosed by the third region, the fourth region, and the following formulas (67) to (70)

$$\alpha=-3\times10^{-5}\beta^2+0.0004\beta+0.0113 \quad (61)$$

$$\alpha=-7\times10^{-5}\beta^2+0.0007\beta+0.0097 \quad (66)$$

$$(\beta-0.9)/0.1=(\alpha-0.00974)/0.00118594=(120-L)/20 \quad (67)$$

$$(\beta-4)/1.8=(\alpha-0.01144)/0.00118594=(120-L)/20 \quad (68)$$

$$(\beta-4.25)/2.25=(\alpha-0.0133)/0.00101652=(120-L)/20 \quad (69)$$

$$(\beta-1.7)/1.1=(\alpha-0.01076)/0.00144007=(120-L)/20 \quad (70).$$

17. An optical element comprising:
a first optical layer having a light emission surface;
a wavelength-selective reflective layer provided on the first optical layer; and
a second optical layer provided on the wavelength-selective reflective layer and having a light incidence surface,
wherein the wavelength-selective reflective layer has a structure including at least five layers in which high refractive-index layers and metal layers are alternately laminated to each other,
when a geometric film thickness L of the entire wavelength-selective reflective layer is 120 nm, a ratio $\alpha$ of an optical film thickness of the entire metal layers to an optical film thickness of the entire high refractive-index layers and a ratio $\beta$ of an optical film thickness of a third high refractive-index layer from one of a first optical layer side and a second optical layer side to an optical film thickness of a first high refractive-index layer therefrom are included in a first region surrounded by the following formulas (21) to (24),
when the geometric film thickness L of the entire wavelength-selective reflective layer is 140 nm, the ratio $\alpha$ and the ratio $\beta$ are included in a second region surrounded by the following formulas (29) to (32), and
when the geometric film thickness L of the entire wavelength-selective reflective layer is in a range of 120 to 140 nm, the ratio $\alpha$ and the ratio $\beta$ are included in a space enclosed by the first region, the second region, and the following formulas (33) to (36)

$$\alpha=-0.0003\beta^2+0.0074\beta+0.0033 \quad (21)$$

$$\alpha=-0.0014\beta^2+0.0191\beta-0.0422 \quad (22)$$

$$\alpha=-9\times10^{-5}\beta^2+0.0015\beta+0.0084 \quad (23)$$

$$\alpha=0.007709 \quad (24)$$

$$\alpha=-0.0014\beta^2+0.0136\beta-0.0027 \quad (29)$$

$$\beta=10{,}132\alpha^2-241.39\alpha+4.747 \quad (30)$$

$$\alpha=-0.0001\beta^2+0.002\beta+0.0074 \quad (31)$$

$$\alpha=0.006523 \quad (32)$$

$(0.75-\beta)/0.15=(\alpha-0.00652)/0.00118594=(140-L)/20$ (33)

$(3.65-\beta)/0.05=(\alpha-0.00652)/0.00118594=(140-L)/20$ (34)

$(\beta-3.3)/0.95=(\alpha-0.01245)/0.0008471=(140-L)/20$ (35)

$(3.47-\beta)/2.57=(\alpha-0.00754)/0.00220246=(140-L)/20$ (36).

18. The optical element according to claim 17,
wherein when the geometric film thickness L of the entire wavelength-selective reflective layer is 120 nm, the ratio α and the ratio β are included in a third region surrounded by formulas (21) to (23) and the following formula (66),
when the geometric film thickness L of the entire wavelength-selective reflective layer is 140 nm, the ratio α and the ratio β are included in a fourth region surrounded by formulas (29) to (31) and the following formula (71), and
when the geometric film thickness L of the entire wavelength-selective reflective layer is in a range of 120 to 140 nm, the ratio α and the ratio β are included in a space enclosed by the third region, the fourth region, and the following formulas (72) to (75)

$\alpha=-7\times10^{-5}\beta^2+0.0007\beta+0.0097$ (66)

$\alpha=-0.0001\beta^2+0.0011\beta+0.0083$ (71)

$(1-\beta)/0.1=(\alpha-0.00923)/0.00050826=(140-L)/20$ (72)

$(\beta-3.3)/0.7=(\alpha-0.01042)/0.00101652=(140-L)/20$ (73)

$(\beta-3.3)/0.95=(\alpha-0.01245)/0.0008471=(140-L)/20$ (74)

$(\beta-1.1)/0.6=(\alpha-0.0094)/0.00135536=(140-L)/20$ (75).

19. An optical element comprising:
a first optical layer having a light emission surface;
a wavelength-selective reflective layer provided on the first optical layer; and
a second optical layer provided on the wavelength-selective reflective layer and having a light incidence surface,
wherein the wavelength-selective reflective layer has a structure including at least five layers in which high refractive-index layers and metal layers are alternately laminated to each other,
when a geometric film thickness L of the entire wavelength-selective reflective layer is 140 nm, a ratio α of an optical film thickness of the entire metal layers to an optical film thickness of the entire high refractive-index layers and a ratio β of an optical film thickness of a third high refractive-index layer from one of a first optical layer side and a second optical layer side to an optical film thickness of a first high refractive-index layer therefrom are included in a first region surrounded by the following formulas (29) to (32),
when the geometric film thickness L of the entire wavelength-selective reflective layer is 160 nm, the ratio α and the ratio β are included in a second region surrounded by the following formulas (37) to (41), and
when the geometric film thickness L of the entire wavelength-selective reflective layer is in a range of 140 to 160 nm, the ratio α and the ratio β are included in a space enclosed by the first region, the second region, and the following formulas (42) to (45)

$\alpha=-0.0014\beta^2+0.0136\beta-0.0027$ (29)

$\beta=10{,}132\alpha^2-241.39\alpha+4.747$ (30)

$\alpha=-0.0001\beta^2+0.002\beta+0.0074$ (31)

$\alpha=0.006523$ (32)

$\alpha=-0.005\beta^2+0.0273\beta-0.0145$ (37)

$\alpha=0.0043\beta^2-0.0332\beta+0.07$ (38)

$\beta=2.875$ (39)

$\alpha=-0.0001\beta^2+0.0025\beta+0.0062$ (40)

$\alpha=0.005676$ (41)

$(0.9-\beta)/0.15=(\alpha-0.00568)/0.0008471=(160-L)/20$ (42)

$(3.8-\beta)/0.15=(\alpha-0.00568)/0.0008471=(160-L)/20$ (43)

$(\beta-2.85)/0.45=(\alpha-0.01203)/0.00042355=(160-L)/20$ (44)

$(\beta-1.05)/2.42=(0.00864-\alpha)/0.00110123=(160-L)/20$ (45).

20. The optical element according to claim 19,
wherein when the geometric film thickness L of the entire wavelength-selective reflective layer is 140 nm, the ratio α and the ratio β are included in a third region surrounded by formulas (29) to (31) and the following formula (71),
when the geometric film thickness L of the entire wavelength-selective reflective layer is 160 nm, the ratio α and the ratio β are included in a fourth region surrounded by formulas (37) to (40) and the following formula (76), and
when the geometric film thickness L of the entire wavelength-selective reflective layer is in a range of 140 to 160 nm, the ratio α and the ratio β are included in a space enclosed by the third region, the fourth region, and the following formulas (77) to (80)

$\alpha=-0.0001\beta^2+0.0011\beta+0.0083$ (71)

$\alpha=-0.0002\beta^2+0.0016\beta+0.0067$ (76)

$(1.05-\beta)/0.05=(\alpha-0.00822)/0.00101652=(160-L)/20$ (77)

$(\beta-2.85)/0.45=(\alpha-0.00991)/0.00050826=(160-L)/20$ (78)

$(\beta-2.85)/0.45=(\alpha-0.01203)/0.00042355=(160-L)/20$ (79)

$(\beta-1.05)/0.05=(\alpha-0.00864)/0.00076239=(160-L)/20$ (80).

21. An optical element comprising:
a first optical layer having a light emission surface;
a wavelength-selective reflective layer provided on the first optical layer; and
a second optical layer provided on the wavelength-selective reflective layer and having a light incidence surface,
wherein the wavelength-selective reflective layer has a structure including at least five layers in which high refractive-index layers and metal layers are alternately laminated to each other,
when a geometric film thickness L of the entire wavelength-selective reflective layer is 160 nm, a ratio α of an optical film thickness of the entire metal layers to an optical film thickness of the entire high refractive-index layers and a ratio β of an optical film thickness of a third high refractive-index layer from one of a first optical layer side and a second optical layer side to an optical film thickness of a first high refractive-index layer therefrom are included in a first region surrounded by the following formulas (37) to (41), when the geometric film thickness L of the entire wavelength-selective reflective layer is 180 nm, the ratio $\alpha$ and the ratio $\beta$ are included in a second region surrounded by the following formulas (46) to (49), and when the geometric film thickness L of the entire wavelength-selective reflective layer is in a range of 160 to 180 nm, the ratio $\alpha$ and the ratio $\beta$ are included in a space enclosed by the first region, the second region, and the following formulas (50) to (53)

$$\alpha = -0.005\beta^2 + 0.0273\beta - 0.0145 \tag{37}$$

$$\alpha = 0.0043\beta^2 - 0.0332\beta + 0.07 \tag{38}$$

$$\beta = 2.875 \tag{39}$$

$$\alpha = -0.0001\beta^2 + 0.0025\beta + 0.0062 \tag{40}$$

$$\alpha = 0.005676 \tag{41}$$

$$\alpha = -0.0103\beta^2 + 0.047\beta - 0.0322 \tag{46}$$

$$\alpha = 0.0093\beta^2 - 0.0677\beta + 0.1212 \tag{47}$$

$$\alpha = -0.0003\beta^2 + 0.0036\beta + 0.0046 \tag{48}$$

$$\alpha = 0.00498 \tag{49}$$

$$(1.05-\beta)/0.15 = (\alpha - 0.005)/0.00067768 = (180-L)/20 \tag{50}$$

$$(\beta - 2.75)/1.05 = (\alpha - 0.005)/0.00067768 = (180-L)/20 \tag{51}$$

$$(\beta - 2.4)/0.45 = (\alpha - 0.01177)/0.00025413 = (180-L)/20 \tag{52}$$

$$(1.2-\beta)/0.15 = (\alpha - 0.00856)/0.00008471 = (180-L)/20 \tag{53}.$$

22. The optical element according to claim 21, wherein when the geometric film thickness L of the entire wavelength-selective reflective layer is 160 nm, the ratio $\alpha$ and the ratio $\beta$ are included in a third region surrounded by formulas (37) to (40) and the following formula (76), when the geometric film thickness L of the entire wavelength-selective reflective layer is 180 nm, the ratio $\alpha$ and the ratio $\beta$ are included in a fourth region surrounded by formulas (46) to (48) and the following formula (81), and when the geometric film thickness L of the entire wavelength-selective reflective layer is in a range of 160 to 180 nm, the ratio $\alpha$ and the ratio $\beta$ are included in a space enclosed by the third region, the fourth region, and the following formulas (82) to (85)

$$\alpha = -0.0002\beta^2 + 0.0016\beta + 0.0067 \tag{76}$$

$$\alpha = -0.0003\beta^2 + 0.0021\beta + 0.0055 \tag{81}$$

$$(1.15-\beta)/0.1 = (\alpha - 0.00754)/0.00067768 = (180-L)/20 \tag{82}$$

$$(\beta - 2.55)/0.3 = (\alpha - 0.00889)/0.00101652 = (180-L)/20 \tag{83}$$

$$(\beta - 2.4)/0.45 = (\alpha - 0.01177)/0.00025413 = (180-L)/20 \tag{84}$$

$$(1.2-\beta)/0.15 = (\alpha - 0.00856)/0.00008471 = (180-L)/20 \tag{85}.$$

* * * * *